US006630993B1

(12) United States Patent
Hedges et al.

(10) Patent No.: US 6,630,993 B1
(45) Date of Patent: Oct. 7, 2003

(54) METHOD AND OPTICAL RECEIVER WITH EASY SETUP MEANS FOR USE IN POSITION MEASUREMENT SYSTEMS

(75) Inventors: Thomas M. Hedges, Great Falls, VA (US); Scott C. Casteel, Fairfax, VA (US); Andrew Dornbusch, Austin, TX (US); Doug Gaff, Bluemont, VA (US); Edmund S. Pendleton, Arlington, VA (US); Michael J. Sobel, Annandale, VA (US); Frey Wain, San Francisco, CA (US)

(73) Assignee: ARC Second Inc., Dulles, VA (US)

( * ) Notice: Subject to any disclaimer, the term of this patent is extended or adjusted under 35 U.S.C. 154(b) by 0 days.

(21) Appl. No.: 09/532,099

(22) Filed: Mar. 21, 2000

Related U.S. Application Data

(60) Provisional application No. 60/125,545, filed on Mar. 22, 1999.

(51) Int. Cl.[7] .............................................. G01B 11/26
(52) U.S. Cl. .................................. 356/141.4; 356/141.5
(58) Field of Search ......................... 356/141.1, 141.4, 356/141.5, 152.1; 702/150–153

(56) References Cited

U.S. PATENT DOCUMENTS

| | | |
|---|---|---|
| 4,441,809 A | 4/1984 | Dudley et al. |
| 4,818,107 A | 4/1989 | Ono et al. |
| 4,820,041 A | 4/1989 | Davidson et al. |
| 4,874,238 A | 10/1989 | Ochi et al. |
| 5,100,229 A | 3/1992 | Lundberg et al. |
| 5,110,202 A * | 5/1992 | Dornbusch et al. |
| 5,247,487 A | 9/1993 | Beliveau et al. |
| 5,294,970 A * | 3/1994 | Dornbusch et al. |
| 5,307,368 A | 4/1994 | Hamar |
| 5,884,239 A | 3/1999 | Romanik, Jr. |

FOREIGN PATENT DOCUMENTS

| | | |
|---|---|---|
| DE | 44 15 419 | 11/1995 |
| GB | 2 213 673 | 8/1989 |

\* cited by examiner

*Primary Examiner*—Stephen C. Buczinski
(74) *Attorney, Agent, or Firm*—Steven L. Nichols; Paul W. Fish; Rader, Fishman & Grauer

(57) ABSTRACT

Positions can be precisely and accurately fixed instantaneously within a three-dimensional workspace. A system of two or more transmitters each continuously sweep the workspace with two fanned laser beams which are preferably about 90 degrees apart on the rotational axis of the transmitter. A receiving instrument includes, preferably, two light detectors which detect the time at which each fanned laser beam is incident thereon. The light detectors also detect a synchronization pulse from each transmitter that is emitted once per revolution. Beams from different transmitters are differentiated by different rotational speeds and, therefore, different beam incidence cycles. Because three intersecting planes uniquely define a point in three-dimensional space, by detecting at least three of the fan beams from the transmitters, the receiving instrument can calculate its position in the workspace. A Quick Calc setup procedure allows the use to define a desired coordinate system within the workspace.

44 Claims, 39 Drawing Sheets

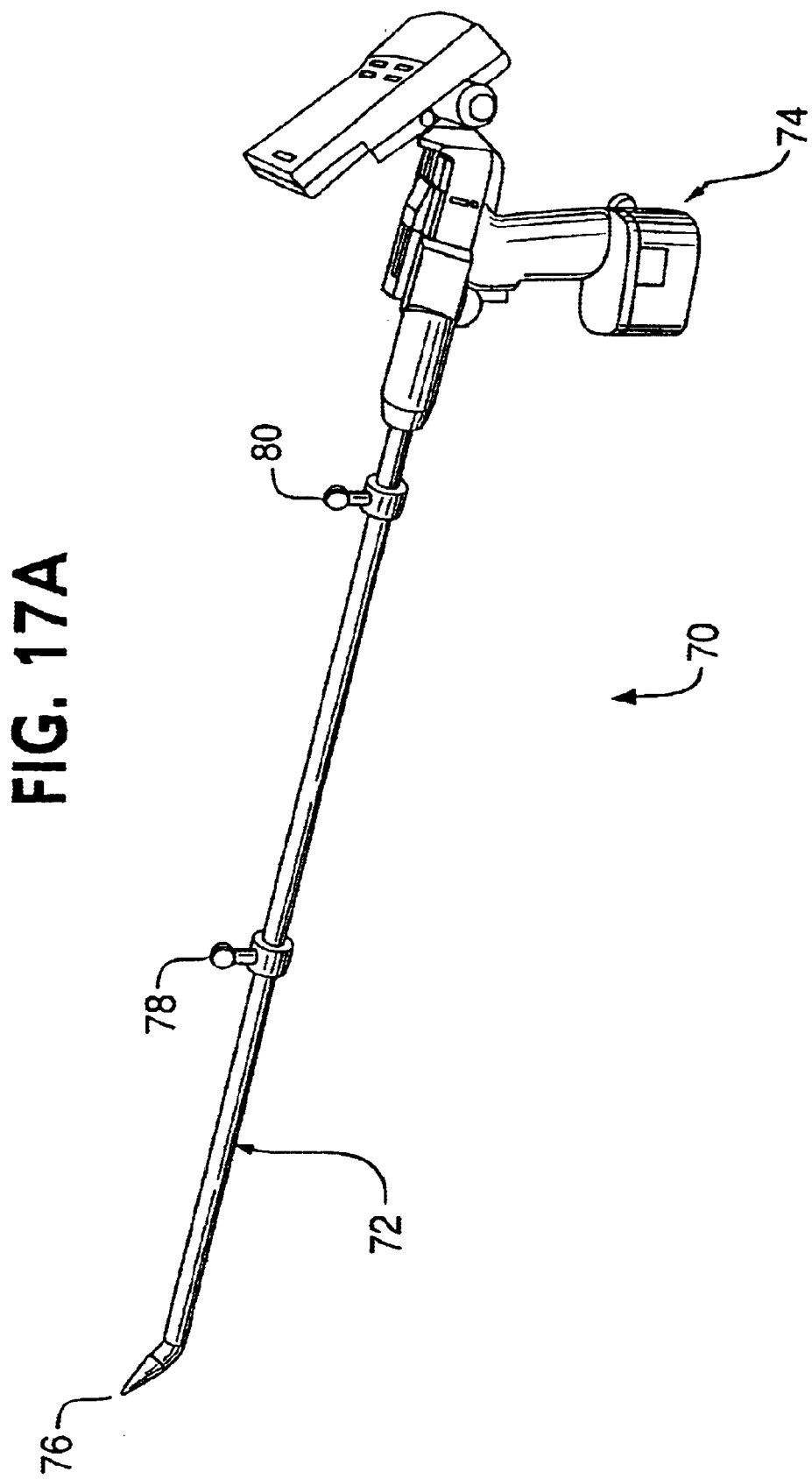

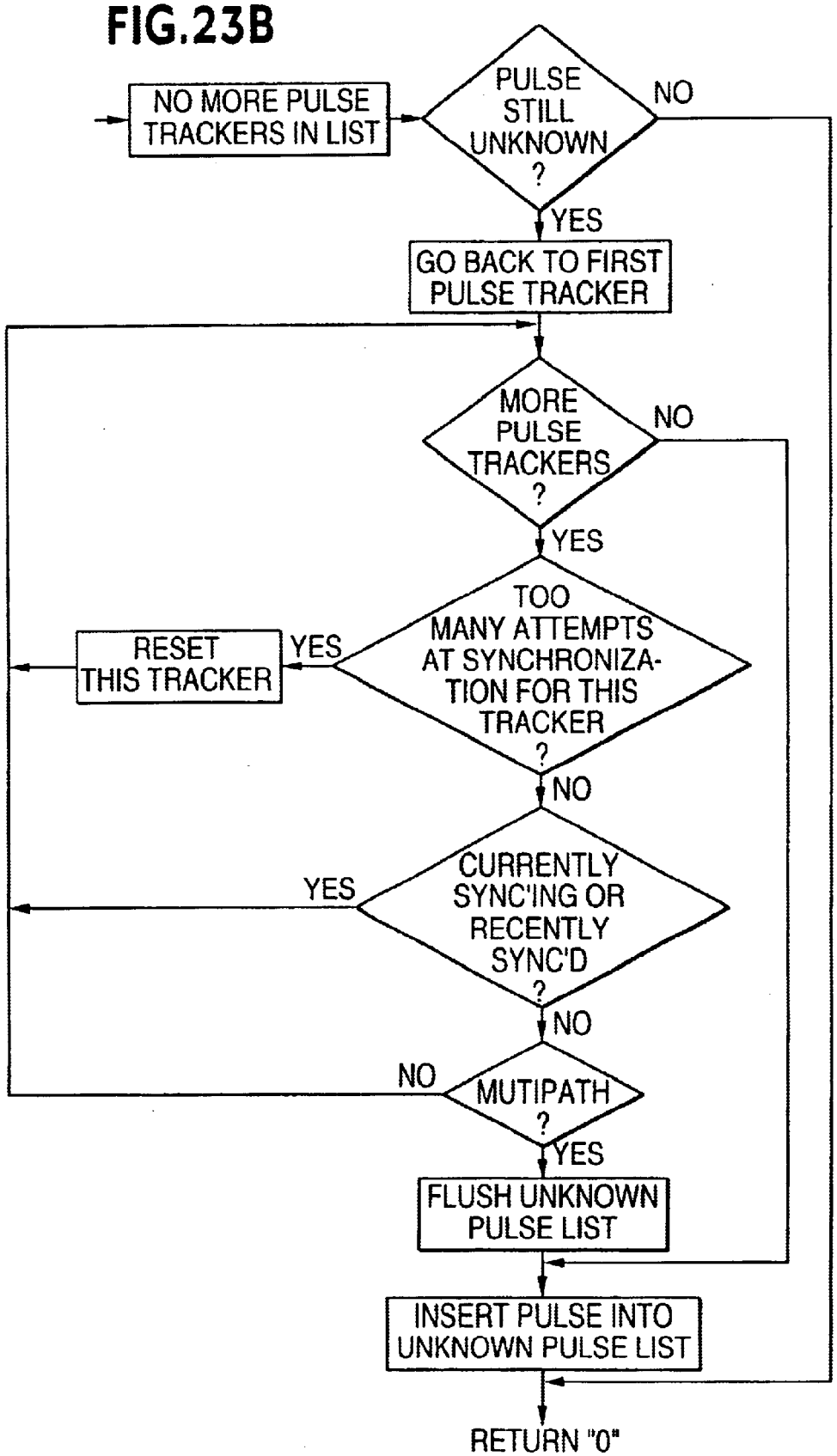

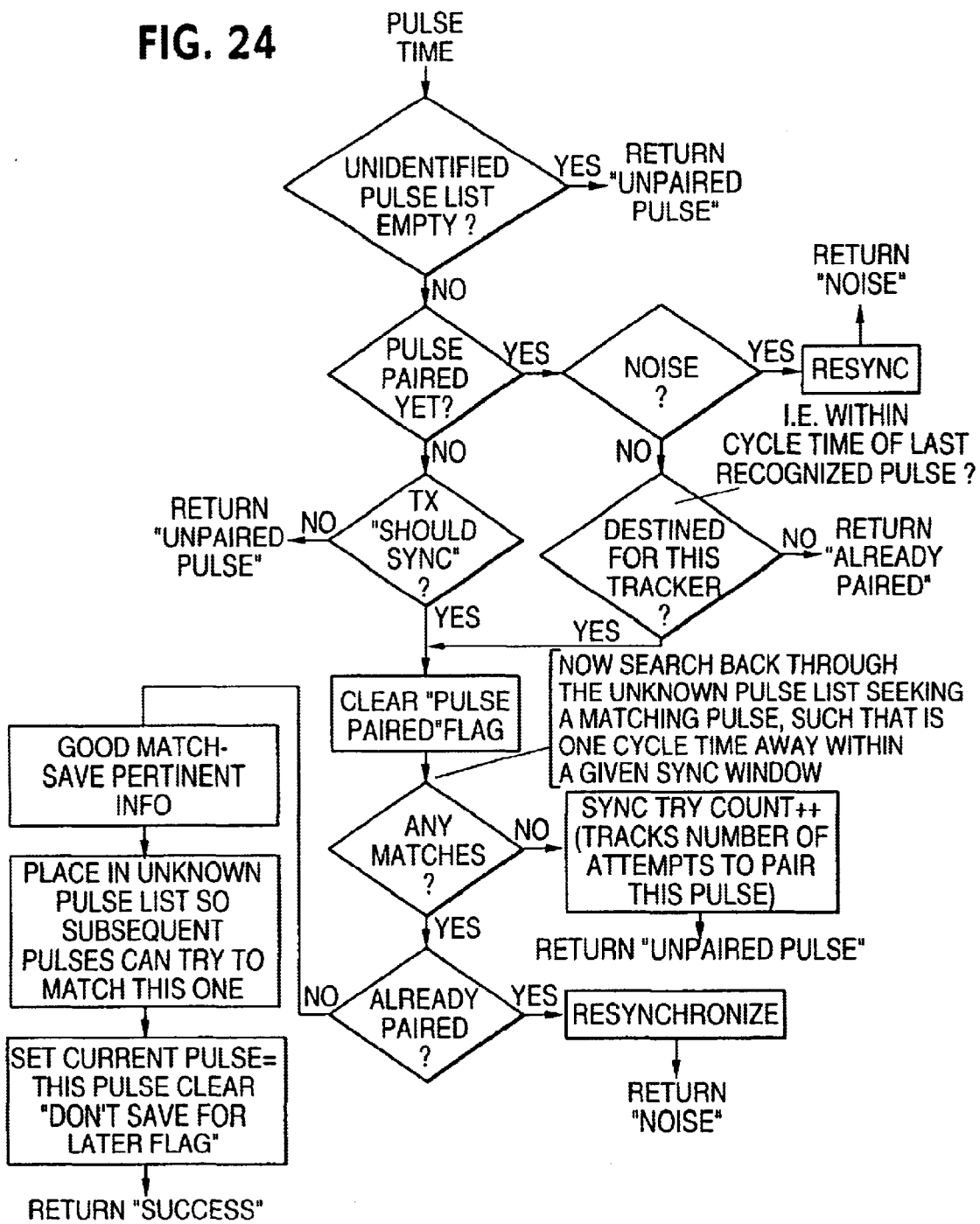

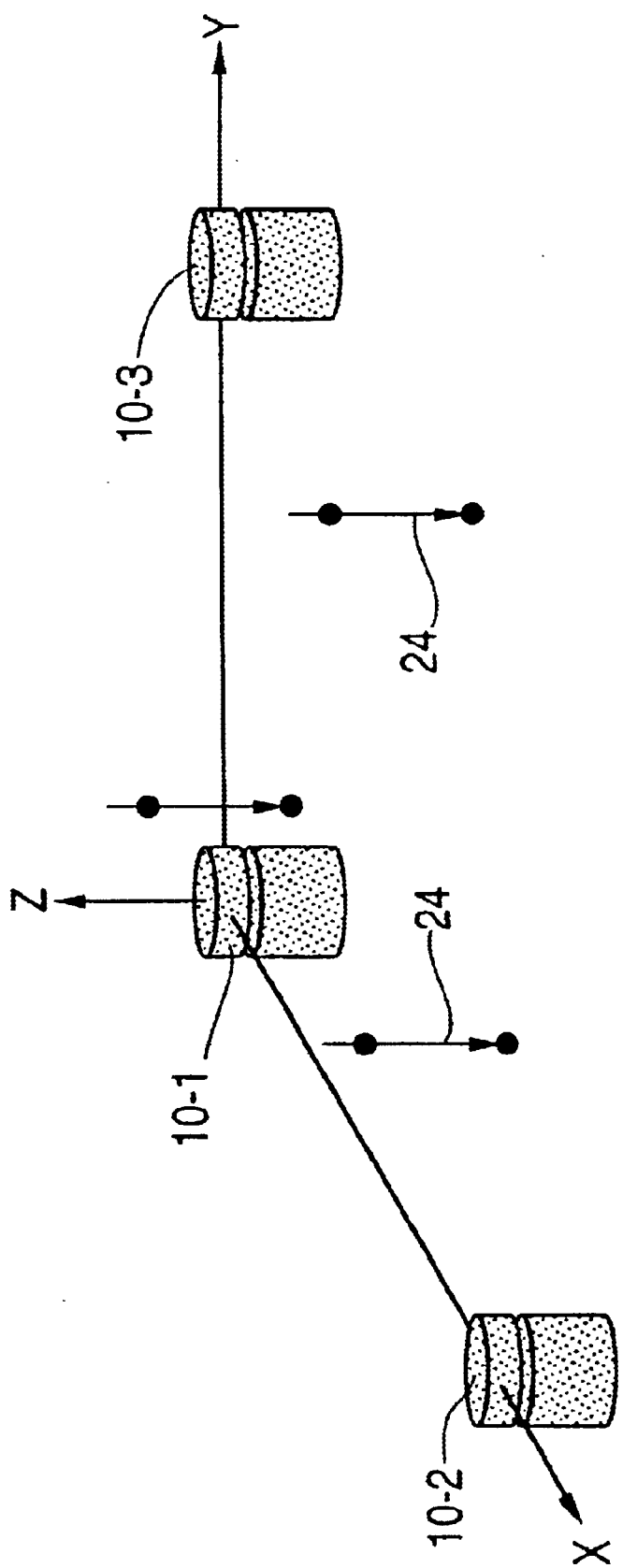

METHOD AND OPTICAL RECEIVER WITH EASY SETUP MEANS FOR USE IN POSITION MEASUREMENT SYSTEMS

CROSS-REFERENCE TO RELATED APPLICATIONS

This application claims the priority of the previously filed U.S. provisional application Ser. No. 60/125,545 assigned to the assignee of this application and filed on Mar. 22, 1999 and a PCT/U.S. application Ser. No. 99/23615 entitled Rotating Head Optical Transmitter for Position Measurement System filed on Oct. 13, 1999 both of which applications are incorporated herein by this reference.

BACKGROUND OF THE INVENTION

1. Field of the Invention

This invention relates in general to the field of precise position measurement in a three-dimensional workspace and more particularly to an improved apparatus and method of providing position-related information.

2. Description of Related Art

A variety of endeavors require or are greatly aided by the ability to make a precise determination of position within a three-dimensional workspace. For example, laying out a construction site according to a blueprint requires the identification at the actual construction site of a number of actual positions that correspond to features of the building on the blueprint.

Despite the many applications which require or are advanced by the ability to make precise determinations of position, it has historically been relatively difficult or expensive to precisely fix the position of any given point relative to an origin in an actual three-dimensional workspace.

A variety of techniques are known in the art to measure position, including land surveying techniques and global positioning satellite ("GPS") system techniques. However, these techniques generally are not precise or require expensive devices which are complex and difficult to manufacture with high precision and accuracy. Additionally, many of these techniques required extensive training, and therefore cannot be practiced by those not trained in the art. Land surveying techniques, for example, fix position using a precision instrument known as a theodolite. The theodolite is both an expensive piece of equipment and requires substantial training to use. GPS equipment is relatively easy to use, but can be expensive and has limited accuracy on a small scale due to a certain amount of intentional error that is introduced by the military operators of GPS satellites.

Consequently, there has long been a need in the art for a method and device that can quickly and accurately fix positions in a three-dimensional workspace. There is a further need in the art for such a method and device which is easy to use and does not require extensive training.

SUMMARY OF THE INVENTION

It is an object of the present invention to provide a method and device that can quickly and accurately fix positions in a three-dimensional workspace. It is a further object of the present invention to provide such a method and device that is easy to operate and does not require extensive training.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve these stated and other objects, the present invention may be embodied and described as a position fixing system that includes, at a high level, several transmitters and a receiving instrument. The transmitters are preferably optical transmitters that transmit laser beams that have been fanned into a plane. The transmitters transmit signals from stationary locations and the receivers receive these signals. Consequently, the receiving instrument incorporates sensors, e.g., light detectors, that detect the signals from the transmitters. The receiving instrument then determines a coordinate system and calculates its position and assorted other information of interest from these received signals. The receiving instrument then displays this information through a user interface. The information may be, for example, the location of the receiving instrument or its distance relative to another location.

Various Figs. are included throughout this disclosure to illustrate a variety of concepts, components of several subsystems, manufacturing processes, and assembly of several subsystems.

1. Transmitter

The transmitter of the present invention includes a rotating head which sweeps one or more, preferably two, fanned laser beams continually through the three-dimensional workspace in which the receiver will be used to make position determinations based on the optical signals received from the transmitter. In this way, the signals from the transmitter cover the entire three-dimensional workspace. The present invention can be used in conjunction with the techniques and apparatus described in previous patent application U.S. Ser. No. 99/23615 to Pratt, also assigned to the present assignee, filed on Oct. 13, 1999, and incorporated herein by reference.

A. Simplified Optical Path

The receiver preferably has a clear optical path to each transmitter in the system during position fixing operation. One of the key advantages of the transmitters according to the present invention is the simplification of the optical paths as exemplified by the lasers rotating with the head. Additionally, there is no window in the preferred transmitter. Therefore, there is no distortion introduced by the movement of the laser beam across a window. As described in detail below, the preferred embodiment utilizes a lens or other device which rotates with the laser. Thus, there is no distortion caused, for example, by variable window characteristics or angles of incidence or between a rotating lens and a fixed laser. The absence of a fixed window also simplifies manufacture, maintenance, and operation. The absence of a fixed window does make it preferable that a rotating seal be added to the transmitter.

B. Speed of Rotation and Storage of Parameters

The rotating head of the transmitter of the present invention, and the lasers within it, rotate through a full 360 degrees at a constant, although configurable, velocity. As will be explained below, each transmitter in the system needs to rotate at a different velocity. Therefore, each transmitter has a velocity that can be controlled by the user. Additionally, each transmitter has an easily quantifiable center of rotation which simplifies the algorithms for determining position and can simplify the set-up of the system. A separate synchronization signal, also preferably an optical signal, fires in the preferred embodiment once per every other revolution of the rotating head to assist the receiver in using the information received from the transmitter.

The velocity of the rotating head is configurable through the use of, in the preferred embodiment, a field programmable gate array ("FPGA"). Such configurable speed control allows transmitters to be differentiated by a receiver based on their differing speeds of rotation. The use of multiple transmitters, as is appreciated by those of ordinary skill in the art, enhances position detection. Other advantages are obtained through the use of programmable electronics (FPGAs, flash memory, etc). Not only can the desired speed be set by changing the clock to the phase locked loop that controls the speed of rotation of the optical head, but the overall gain of the control loop can be programmed to maximize performance at the velocity of interest.

C. Beam Type and Number

As described in the incorporated provisional and known in the art, position detection is also enhanced by using multiple beams and controlling the shape of those beams. These beams may be in the same rotating head assembly or in separate rotating head assemblies.

Two beams is the preferred number per rotating head assembly, however, more beams can be used. In particular, another embodiment uses four beams, two for short range and two for long range. The two short-range beams have fan angles as large as possible. This allows the user to operate near the transmitters, such as in a room. For long-range, the user would normally be operating away from the transmitters. Therefore, in that circumstance the vertical extent of the beams is reduced to maximize the range of the system. The beams are, preferably, generated by Class III lasers. However, the rotation of the beams reduces their average intensity to the fixed observer such that the transmitters can be classified as Class I laser devices. Safety features are integrated into the device to prevent the powering of the lasers when the rotating head is not in motion. In the preferred embodiment at least two interlocks are utilized. The first depends on the phase lock loop that controls the rotational speed of the motor driving the optical head. The lasers are turned off until the system is rotating in phase-lock for at least 1024 phase-clock-cycles (approximately 32 revolutions). The second interlock monitors the absolute speed of the motor using the once-per-rev index on the encoder. A tolerance is programmed into the system, currently 1-part-in-1000. When the velocity is outside that window the laser is disabled and not allowed to operate.

D. Beam Shape

The Transmitter allows flexibility in setting beam characteristics as needed for the specific application of the invention. One advantage is that the beam shape can be modified. The key is that the beam shape should correspond with correctly filling the desired three-dimensional workspace. For construction trades this might be a room 20 m×20 m×5 m in size. For construction machine control this might be a space 100 m×100 m×10 m in size. By modifying the beam shape, the optical energy can be properly directed.

The beam shape can also be controlled to differentiate beams. This can be done for multiple beams on a given transmitter or on different transmitters. For a given transmitter, the beam of the first and second beams must be differentiated. One technique uses their relative position with respect to the strobe in time. Another technique is to assure that the beams have different widths ("beam width" or "divergence angle"). Then, for instance, the first beam could be the wider of the two beams.

Fanning the beam can be done using a variety of methods known in the art, including without limitation, rod lenses, pal lenses, and cylindrical lenses. The use of rod lenses offers a relatively simple approach, whereas the use of pal lenses offers greater control over the energy distribution. The beam typically is emitted from the source as a conical beam, then a collimating lens shapes the beam into a column, then the fanning lens fans the column.

Rod lenses can be used to increase control on divergence. One of the major advantages of rod lenses for line generation is that they do not directly affect the quality of the beam in the measurement direction (beam direction). Therefore, they should not affect the divergence of the laser beam as set by the collimating optics.

Pal lenses can be used to increase control of the energy distribution in the fan direction. PAL type lenses can even create "uniform" distributions, where the energy is uniform in the direction of the fan plane. A uniform distribution is often inefficient, however, if potential receivers are not uniformly distributed along the entire fan plane. In some implementations a focus must be created before the lens. In that implementation, the use of the PAL technique could affect the beam in the measurement direction.

Gaussian beams can also be used to maximize the performance of the receiver. Gaussian beams are symmetric beams in that the energy distribution across the divergence angle or beam width is symmetric. When a simple threshold technique is used in the receiver, it important that the pulses be symmetric and be without shoulders or sidelobes. It is also helpful if the distribution's shape does not change with range. There are several pulse shapes that meet many of these criteria. However, the Gaussian distribution meets all of these criteria. With symmetric pulses that do not have shoulders or sidelobes, the receiver will be able to detect the center of the beam. Non-symmetric pulses, conversely, can cause the receiver to falsely identify the exact time when the beam center intersects the receiver's optical detector.

E. Strobe

Additionally, the synchronization signal, mentioned above, is strobed and must be symmetric. Therefore, pulse shaping in the flash/strobe pulse generator for the synchronization signal is required. A square pulse with equal rise and fall times is one desired pulse shape. A Guassian shaped pulse similar in shape and duration to the pulse created by the scanning laser beams in an optical detector is another desirable shape. This pulse is preferably provided to a plurality of LEDs on the transmitter that are arranged to send out the synchronization pulse signal in a multitude of directions throughout the three-dimensional workspace. The light output of the LEDs is directly proportional to the current flowing through the LEDs. Because of the high currents involved in creating the strobe, a pulse-forming network must be used to assure that the current is a square pulse, or other symmetric pulse, as it passes through the diodes.

F. Communications and Control

A transmitter according to the present invention uses a serial port for communication and control. This allows calibration data and control parameters to easily be transferred. Recall that the transmitters are differentiated by their speeds. Therefore a technique must be put in place to simplify speed changes. Additionally, a particular set of transmitter parameters must be made available to the receiver so that the receiver can calculate position based on the signals received from the transmitter. To create a simple, reliable, and unified technique the preferred embodiment uses serial communication between the transmitter and the receiver or test equipment. For test purposes, the serial connection is a well-known RS-232 connection. For use in the field, the connection is preferably through an infrared serial port. This allows the transmitter to be sealed and yet communicate with the outside world. To avoid interference with the measurement technique, this port is only active when the lasers are off.

G. VHDL

Many of the digital designs of a disclosed embodiment are implemented in field programmable gate arrays (FPGAs). These devices allow complex designs to be programmed into general-purpose hardware available from multiple vendors. The programs for these devices are written in a special computer understandable language VHDL (VHSIC [very high-speed integrated circuit] Hardware Description Language). This is the same language that is used to design microprocessors and other semiconductor devices and is now standardized as IEEE 1076.

H. Providing Power to the Laser Head

As explained in the incorporated provisional application, the motor and the provision of power to the rotating head assembly are key components of a transmitter according to the preferred embodiment. For accuracy in position fixing with the applicants' apparatus, it is imperative that the laser beams rotate with a precisely constant angular velocity. Any mechanical or electrical component that may cause angular velocity to vary must be avoided.

A rotary transformer is used to transfer electrical power to the rotating head of the transmitter. Several techniques are available for powering devices in a rotating head. The most common is the use of slip rings. Unfortunately, slip rings require physical contact between the brushes and the slip-ring. This creates dust in the system and can cause time varying friction on the motor shaft. The preferred technique is to use a rotating transformer. The transformer technique will provide minimal drag on the motor that does not vary through the rotaton of the optical head and which therefore will not cause changes in the angular velocity of the head during one revolution. Additionally, through the use of flat signal transformers as power transformers, the technique is very compact.

Fly-back control is used on the stator side of the transformer. To minimize the number of components in the rotating head, the voltage control is performed on the stator side of the transform. To optimize efficiency, a fly-back driving technique is utilized.

I. Stability and Precision of Rotation

The stability of the rotational velocity control system and drive motor is also discussed in the incorporated provisional application. As those of ordinary skill in the art will recognize, a brushless sine wave drive motor is a low-cost motor with good inherent stability intra-revolution and, as such, is useful in ensuring constant velocity rotation. Inertia of the rotating head is another important factor in achieving the required stability of angular velocity.

The bearing separation should be maximized to achieve optimal results. Any precession and wobble (wow and flutter in a turntable) will be a source of error in the system. It will lead directly to an error in the "z" direction. Using two precision bearings and maximizing the distance between the bearings can minimize these errors.

The strobe pulses of the synchronization signal are based on a once-per-revolution indicator tied to the motor shaft. There are many ways to create this shaft position index. The simplest and preferred technique is to use the index normally supplied with an optical encoder. This separate output of the encoder is directly equivalent to a shaft position index. An optical encoder disk is used to give rotation information. Other devices, including without limitation, tachometers and synchros could be used.

The optical encoder disk is typically made of glass and has a series of radial marks on it which are detected as the disk rotates. Additionally, the disk typically has a single "index" mark of a different radius which is used to detect complete rotations. The disk system produces a square wave with a frequency dictated by the speed with which the radial marks are passing. For example, if the disk is rotating at 1 revolution/second, a 1000 mark disk system would produce a 1000 Hz square wave (1000 radial marks/revolution*1 revolution/second=1000 Hz).

The speed of the motor is controlled through a feedback phase-locked loop ("PLL") system. The disk system square wave is one input and a clock from the transmitter system is the other input. The transmitter clock has a selectable frequency. The output of the PLL is used to control the speed of the motor rotation such that the PLL remains locked at the selected frequency.

The index mark of the disk can also be used to initiate the strobe pulse as often as once per revolution.

J. Low Manufacture Cost

As noted above, for the receiver to use the signals from the transmitter to accurately and precisely fix a position in the three-dimensional workspace, the receiver must have available a certain set of parameter characteristic of the transmitter. For example, as will be explained in detail below, the receiver must know the angles at which the laser beams are emitted from the transmitter head.

If these angles are pre-defined and the transmitter must then be manufactured with precision to match the specified parameters, it becomes extremely expensive to manufacture the transmitter. Under the principles of the present invention, the transmitter can be manufactured without such high precision and without requiring that the resulting transmitter conform to pre-specified parameters. Rather, the operating parameters of the transmitter required by the receiver are carefully measured after the transmitter is manufactured. This process, which will be referred to as transmitter calibration herein and described in more detail below, removes the expensive requirement of a precisely constructed transmitter. Consequently, the system of the present invention becomes much less expensive.

The operating parameters of the transmitter are preferably stored electronically in the each transmitter after that transmitter is calibrated. Consequently, each transmitter preferably incorporates a memory device in which the calibration parameters can be stored. These parameters can then be communicated to the receiver electronically through the serial port, optical or wired, of the transmitter described above. The receiver will have a corresponding serial port, optical or wired, for receiving data from the transmitter.

Preferably, these parameters are then stored in memory in a Position Calculation Engine (PCE) of the receiver and can be updated as required. For example, if a new transmitter is added to the system, then a new set of parameters needs to be loaded into the PCE from or for that transmitter. As an additional example, if the rotation speed of a transmitter is changed, then this information needs to be updated in the PCE.

2. Receiving Instrument

In the present system, the receiver or receiving instrument is a wand, an example of which is illustrated in FIG. 17. The wand provides a light-weight, mobile receiving instrument that can be carried anywhere within the three-dimensional workspace. A tip of the wand is used as the point for which position within the workspace is determined based on the signals received from the system transmitter. The position of the tip can be continuously calculated by the receiver and displayed for the user on a display device provided on the receiver. Consequently, no extensive training is required to operate the position fixing system of the present invention once the system is set up and functioning.

The wand preferably contains two receivers, which are light detectors if the transmitter is emitting optical signals as in the preferred embodiment. The Position Calculation Engine ("PCE") of the receiving instrument is a processor that performs most of the computations of the receiving instrument. The PCE supports any required set-up procedure as well as the subsequent tracking, position calculation, and information display functions. The receiving instrument and PCE will be described in detail below.

The Smart Tip, shown in FIG. 17, can also perform computations, as indicated by the FPGA (field-programmable gate array) and the "i Button" in each Smart Tip. The Smart Tip can be present at either end of the wand in the present system and the signal "Tip Present" indicates whether there is a Smart Tip on each of the receiving instrument ends.

3. Setup

The setup procedure is described in detail below. The setup procedure places the transmitters in position and commences their operation. The setup procedure also allows the system to, among other things, define a useful coordinate system relative to the three-dimensional workspace and begin tracking the wand's location in that coordinate system.

BRIEF DESCRIPTION OF THE DRAWINGS

The above described novel aspects of applicants' improved apparatus and methods for position measurements can be better understood with reference to the attached drawings, in which:

FIG. 17A is an illustration of a receiving instrument for a position measuring system according to the present invention;

FIG. 23B is a continuation of the flowchart for Software Object PulseTrackManager::Update of FIG. 23 A;

FIG. 24 is a flowchart for Software Object PulseTrack::Synchronize which is executed by the receiving system according to the present invention;

FIG. 31-1 is an illustration of a system according to the present invention which is being initialized using Least Squares Resection method;

FIG. 31-2 is a mathematical illustration of a step in the Least Squares Resection method of initializing a position measuring system according to the present invention;

FIGS. 32-1 and 32-2 are illustrations of a system according to the present invention which is being initialized using a Quick Calc Method which is part of the present invention;

FIG. 32-3 is a mathematical illustration of a step in the Quick Calc Method of initializing a position measuring system according to the present invention;

FIG. 32-4 is an illustration of a first transmitter identified in the Quick Calc Method;

FIGS. 32-5, 32-6, 32-7, 32-8, 32-9, 32-10, 32-11 and 32-12 are a mathematical illustrations steps in the Quick Calc Method of initializing a position measuring system according to the present invention;

DETAILED DESCRIPTION OF THE PREFERRED EMBODIMENTS

The preferred embodiments of the present invention will now be described in detail with reference to the drawings.

1. The Transmitter

A. Physical Description

Figure 1:
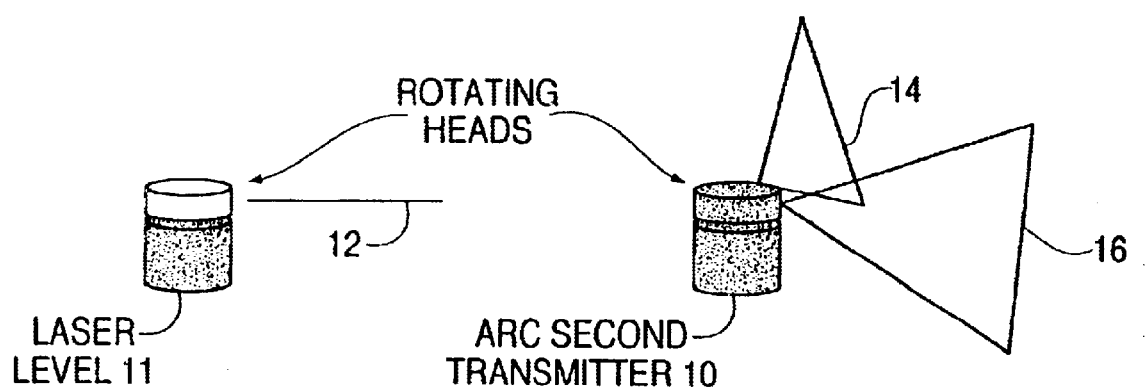
FIG. 1 is an illustration of an improved optical transmitter according to the present invention, contrasted with a conventional rotating laser.

With reference to FIG. 1, a transmitter (10) according to the present invention is a device physically similar to a rotating laser (11), which is also illustrated in FIG. 1 for comparison. However, a conventional rotating laser (11) has a single rotating spot beam (12) that is swept through a plane as the head of the laser (11) rotates. In contrast, the transmitter (10) of the present invention emits two rotating fan beams (14 & 16). These fan beams (14 & 16) sweep through the three-dimensional workspace within which the system of the present invention can fix the position of the receiving instrument.

Figure 2:
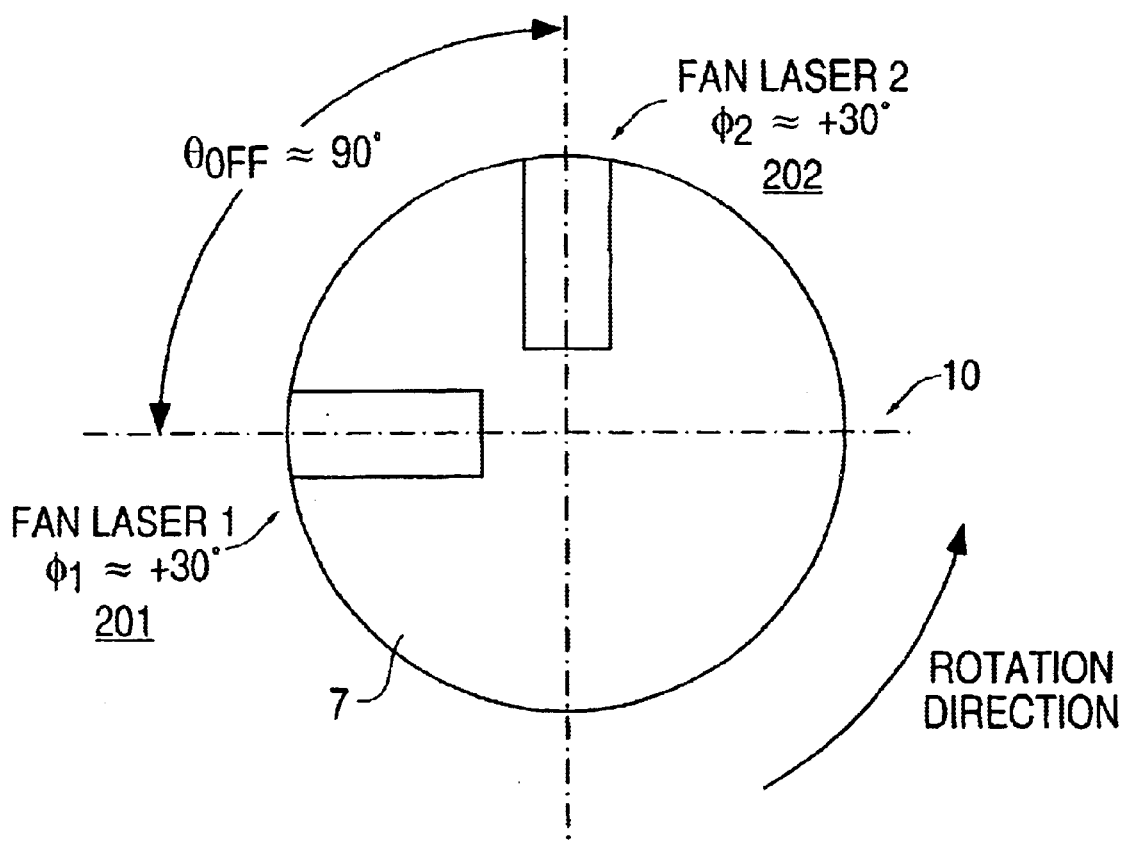
FIG. 2 is a schematic plan and sectional views illustrating the preferred embodiments of the optical transmitter apparatus of FIG. 1 according to the present invention.

FIG. 2 shows the preferred assembly of the transmitter (10), particularly the rotating head (7) of the transmitter (10), according to the present invention. As shown in FIG. 2, the rotating head (7) of the transmitter (10) includes two fan lasers (201 & 202). There are three important angles in the Fig.: $\theta_{Off}$, $\phi_1$, and $\phi_2$. $\theta_{Off}$ describes the angular separation between the two laser modules (201 & 202) in the rotating head (7) as viewed from above the transmitter (10). The lasers (201 & 202) are preferably disposed with optical axes at approximately 90° to each other. $\phi_1$, and $\phi_2$ describe the tilt of the fan plane of the lasers (201 & 202), respectively, with respect to a vertical plane. As shown in the lower portion of FIG. 2, these two angles are measured from vertical, and are nominally set to −30° for beam 1 and +30° for beam 2. We explain the sign convention for these angles below. As described above, the actual values for $\theta_{Off}$, $\phi_1$, and $\phi_2$ are determined through a factory calibration process and need not conform exactly to the preferred values described herein.

As the transmitter head (10) rotates, it scans the measurement field more fully described hereafter with the two planes of light (14 & 16) emitted by the fan lasers (201 & 202). The receiver or receiving instrument (24, FIG. 12) is illuminated by each laser's fan plane (14 & 16) exactly once during a rotation of the head (7).

In addition to this scanning operation, the transmitter (10) also fires an optical strobe as a synchronization signal to the receiver (24). The strobe is fired from a plurality of LED's (6, FIG. 3) disposed to emit light at a variety of angles from the transmitter (10) so as to cover the three-dimensional workspace. The synchronization signal is emitted at a fixed point in the head's revolution so as to be emitted once per revolution of the transmitter head (7). The strobe illuminates the receiver (24) and is used to provide a zero reference for the rotation of the head (7). This scanning of the fan beams (14 & 16) and the strobed synchronization signal process provides the basis for the position measurements made by the receiver which will be described in more detail below.

Each transmitter (10) in the system rotates at a known and unique rate. This unique rotational rate allows the software in the receiver to differentiate between the transmitters surrounding the three-dimensional workspace. Knowing the speed of each transmitter and a zero point for the rotation of that transmitter given by the synchronization signal, the receiver knows when at what interval and time to expect to detect the first and second fan beams (14 & 16) emitted by any particular transmitter (10). Thus, beams detected at the expected interval and timing can be assigned as having come from a particular transmitter in the system based on the operating parameters of that transmitter known by the receiver, i.e., communicated to the receiver in the calibration processes mentioned above.

B. Low Cost Transmitter Detailed Description

Figure 3:
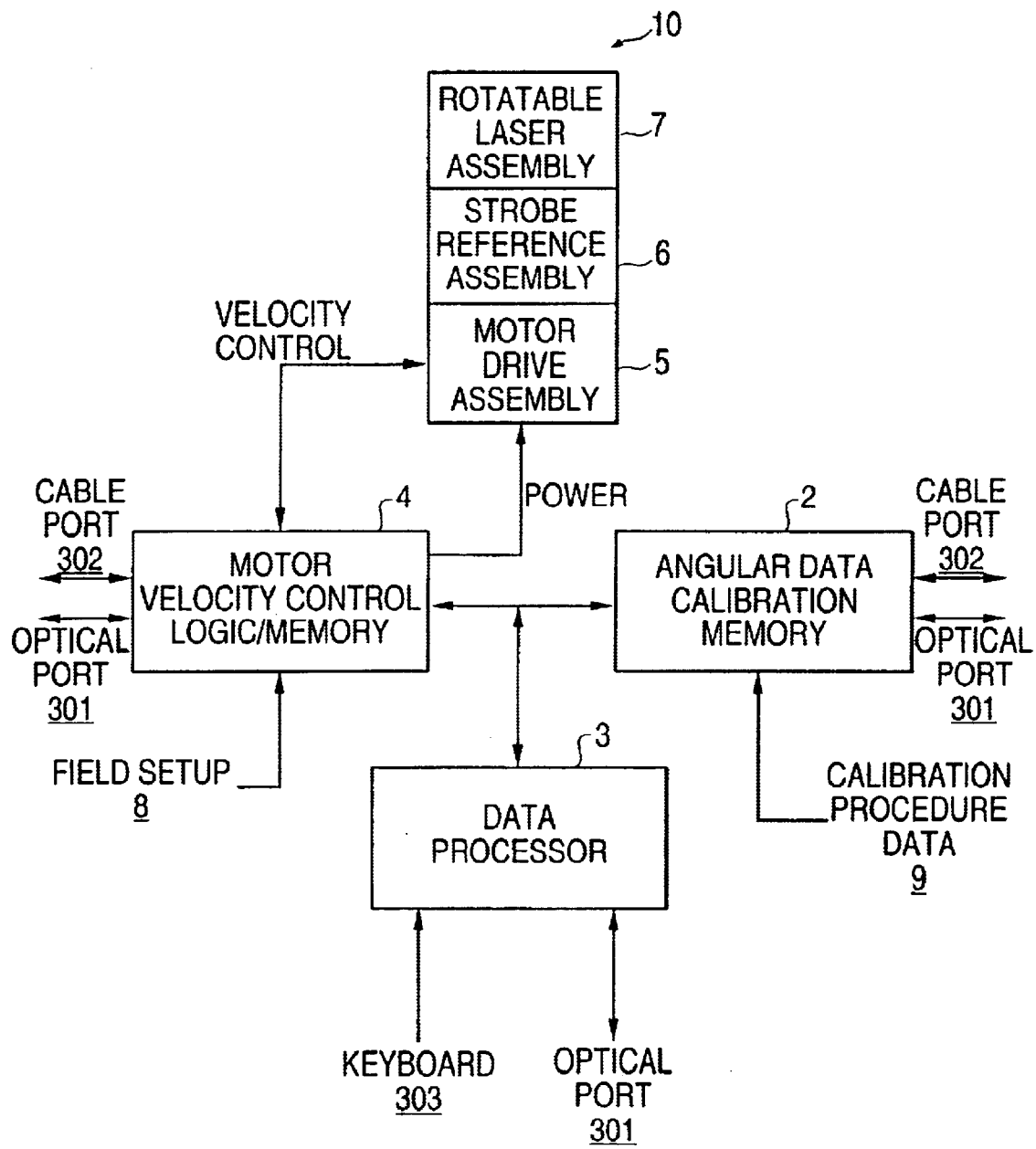
FIG. 3 is a block diagram of the improved optical transmitter for a position location system and method according to the present invention.

An improved, low cost optical transmitter useful in a three dimensional measurement system in accordance with several novel aspects of applicants' invention is illustrated in the logic block diagram of FIG. 3. Throughout the specification and drawings, like numerals are used to designate like elements.

As shown in FIG. 3, a transmitter (10) of the present invention preferably includes the rotating head (7) and synchronization or reference signal emission assembly (6) as described above. A motor drive assembly (5) drives the rotating head (7).

As noted above, the speed of the rotating head is used by the receiver (24) to recognize the transmitter emitting a particular pair of fan beams (14 & 16). Therefore, a motor velocity control circuit (4) is provided to provide power to and regulate the velocity of the motor drive assembly (5).

As described above, in order to achieve a low cost optical transmitter (10) and method, the present invention preferably relies on a calibration procedure performed during the manufacture/assembly process to generate unique data for characterizing each optical transmitter (10) rather than employing a much higher cost precision assembly process. Specifically, angular calibration data is generated during the manufacture/assembly process that includes $\theta_{Off}$, $\phi_1$, and $\theta_2$ (as defined above) for each transmitter (10). $\theta_{Off}$ describes the angular separation between the two laser modules (201 & 202) in the rotating head (7) of each transmitter, and $\phi_1$, and $\phi_2$ describe the tilt of the fan plane of the lasers (201 & 202) in each transmitter (10), respectively, with respect to a vertical plane.

This angular calibration data (9) is preferably stored in calibration data memory (2). In addition, data defining the setting for the rotational velocity can be preloaded during the manufacturing process and loaded into calibration data memory (2) or variable motor control memory (4). If the rotational velocity is adjusted by the user, the new rotational velocity value will be recorded in the data memory (2) or the motor control memory (4).

A data processor (3) is also provided to control the motor velocity control unit (4) and the data calibration memory (2). The data processor (3) is preferably connected to a user interface (303), such as a keyboard, so that the calibration data can be entered for storage in the calibration memory (2) or so that the angular velocity of the motor drive assembly (5) can be changed and the new value stored in the appropriate memory (4 and/or 2).

Alternatively, during field setup, data (8) that sets the velocity of the motor drive assembly (5) may be input directly to variable motor control unit (4) using a cable port (302) or optical port (301) of the transmitter. That velocity calibration data must likewise be stored in memory (4 and/or 2). Likewise, calibration data (9) can be entered directly to the calibration memory (2) through a cable port (302) or optical port (301) of the transmitter.

Figure 12:
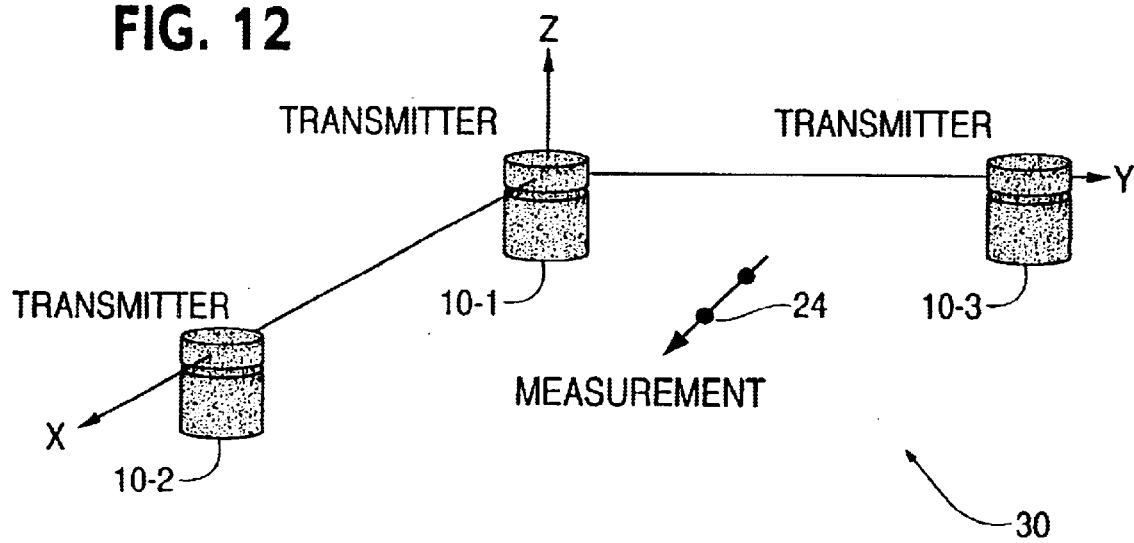
FIG. 12 is an illustration of a three-transmitter position measurement system according to the present invention.

As shown in FIG. 3, the processor (3), calibration memory (2) and velocity control logic/memory unit (4) each may be connected to the cable port (302) or optical port (301) of the transmitter so that data can be input or retrieved therefrom. Calibration data from the memories (2 & 4) can be output to the optical receiver (24; FIG. 12) in a measurement system of the present invention from the memory units (2 & 4) via the cable or optical output ports (302 & 301). As mentioned above, when a transmitter (10) is introduced into a measurement system according to the present invention, the calibration data for that transmitter (10) must be transferred to or loaded into the receiver (24; FIG. 12).

C. Mathematical Description

A mathematical model is now set forth that describes the physical scanning operation of the transmitter. We use this model in the next section to derive the position calculation algorithm.

Figure 4:
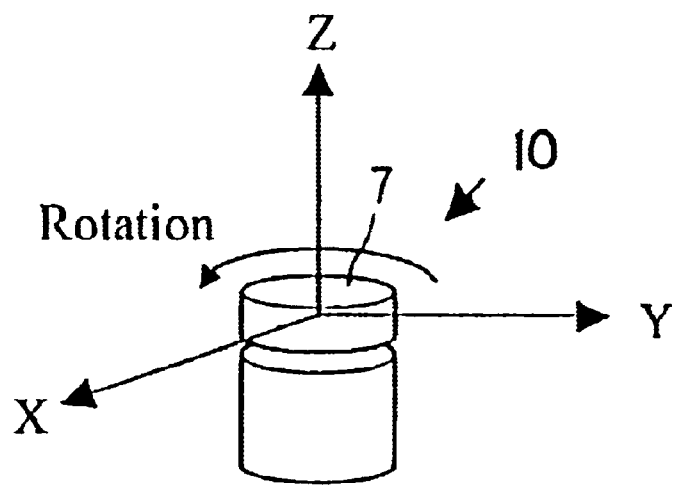
FIG. 4 is an illustration of the rotating optical head and corresponding frame of reference according to the transmitter of the present invention.

Physically, the scanning operation of the transmitter (10) is accomplished with the two laser fan beams (14 & 16) described above with reference to FIGS. 1 and 2. Each of the fan beams (14 & 16) will be considered individually in this mathematical model. To build this model, we first define the transmitter's reference frame as shown in FIG. 4. Each transmitter (10) has its own local reference frame, and these reference frames are different from the user's reference frame as will be explained hereinafter. The reference frames of the various transmitters (10) in the system will be related to the user's reference frame as described below. As can be seen in FIG. 4, the head (7) preferably rotates in the positive direction about the z-axis according to the right hand rule.

Figure 5:
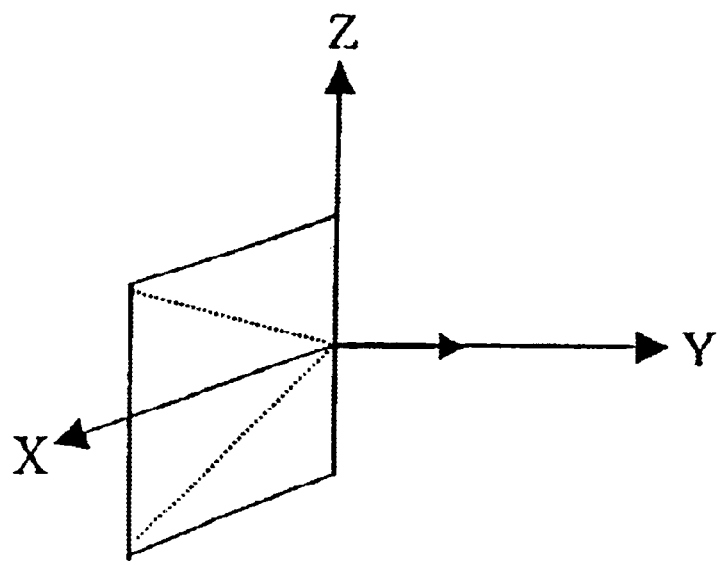
FIG. 5 is a graphic representation of a fan beam according to the present invention.

To describe the scan of a fan beam, we start with a vertical plane at y=0, i.e. a plane in the x-z axis as shown in FIG. 5. Mathematically, the plane can be uniquely represented by a vector normal to its surface. This plane corresponds to the plane in which light would be emitted by a fan laser that is oriented vertically. In FIG. 5, the plane of the fan beam is drawn as square, but in actuality the plane has a finite angular extent as shown by the dotted lines. This angular extent does not affect the mathematical model, but it does impact the angular field of view of the transmitter (10). The vector defining this plane is given below.

$$\text{Plane defined by} \begin{bmatrix} 0 \\ 1 \\ 0 \end{bmatrix}$$

Figure 6:
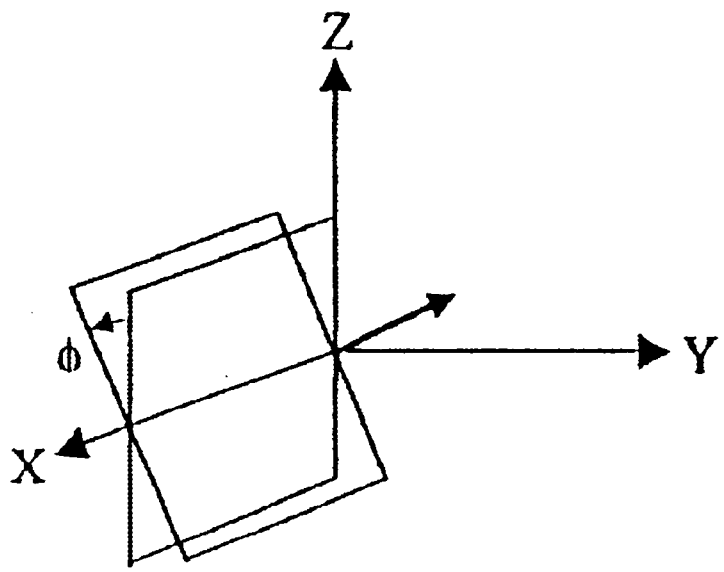
FIG. 6 is a graphic representation of the fan beam of FIG. 5 rotated about the x axis.

As shown in FIG. 6, we next rotate this vertical plane about the x-axis by an angle $\phi$. This new plane represents a fan laser as inserted into the head of the transmitter (10). $\phi$ is the physical slant angle described in the previous section. Each fan beam emitted from the transmitter (1) will have a different $\phi$, which is one of the calibration parameters determined during manufacture and communicated to the receiver (24) for use in calculating position. A positive $\phi$ is a right-handed rotation about the x-axis, as shown in FIG. 6.

$$\begin{bmatrix} 1 & 0 & 0 \\ 0 & \cos\phi & -\sin\phi \\ 0 & \sin\phi & \cos\phi \end{bmatrix} \begin{bmatrix} 0 \\ 1 \\ 0 \end{bmatrix} = \begin{bmatrix} 0 \\ \cos\phi \\ \sin\phi \end{bmatrix}$$

Figure 7:
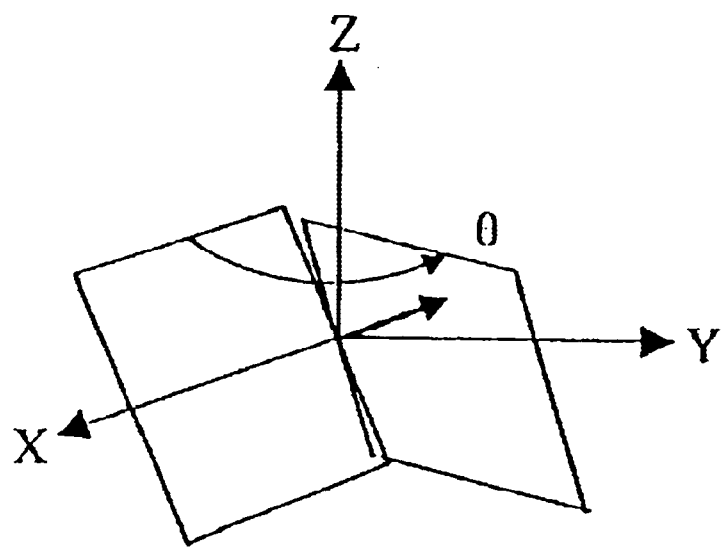
FIG. 7 is a graphic representation of the fan beam of FIGS. 5 & 6 further rotated about the z axis.
Figure 13:
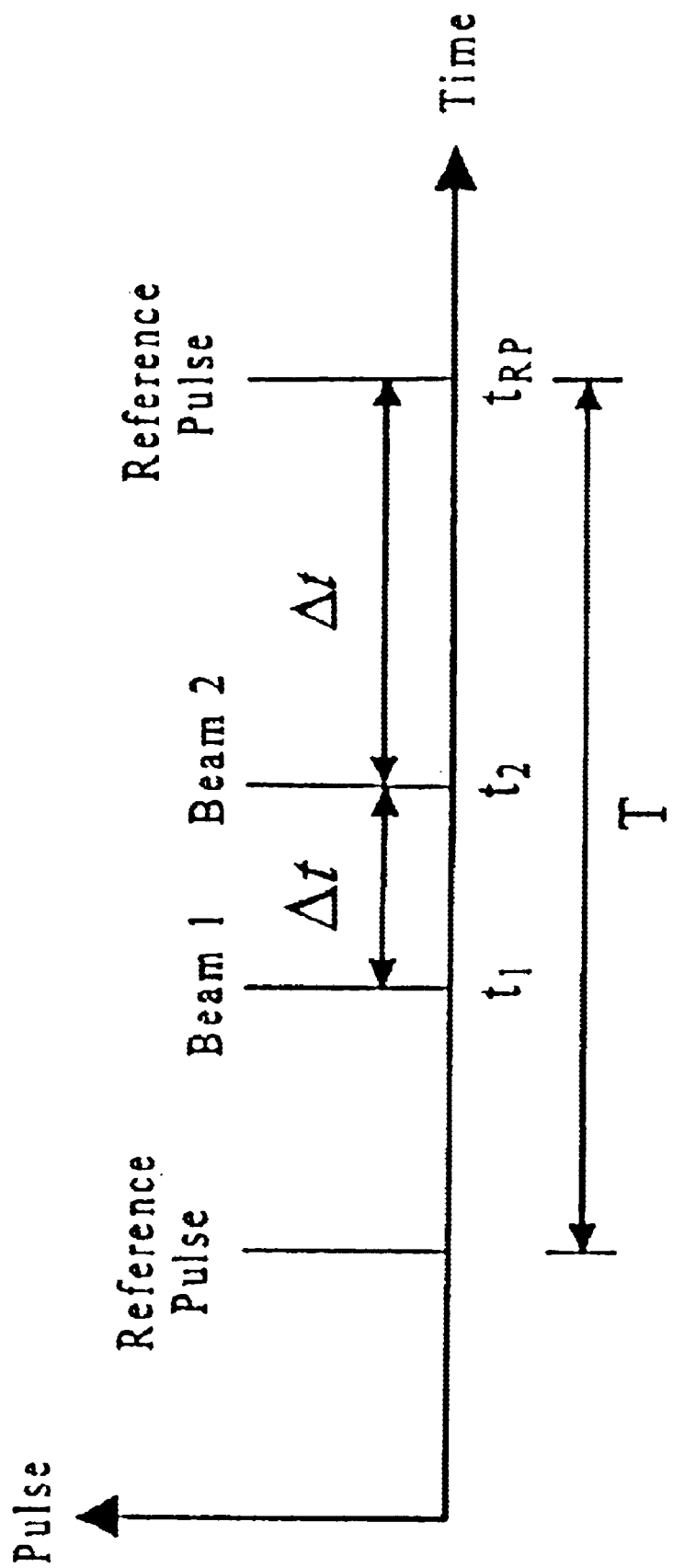
FIG. 13 is a linear time plot of a typical pulse sequence for pulses from an optical transmitter according to the present invention.

As shown in FIG. 7, we rotate this new plane about the z-axis by an angle $\theta$. This angle is actually a function of time because it represents the location of the fan beam as the transmitter head (10) rotates about the z-axis, i.e. $\theta(t)$ is the scan angle at time t as shown in FIGS. 7 and 13.

$$\begin{bmatrix} \cos\theta(t) & -\sin\theta(t) & 0 \\ \sin\theta(t) & \cos\theta(t) & 0 \\ 0 & 0 & 1 \end{bmatrix} \begin{bmatrix} 0 \\ \cos\phi \\ \sin\phi \end{bmatrix} = \begin{bmatrix} -\cos\phi\sin\theta(t) \\ \cos\phi\cos\theta(t) \\ \sin\phi \end{bmatrix}$$

Figure 8:
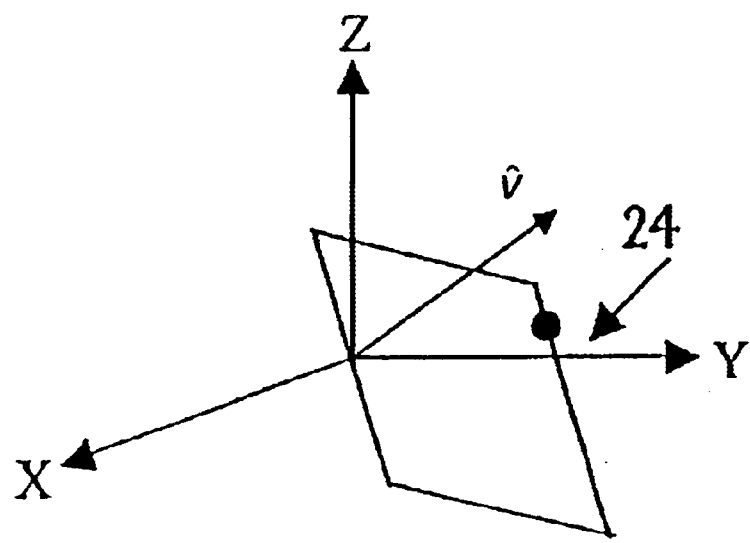
FIG. 8 is a graphic representation of the plane of the fan beam intersecting a detector according to the present invention.

In the position calculation algorithm as hereinafter explained, this vector expression represents the laser fan plane at the point in time when it intersects the detector (24) as shown in FIG. 8. We call this vector expression $\hat{v}$.

$$\hat{v} \equiv \begin{bmatrix} -\cos\phi\sin\theta(t) \\ \cos\phi\cos\theta(t) \\ \sin\phi \end{bmatrix}$$

For each rotation of the transmitter head, the receiver system (24), as described below, calculates two $\hat{v}$ vectors, $\hat{v}_1$ and $\hat{v}_2$, that describe the location of the two fan beams from each transmitter (10) at their intersection point with the detector (24) (See FIG. 12). Since $\phi$ is a constant determined through factory calibration, each $\hat{v}$ vector depends solely on its corresponding scan angle $\theta$, which in turn depends on timing measurements made by the receiver system (24) using the synchronization signal concurrently emitted by the transmitter (10).

2. Position Calculation

There are two possible methods we can use to calculate the position of a llight detector on the receiver (24) or receiving instrument of the present invention: the theodolite network method and the preferred non-theodolite transmitter method. In the receiving instrument of the present invention, the non-theodolite method is used because it is faster and more suited to the transmitter's unique design. For purposes of comparison, we will briefly discuss the theodolite network method first before presenting the preferred non-theodolite method.

Figure 9:
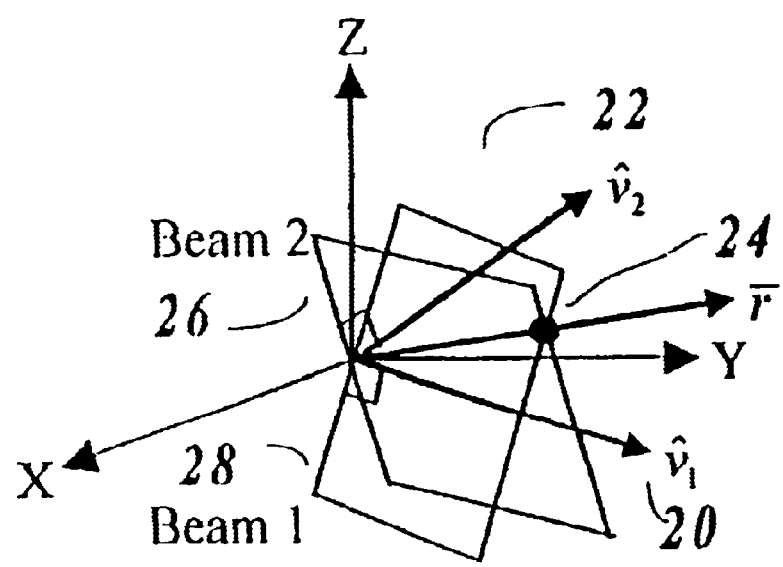
FIG. 9 is a graphic representation of the planes of two fan beams intersecting a detector according to the present invention.
Figure 10:
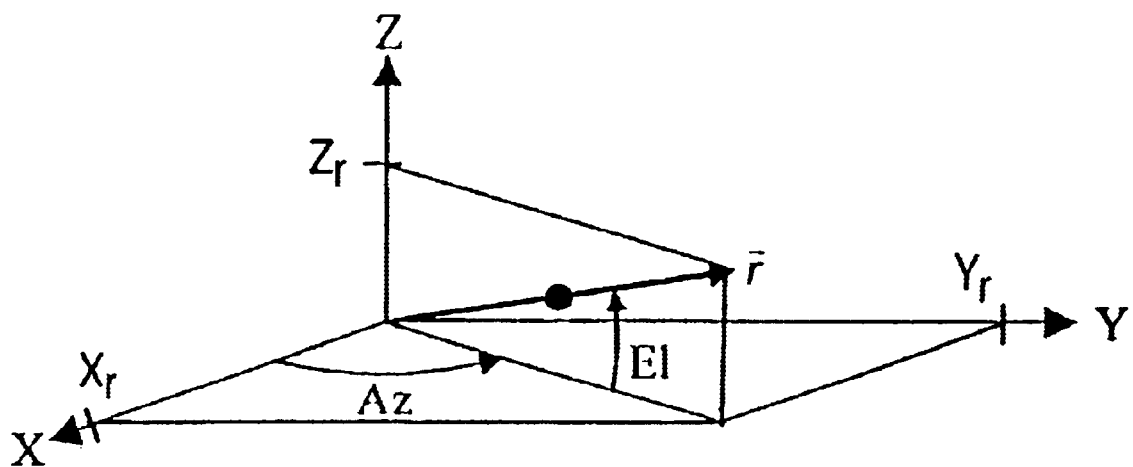
FIG. 10 is a Cartesian plot of vectors representing intersecting fan beam planes according to the present invention.

To use the theodolite network method, the receiver system would calculate the intersection between the measured azimuth-elevation vectors from each transmitter (10) to a signal detector as illustrated in FIG. 10. FIG. 9 shows both fan planes (26 & 28) of the respective fan beams (14 & 16) at their point of intersection with the light detector on the receiver (24). The fan planes (26 & 28) intersect one another in a line, and this line is a vector $\vec{r}$ that passes through the light detector:

$$\vec{r} = \hat{v}_1 \times \hat{v}_2$$

Again, while $\vec{r}$ passes through the light detector, there is no information about the length of $\vec{r}$ from the vectors $\hat{v}_1$ and $\hat{v}_2$. Therefore, we can only calculate the azimuth and elevation of this vector relative to the transmitter's reference frame as shown in FIG. 10 and expressed in the following equations:

$$az = \tan^{-1}\left(\frac{y_r}{x_r}\right)$$

$$el = \tan^{-1}\left(\frac{z_r}{\sqrt{x_r^2 + y_r^2}}\right)$$

FIGS. 9 and 10 illustrate the limitation of the theodolite method, i.e. it is only possible to determine two dimensions of the three dimensional distance between a single transmitter and the receiver system (24). We can determine the two angles to the receiver (24), i.e. azimuth and elevation, but not the distance.

The next step in the theodolite network method is to calculate $\vec{r}$ vectors for all transmitters in the workspace and then calculate the intersection of these vectors. If the baseline between the two transmitters and the angles to a receiver from each transmitter are known, the position of the receiver can be calculated.

In the preferred non-theodolite method, we take direct advantage of the transmitter's scanning operation, rather than treating the transmitters as theodolites. In FIG. 11, we once again illustrate a single fan plane intersecting with the detector on a receiver (24). Vector $\vec{a}$ is the detector's position relative to the transmitter's origin. From FIG. 11, we may make the important mathematical observation:

$$\hat{v} \cdot \vec{a} = 0$$

The dot product is zero because these vectors are orthogonal to one another at the point when the beam plane intersects with the detector. $\hat{v}$ is perpendicular to the plane by definition, and $\vec{a}$ is contained within the plane when the plane intersects the detector. As we illustrated in FIG. 9, we have two fan planes represented by $\hat{v}_1$ and $\hat{v}_2$, so we actually have two equations per transmitter (10):

$$\hat{v}_1 \cdot \vec{a} = 0$$

$$\hat{v}_2 \cdot \vec{a} = 0$$

$\vec{a}$ contains three unknowns, (x, y, z), so once again we do not yet have enough information to calculate the third dimension. Adding a third fan beam to the transmitter (10) would add a third row to the equation, but this equation would not be linearly independent from the first two. Hence, we must add at least one additional transmitter to the system which is at a separate location from the first transmitter.

In FIG. 12, we have placed one transmitter (10-1) at the origin, a second transmitter (10-2) along the x axis, and a third transmitter (10-3) along the y axis. Only two transmitters are strictly required for operation of the system according to the present invention. However, three are illustrated here to indicate that additional transmitters can be used to improve the accuracy of the position determinations made by the system. The axis setup illustrated is arbitrary but is used to show that the transmitters are tied together in a common reference frame. As previously discussed, we call this common frame the user's reference frame to differentiate it from the transmitters' reference frames described previously.

Since we wish to calculate the location of a point in the user's reference frame, we need to specify each transmitter's reference frame in terms of the user's reference frame. This is accomplished with a location vector $\vec{p}_{tx}$ and a rotation matrix $R_{tx}$ for each transmitter (10). We can then re-write the equation as:

$$R_{tx}\hat{v} \cdot (\vec{p} - \vec{p}_{tx}) = 0$$

In this new equation, $\vec{p}$ is the location of a detector on the receiving instrument (24) in the user's reference frame and is the value we wish to calculate. $R_{tx}\hat{v}$ is the vector describing the laser fan plane in the user's reference frame, whereas $\hat{v}$ itself describes the laser fan plane in the transmitter's reference frame. $\vec{p} - \vec{p}_{tx}$ is a vector from the transmitter's origin to the detector location in user's reference frame. For $n \geq 2$ transmitters, we have the following set of equations.

$$R_1 \hat{v}_{1,1} \cdot (\vec{p} - \vec{p}_1) = 0$$
$$R_1 \hat{v}_{1,2} \cdot (\vec{p} - \vec{p}_1) = 0$$
$$R_2 \hat{v}_{2,1} \cdot (\vec{p} - \vec{p}_2) = 0$$
$$R_2 \hat{v}_{2,2} \cdot (\vec{p} - \vec{p}_2) = 0$$
$$\vdots$$
$$R_n \hat{v}_{n,1} \cdot (\vec{p} - \vec{p}_n) = 0$$
$$R_n \hat{v}_{n,2} \cdot (\vec{p} - \vec{p}_n) = 0$$

The first subscript is the transmitter number and the second subscript on $\hat{v}$ is the laser beam number. In order to write this series of equations in matrix form so that we can solve for $\vec{p}$, we rearrange the equations as follows.

$$R_{tx}\hat{v} \cdot (\vec{p} - \vec{p}_{tx}) = 0.$$

$$R_{tx}\hat{v} \cdot \vec{p} - R_{tx}\hat{v} \cdot \vec{p}_{tx} = 0$$

$$R_{tx}\hat{v} \cdot \vec{p} = R_{tx}\hat{v} \cdot \vec{p}_{tx}$$

$$(R_{tx}\hat{v})^T \vec{p} = R_{tx}\hat{v} \cdot \vec{p}_{tx}$$

We note that $(R_{tx}\hat{v})^T$ is a 1×3 vector, $$\vec{p} = \begin{bmatrix} x \\ y \\ z \end{bmatrix},$$

and $R_{tx}\hat{v} \cdot \vec{p}_{tx}$ is a constant. We can then put the equations of these equations into the matrix form:

$$\begin{bmatrix} (R_1\hat{v}_{1,1})^T \\ (R_1\hat{v}_{1,2})^T \\ (R_2\hat{v}_{2,1})^T \\ (R_2\hat{v}_{2,2})^T \\ \vdots \\ (R_n\hat{v}_{n,1})^T \\ (R_n\hat{v}_{n,2})^T \end{bmatrix} \begin{bmatrix} x \\ y \\ z \end{bmatrix} = \begin{bmatrix} R_1\hat{v}_{1,1} \cdot \vec{p}_1 \\ R_1\hat{v}_{1,2} \cdot \vec{p}_1 \\ R_2\hat{v}_{2,1} \cdot \vec{p}_2 \\ R_2\hat{v}_{2,2} \cdot \vec{p}_2 \\ \vdots \\ R_n\hat{v}_{n,1} \cdot \vec{p}_n \\ R_n\hat{v}_{n,2} \cdot \vec{p}_n \end{bmatrix}$$

The shorthand matrix notation is:

$$A_{2n \times 3} \vec{p}_{3 \times 1} = \vec{b}_{2n \times 1}$$

where the subscripts indicate the dimensions of the matrices. In order to calculate the detector's position in the user's reference frame, we simply solve this equation for $\vec{p}$. To do this, we can apply least-squares reduction to the matrix by multiplying both sides by $A^T$. We would then use a standard square-matrix solve such as LU decomposition to find $\vec{p}$. Alternatively, we could also use Singular Value Decomposition to solve for $\vec{p}$ directly. SVD is the preferred method for finding a least-squares solution when the matrix is ill-conditioned.

3. Calculating the Scan Angles Using Timing Measurements

As previously discussed, the two $\hat{v}$ vectors from each transmitter (10) are based on the corresponding scan angles, $\theta_1(t)$ and $\theta_2(t)$, for the two laser fan beams (14 & 16) of the transmitter (10). We now discuss how the receiver system (24) calculates these two scan angles. Specifically, to calculate position for a single light detector on the receiver system (24), we need $\theta_1(t)$ and $\theta_2(t)$ for each transmitter (10) in the three-dimensional workspace (30).

A typical receiver system (24), to be described hereinafter with reference to FIG. 21, includes a physical tool or wand on which are a measurement tip and photodiode detector circuitry, a Position Calculation Engine (PCE), and a user interface. As the user moves the tool around in the workspace (30), the photodiode detector circuitry receives electrical pulses or strikes every time one of the planes of light or one of the optical synchronization strobes illuminates a light detector on the receiver (24). Using a high-speed timer, which preferably is built into the PCE, the system makes differential timing measurements between pulses. These timing measurements are then used to calculate the scan angles.

FIG. 13 illustrates a typical pulse sequence for a single rotation of the transmitter head (7). The time between reference pulses, as indicated by T, is the period of one transmitter head revolution. In FIG. 13, the reference pulse is preferably created by the optical strobe assembly (6, FIG. 3). Between each pair of reference pulses, the receiver system (24) makes two differential timing measurements, $\Delta t_1$ and $\Delta t_2$, for each rotation of the transmitter head (7). These timing measurements correspond to the times at which the light detector of the receiver system (24) detects each of the two fan beams from a transmitter (10).

Figure 14:
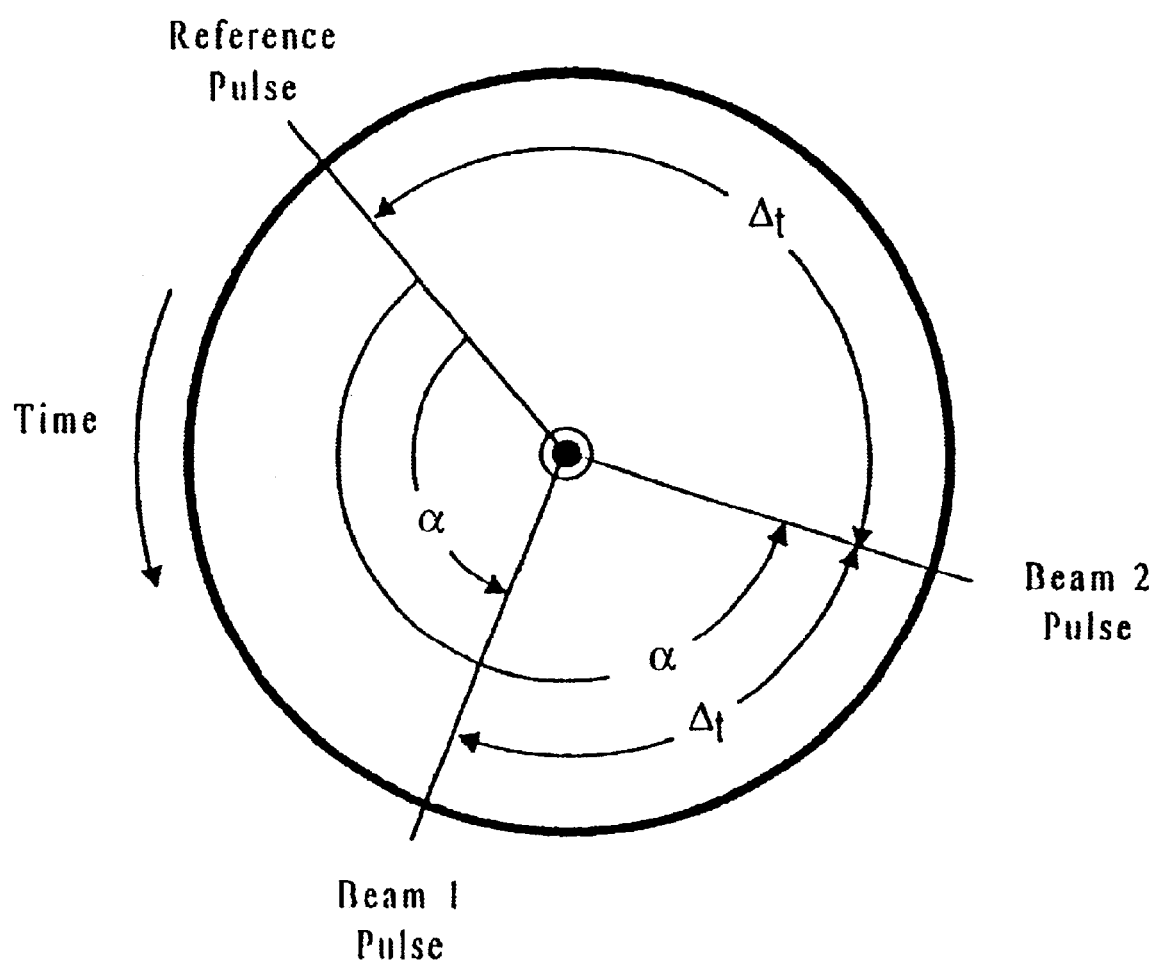
FIG. 14 is a time plot of the pulse sequence during a single rotation of an optical transmitter according to the present invention.
Figure 15:
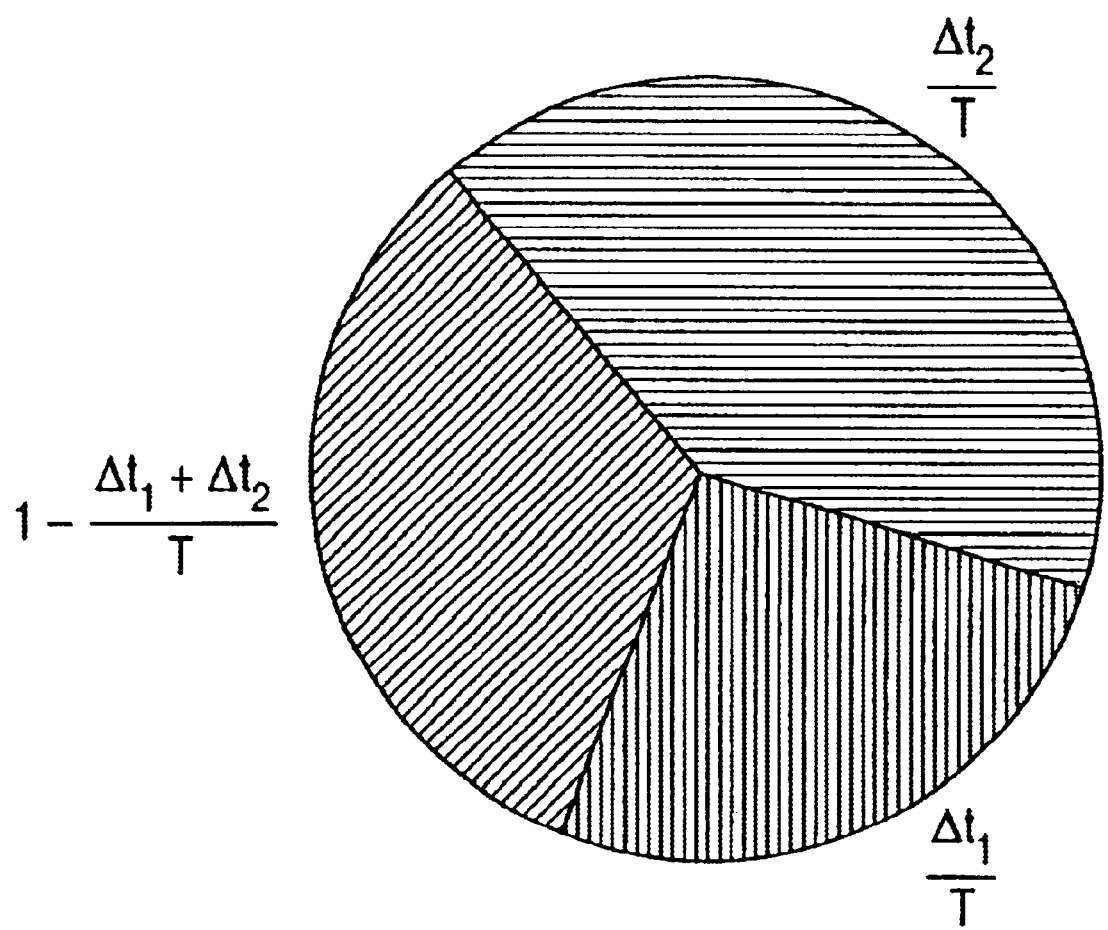
FIG. 15 is a graphical depiction of the pulses emitted during a single rotation of an optical transmitter according to the present invention.

FIG. 14 relates these time differences to angular differences. We take the above plot in time and view it as a circle of $2\pi$ radians representing one revolution of the transmitter head (7). We define two angular measurements, $\alpha_1$ and $\alpha_2$, as the angle between the optical reference signal detection pulse and the fan beam 1 and fan beam 2 detection pulses, respectively. The reader should not confuse this circle with the actual transmitter head. This circle shows a plot in time and angle as viewed by the llight detector on the receiver (24). Using the measured time intervals $\Delta t_1$ and $\Delta t_2$ and the fact that the transmitter completes one revolution in T seconds, we can calculate $\alpha_1$ and $\alpha_2$ by splitting the circle into fractions, as shown in FIG. 15.

Using these fractions and the fact that there are $2\pi$ radians in a single head revolution, we get the following equations for $\alpha_1$ and $\alpha_2$:

$$\alpha_1 = 2\pi\left(1 - \frac{\Delta t_1 + \Delta t_2}{T}\right)$$

$$\alpha_2 = 2\pi\left(1 - \frac{\Delta t_1 + \Delta t_2}{T} + \frac{\Delta t_1}{T}\right) = 2\pi\left(1 - \frac{\Delta t_2}{T}\right)$$

Note that the reason the time intervals are measured from beam 1 rather than the reference pulse is to provide backward compatibility in the receiver system software for other versions of a transmitter; however this could be changed as desired.

For two important reasons, $\alpha_1$ and $\alpha_2$ are not exactly equivalent to the $\theta_1$ and $\theta_2$ angles described in the transmitter model. First, in the model the two beams are not separated in azimuth. Rather, they scan together while overlapped as illustrated in FIG. 9. In the actual transmitter, we separate the two beams azimuthally on the head to so that the receiver system can differentiate between them. We define this angular separation $\theta_{Off}$ as described herein above. Therefore, we must subtract $\theta_{Off}$ from $\alpha_2$ to line $\alpha_2$ up with $\alpha_1$. $\theta_{Off}$ is determined through factory calibration and is part of the calibration data stored in memory (2: FIG. 3).

Figure 16:
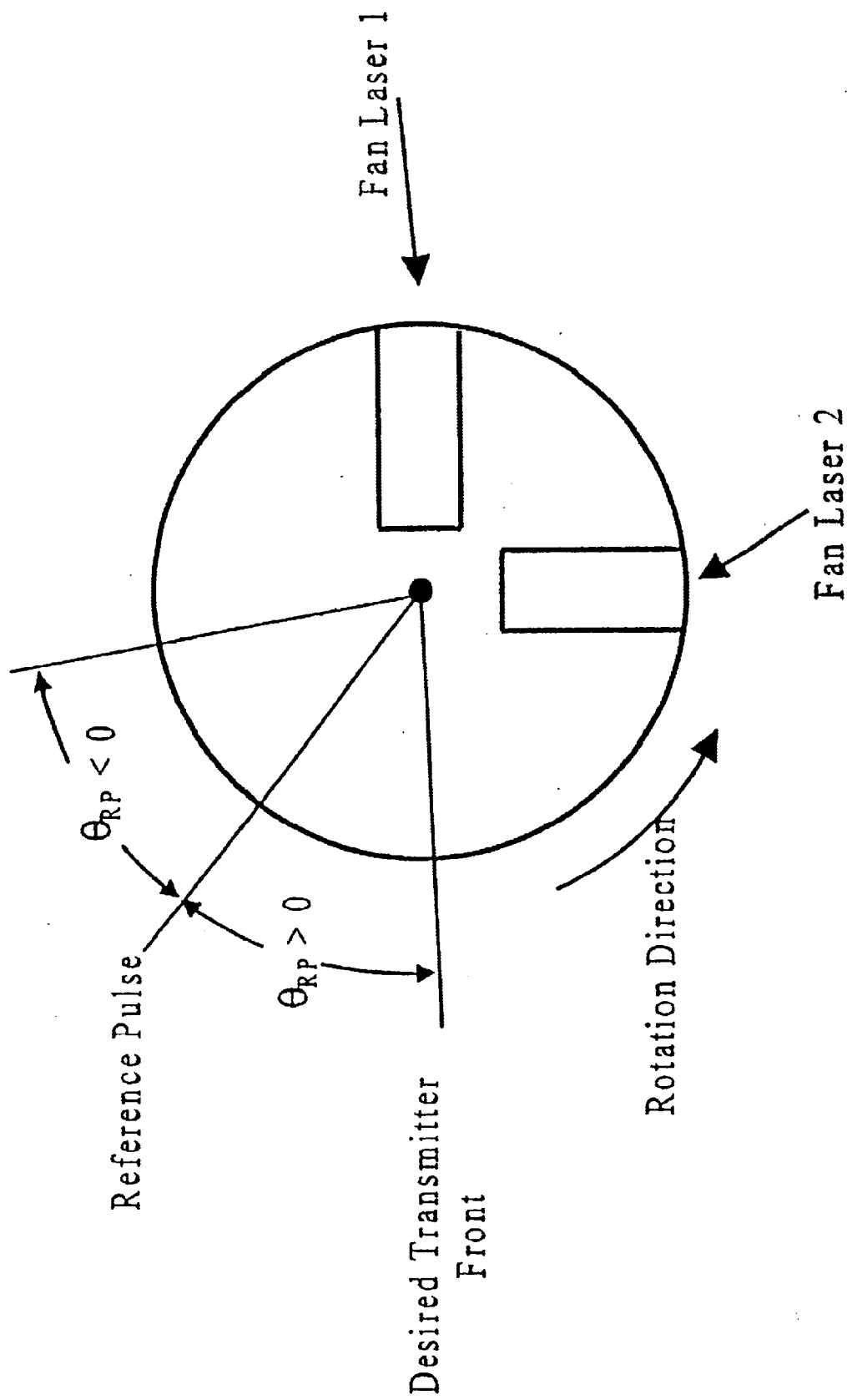
FIG. 16 is a plan view of the improved transmitter according to the present invention illustrating the preferred positioning of the transmitter front and the zero-azimuth plane of the improved transmitter.

Second, the $\alpha_1$ and $\alpha_2$ angles are measured relative to the reference pulse as shown in FIG. 14. If we relate this measurement to the transmitter model, then the front of the transmitter—its local x-axis—is the point in the head's rotation when the reference pulse fires. Therefore, the reference pulse also defines the zero-azimuth plane, since azimuth is measured from the transmitter's x-axis. If a single transmitter is to be used for azimuth and elevation calculations, it is sometimes desirable to set the point on the transmitter (10) where the detector's azimuth will be zero. We establish this set point with a factory-calibrated constant called $\theta_{RP}$. As shown in FIG. 16, $\theta_{RP}$ is the angular separation between the desired front of the transmitter and the occurrence of the reference pulse. The sign of $\theta_{RP}$ is determined as illustrated. For most transmitters, $\theta_{RP}$ is set to zero because azimuth-elevation measurements relative to a single transmitter are not required. Therefore, we convert $\alpha_1$ and $\alpha_2$ to the desired the scan angles, $\theta_1$ and $\theta_2$, by using the following equations:

$$\theta_1 = \alpha_1 + \theta_{RP}$$

$$\theta_1 = 2\pi\left(1 - \frac{\Delta t_1 + \Delta t_2}{T}\right) + \theta_{RP}$$

$$\theta_2 = \alpha_2 + \theta_{RP} - 1\theta_{Off}$$

$$\theta_2 = 2\pi\left(1 - \frac{\Delta t_2}{T}\right) + \theta_{RP} - \theta_{Off}$$

To summarize, these equations are used to calculate $\theta_1$ and $\theta_2$ values for each transmitter that illuminates a light detector on the receiving instrument (24). Therefore, if there are two transmitters (10) set up in the workspace (30), four $\theta$ angles will be calculated for each detector, and hence four $\hat{v}$ vectors will be calculated. Three transmitters would result in six $\hat{v}$ vectors, and so on. Using all of the calculated $\hat{v}$ vectors, the receiver system (24) then performs the matrix solve described above for each light detector on the receiving instrument (24). If more than one light detector is present on the receiving instrument (24) and spaced from the other light detectors on the instrument (24), more accurate position information can be obtained by individually and separately calculating the position of each light detector on the instrument (24) and using those results to define the position of a particular point, e.g., the wand tip, of the receiving instrument.

4. Receiving Instrument

In the spatial position measurement system shown in FIG. 12, the receiver system (24), which includes the data gathering apparatus, may comprise the portable wand-shaped receiving instrument (70) shown in FIG. 17A. Receiver (70) includes a rod or wand-shaped section (72) and a handle section (74). Rod section (72) terminates in a sensor point (76) which is utilized to touch or contact a position within the measurement field for which x-y-z data is to be generated.

Figure 17B:
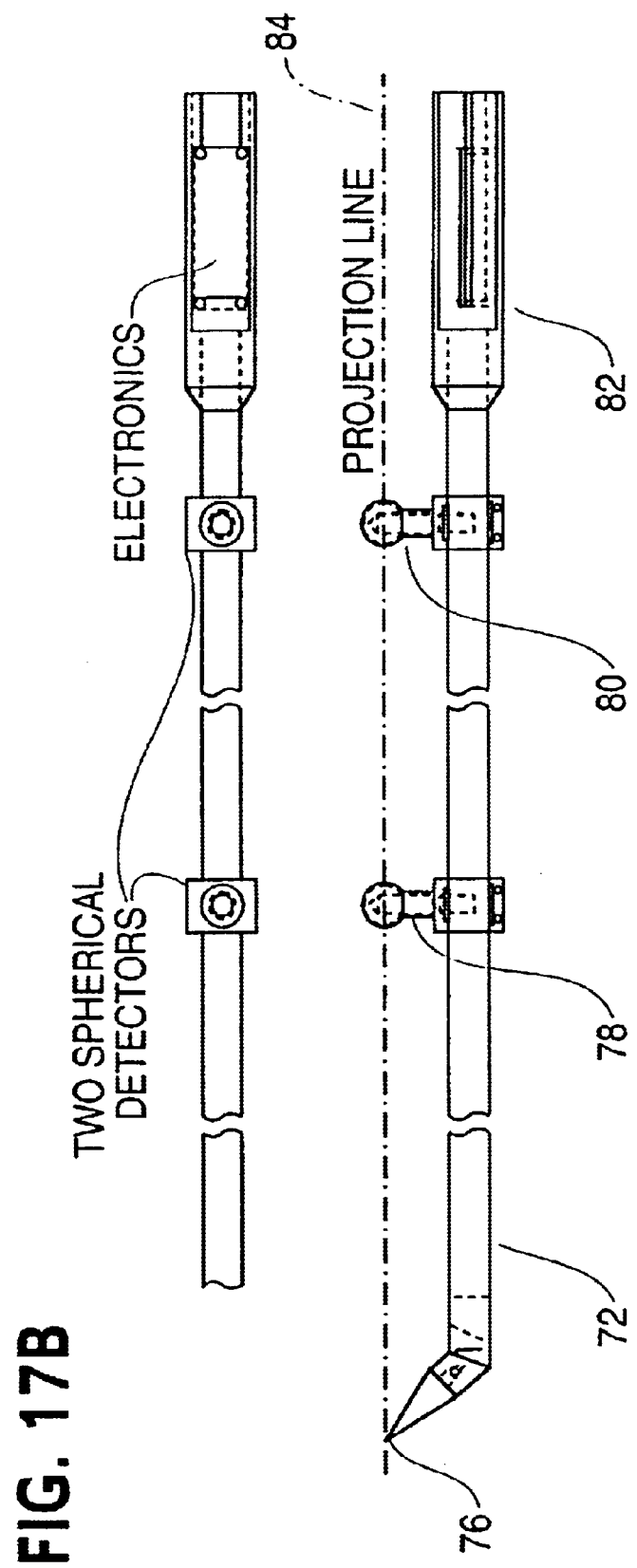
FIG. 17B is an detailed illustration of the detector and tip assembly of the receiving instrument of FIG. 17A according to the present invention.

Referring now to FIG. 17B as well, the rod section (72) includes two spherically shaped, spaced apart optical or light detectors (78 & 80) and an electronics section (82). The proper alignment and positioning of the sensor point (76) with the detectors (78 & 80) can be mathematically expressed as:

$$\vec{P}_{TIP} = d_{TIP} \frac{\vec{P}_{DET2} - \vec{P}_{DET1}}{\|\vec{P}_{DET2} - \vec{P}_{DET1}\|} + \vec{P}_{DET2}$$

where:

$\vec{P}_{TIP}$=is the position of the tip 76

$\vec{P}_{DET2}$=is the position of the detector 80 closest to the wand handle 82

$\vec{P}_{DET2}$=is the position of the detector 78 closest to the tip 76

$d_{TIP}$=is the distance 72 from detector-2 78 to the tip 76.

Proper alignment and spacing of the detectors (78 & 80) relative to the sensor tip (76) along projection line (84) as shown in FIG. 17B is an important aspect of the present invention as it permits a user to take accurate measurements within a workspace or measurement field without having the receiving instrument (24), i.e., wand (70), positioned exactly perpendicular to a transmitter reference plane (See FIG. 12) or any particular user reference plane. In fact, utilizing a wand tip (76) designed as described, permits a user to position the receiver/detector tip (76) and receiver/detector rod section (72) without concern for any particular alignment. Alternative detector configurations employing cylindrical optical detectors, and other detector shapes, may also be employed; in each case a line projected through the optical center of the two detectors must intersect the tip of the wand. A third optical detector offset from the line through the first two optical detectors may be added to determine the three dimensional orientation of the wand.

Figure 17C:
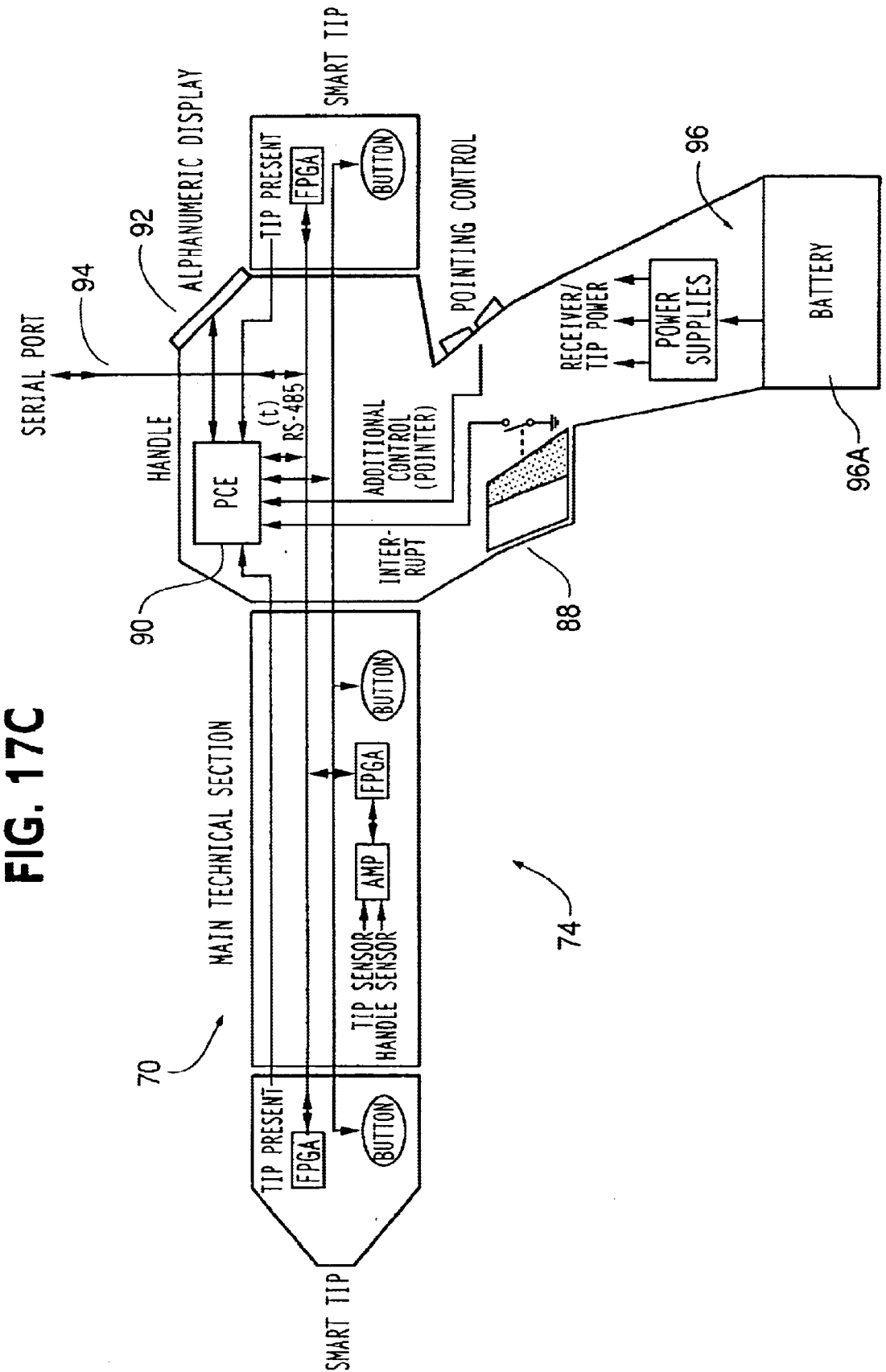
FIG. 17C is a block diagram of some of the important elements of the receiving instrument according to the present invention.

Referring now to FIG. 17C, the hand grip section (74) of portable receiver (70) of FIG. 17A will now be described. Receiver handle section (74) includes a trigger switch (88) to activate the receiver (70) to initiate x-y-z data generation in response to illumination of detectors (78 & 80) by two or more transmitters (10). This x-y-z position data may be generated when electric signals emanating from detectors (78 & 80) activate or are inputted to an internal programmed computer (90), i.e. the Position Calculation Engine (PCE). The PCE (90) is schematically diagrammed for reference in FIGS. 20 and 21.

The x-y-z position data corresponding to the position of the sensor point tip (76) is calculated by the PCE (90) when the trigger (88) is activated. This position data may be displayed in a display panel (92) and/or transferred to another data processor, not shown, via output data port (94), as will be understood by those skilled in the data processing arts.

The output data port (94) is a serial port and may be an optical or wired port. Preferably, the port (94) is an optical port and can be used to receive the calibration data stored in each transmitter (10) via the optical serial port (301; FIG. 3) or wired serial port (302; FIG. 3) of each transmitter (10).

The hand grip portion (74) of the receiving instrument (70) also preferably includes the power supply (96) for the instrument (70). The power supply (96) preferably includes a rechargeable battery pack (96A) that feeds power to the instrument (70), including the PCE (90), communication port (94) and display device (92).

5. Pulse Tracking

This section describes how the receiving instrument (24, 70) associates the different pulses allowing it to track its location as it is moved through the workspace (30).

A. Summary

Figure 20:
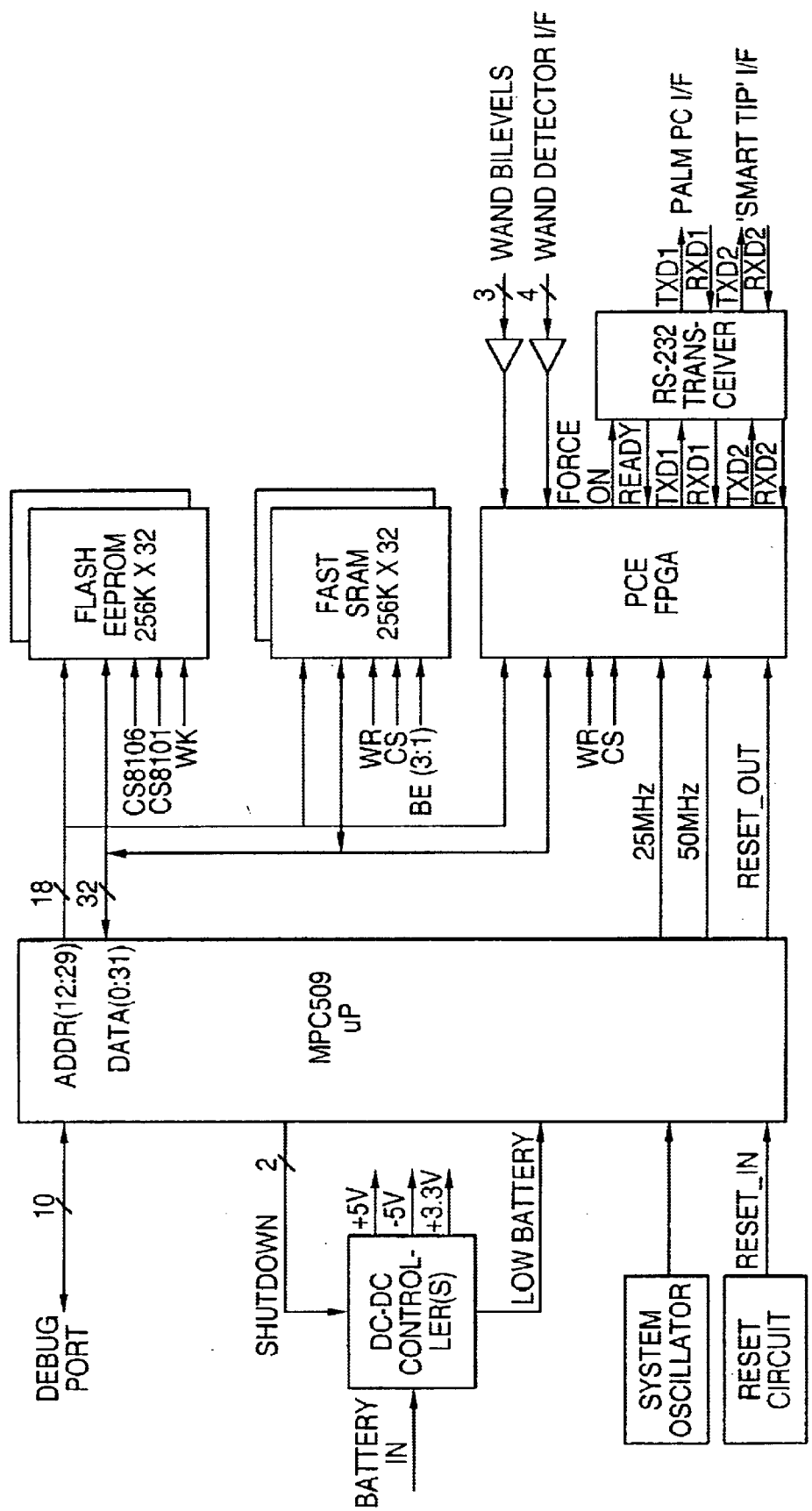
FIG. 20 is a block diagram of the Position Calculation Engine (PCE) of the receiving instrument according to the present invention.
Figure 21:
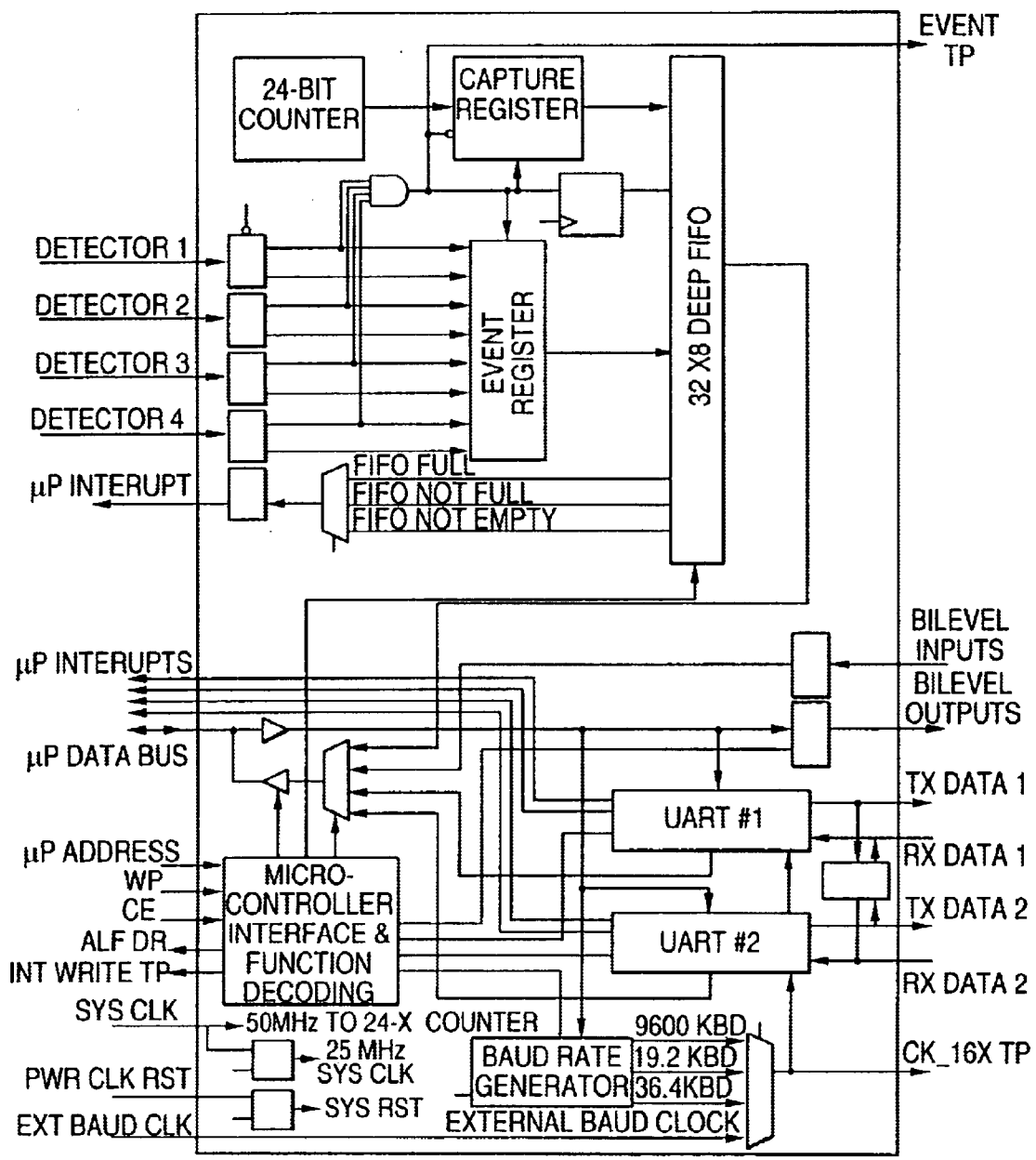
FIG. 21 is a block diagram of the field programmable gate array (FPGA) on the PCE of FIG. 20.

The PCE (position calculation engine) (90), as shown schematically in FIGS. 20 and 21, contains firmware which translates incoming pulse times into physical position in space. This code is partitioned into several major blocks, or tasks. One of the tasks performs the job of categorizing and associating these pulse times upon their arrival. This process is known as tracking. The following flowcharts and text describe the operation of the tracker. There is a separate tracker or tracking function for each physical light detector on the receiving instrument (70).

B. Background

As described above, from the perspective of any one fixed location in the workspace, each transmitter in the system emits a periodic stream of light pulses. Within one period, three pulses are emitted from each transmitter. Each transmitter maintains a unique and stable period, or rate of emission. This allows the firmware in the PCE to discriminate between transmitters.

C. Tracking

The tracking algorithm maintains an individual pulse tracker for each emitter, e.g., laser light source, on each transmitter. When a pulse is received by the firmware, its timing characteristic is compared with each of the pulse trackers in the system in an attempt to associate it with a known pulse train. There are two distinct phases to the tracking process; synchronization and tracking. During the sync phase, an attempt is made at pairing unknown pulses, within the preset parameters of the existing pulse trackers. Once this is accomplished, the tracking mode is entered, whereby successive pulses are associated with their assigned pulse trackers. If a sequence of assignment failures occurs, tracking mode is exited, and re-synchronization is attempted.

Once synchronization is achieved, a post-sync check is performed to ensure that the pulses have been identified in the correct order. If an inconsistency. is found, the pulse trackers are swapped. This helps to avoid unnecessary re-synchronization cycles.

Under some conditions, environmental interference such as noise and multipath reflections are experienced. A noise pulse is defined as a pulse which cannot be correlated with the period of an existing pulse tracker. Multipath occurs when unexpected pulses are detected at the period of a transmitter.

Figure 18:
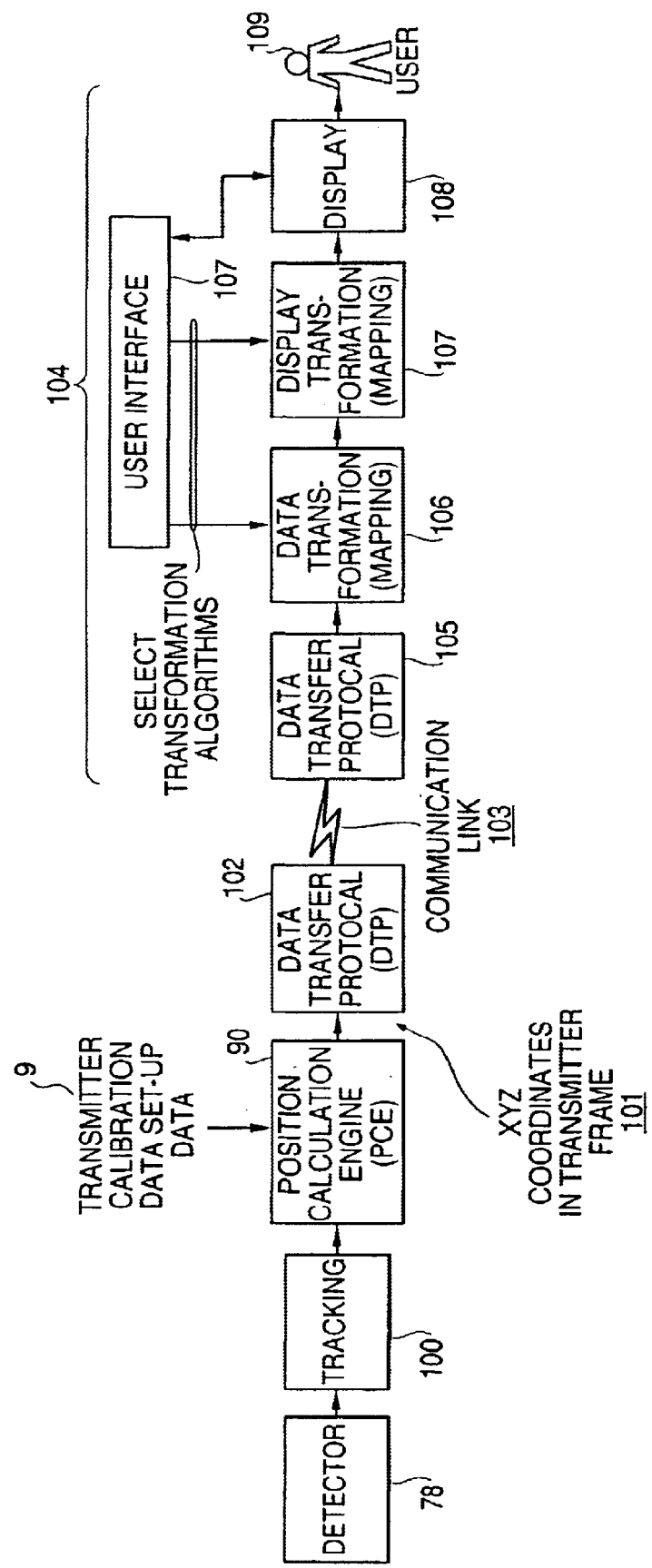
FIG. 18 shows the data flow of the position measurement receiver according to the present invention.

FIG. 18 provides a diagram of the data flow accomplished in the tracking function. The flow represented in FIG. 18 from the detector (78) to the PCE (90) will be duplicated for each light detector on the instrument (70). As shown in FIG. 18, the detector (e.g., 78) outputs signals indicative of detection of an optical pulse to a tracking system (100), which will be described in more detail below. The tracking system (100) outputs data to the PCE (90). The PCE (90) also has received the calibration data (9) from all the transmitters in the system.

Using the output of the tracking system (100) and the calibration data (9), the PCE (90) generates the x,y,z position (101) of the detector (78) in the transmitter's reference frame using the mathematical model described in detail above. This information is then transmitted using a data transfer protocol (102) over a communications link (1 03) to a user interface system (104).

The user interface system (104) may either be mounted on the receiving instrument (70) or may be a separate system in communication with the instrument (70) via communications link (103). Within the user interface system (104), the data (101) is received (105). The data (101) is then mapped from the transmitter reference frame in which it was created into the user's reference frame (106). A user interface (107) is also part of the system (104) and allows the user to define the user's reference frame and the consequent mapping function performed in block (106). The data is then mapped for display (107) on a display device (108). The display device (108) and display mapping block (107) are also under control of the user (109) through the user interface (107). Consequently, the user can have the mapping block (107) map the data into the most useful format. For example, the data may be mapped by block (107) into a numeric display of x, y and z values in the user reference frame for display on the display device (108). Alternatively, the data may be mapped by block (107) into a dot on a map displayed on the display (108) that indicates the current position of the detector (78). Any mapping of the data that is most useful to the user (109) can be effected by block (107) prior to display (108).

Figure 19:
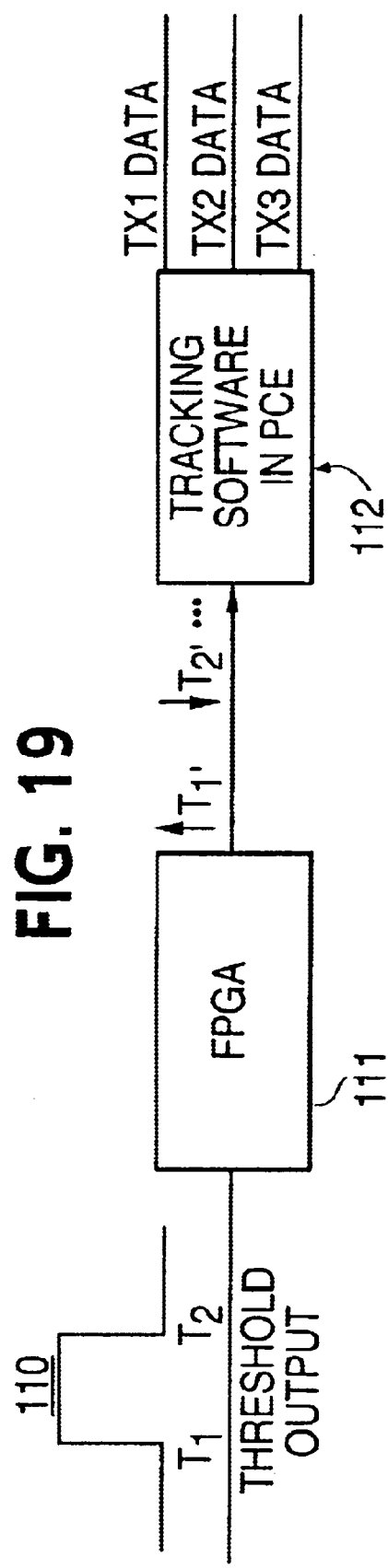
FIG. 19 shows the data flow of pulse detection and tracking according to the present invention.

FIG. 19 illustrates in greater detail the tracking block (100) of FIG. 18. As shown in FIG. 19, each light detector in the system will output a signal (110) including square pulses indicative of the detection of a light pulse from the transmitter having been received and detected by the detector. For each pulse, a Field Programmable Gate Array (FPGA) (111) will output a signal specifying a time ($T_1$) corresponding to a rising edge of the detected light pulse and a time ($T_2$) corresponding to a falling edge of the detected light pulse. These times ($T_1$ and $T_2$) are transmitted to the tracking software (112), typically executed by the PCE (90).

The tracking software, as will be described in more detail below, associates each pulse, defined by times ($T_1$ and $T_2$), with a particular transmitter (10). This is done as described above based on the time at which the pulse is received as matched against a time a which a pulse from a given transmitter is expected, knowing that transmitter's rotational velocity and consequent synchronization pulse duty cycle.

Once each detected pulse is associated with a transmitter, that pulse is also then associated with the calibration data (9) for that transmitter. Given the calibration data (9) for the transmitter (as described above) and the times ($T_1$ and $T_2$) for the two fanned light beams and the synchronization pulse for that transmitter, the PCE (90) can calculate the θ value, as shown in FIG. 7, for each plane of light which swept the detector (e.g, 78). Consequently, the position of the detector (78) can be calculated using the mathematical model described above.

D. Flowchart Narrative (1) Detector::Entry

Figure 22:
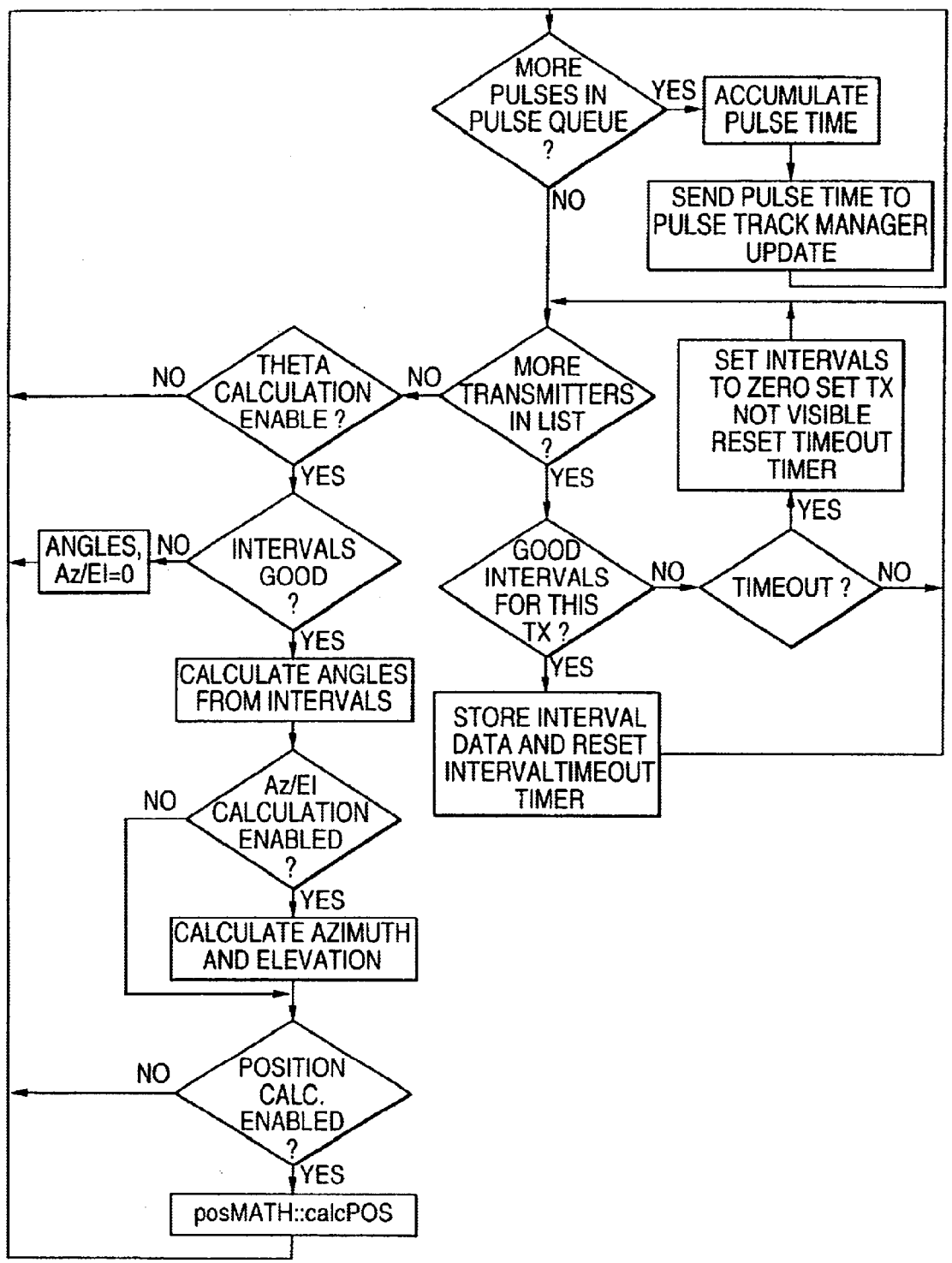
FIG. 22 is a flowchart for Software Object Detector::Entry which is executed by the receiving system according to the present invention.

FIG. 22 illustrates the main background loop for the system. It is an RTOS (Real Time Operating System) task, and once launched, continues to execute in an infinite loop. Referring to the flowchart (FIG. 22), the following sequence of events takes place:

1) Check for pulse time events in the queue. These are passed in from the hardware FIFO in the FPGA, via an interrupt service routine. If there is another event in the queue, add it to the accumulated total time, and pass it through to the update routine. The update routine generates pulse intervals from the incoming pulse times. It also associates the pulses with a particular transmitter.
2) Once the queue has been emptied, run through the list of transmitters to make sure that new intervals have been calculated for every transmitter. If they have not, note a timeout, and mark the associated transmitter as invisible. This will be displayed on the user interface. Otherwise, store the interval data for use in subsequent position calculations.
3) Once all transmitters have been updated with interval information, check to see if theta calculations have been enabled. Thetas are the equivalent angles between the lasers and the reference pulse based upon pulse times and transmitter rotational rate. This is a basic calculation required for any subsequent calculations, and must be enabled for any output to be generated. If they are disabled, go back to looking for more pulse times.
4) Check that all interval data is valid. If not, clear the theta and azimuth/elevation data and check for new pulse times.
5) Perform the calculation to convert angles (thetas) into intervals.
6) If azimuth and elevation calculations are enabled, generate these numbers.
7) If position calculation is enabled, calculate the position (x,y,z) of this detector. Send a message to the measurement tool indicating that a position has been generated for this detector.

(2) PulseTrackManager::Update

Figure 23A:
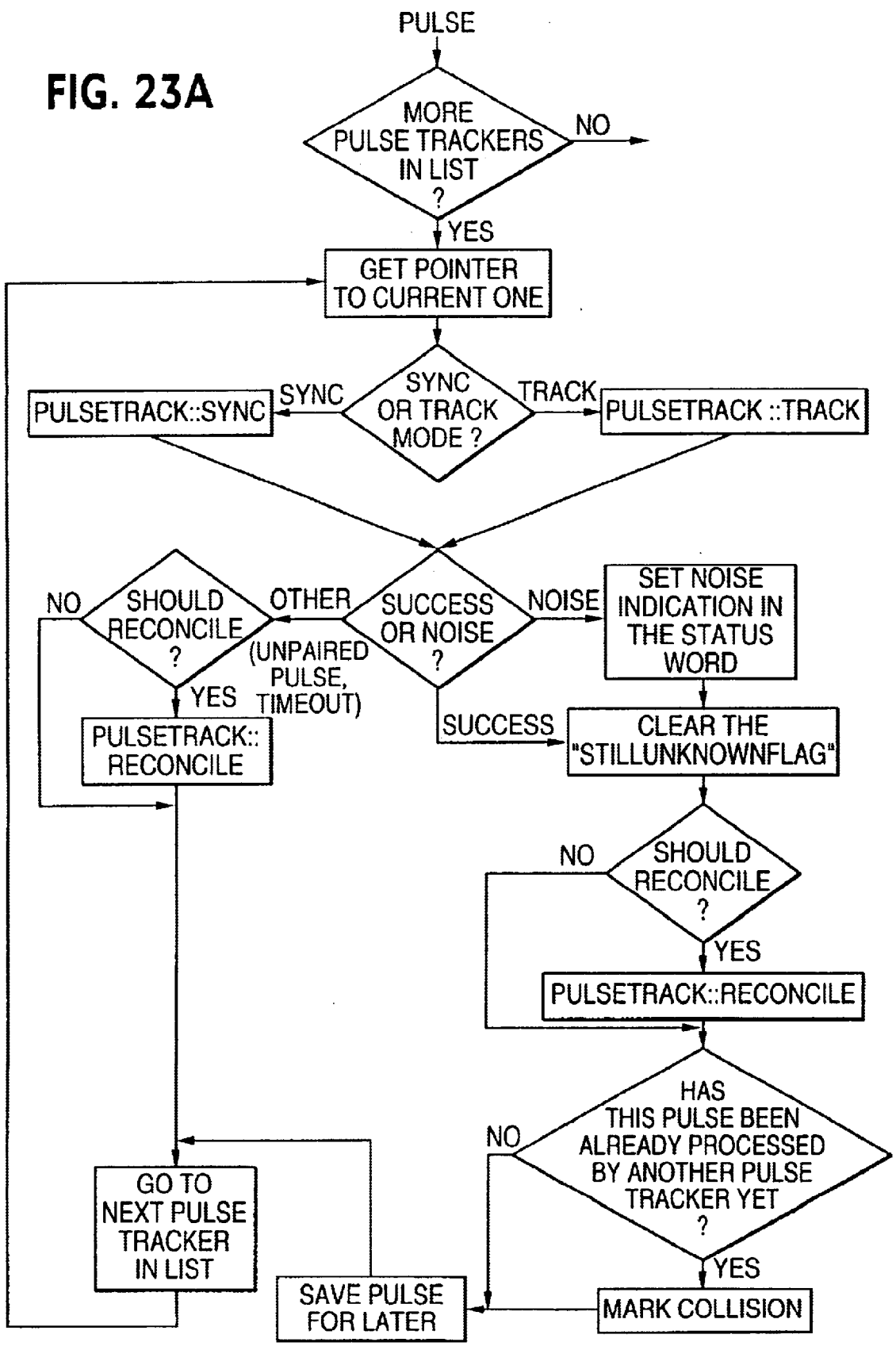
FIG. 23A is a flowchart for Software Object PulseTrackManager::Update which is executed by the receiving system according to the present invention.

The update function of the present invention is shown in flowchart form in FIGS. 23A and 23B. This routine receives pulse times from the Detector "Entry" routine of FIG. 22, and associates them with pulse trackers. An individual pulse tracker exists for each emitter (i.e., fanned laser light source) in the system, preferably two per transmitter and each reference pulse generator (one per transmitter). This accomplished, an attempt is made to reconcile a set of three pulses and associate them with a single transmitter, The sequence of events is as follows, until a pulse is identified:

8) If currently in synchronization mode, call the synchronization function. Otherwise, call the track function.
9) If noise was detected, set the noise flag.
10) If the sync or track function was successful, check to see if a previous pulse is to be reconciled. If so, call the reconcile routine. This will perform pulse pair housekeeping.
11) If this pulse has already been processed by another pulse tracker, a collision has occurred. Set the "collision" flag.
12) Otherwise, save the pulse for later. It will be used to reconcile the next pulse from this emitter.
13) If the sync or track function was not successful, a timeout may have occurred. Reconcile the pulse anyway so that the interval from the previous pulse gets recorded. Continue with the next tracker.
14) Once all pulse trackers have been attempted, if the pulse has been identified, exit.
15) Otherwise, go back to the top of the list of pulse trackers.
16) For each pulse tracker, check to see if we have exceeded the maximum number of sync attempts. If so, reset this tracker, and go to the next one. If it has recently been sync'd go on to the next one.
17) If multipath interference has not been detected, go on to the next pulse tracker. Otherwise, clear out the unknown pulse list, and insert this one into it.

(3) PulseTrack::Synchronize

The synchronizing function of the present invention is shown in flowchart form in FIG. 24. The synchronize routine attempts to associate an incoming pulse with an existing pulse tracker. Once a regular pattern of pulses has been established, the system leaves sync mode and enters track mode, whereby the "track" routine is invoked instead of "synchronize". As long as "track" continues to successfully classify incoming pulses, the sync function is no longer called. Should the tracker encounter difficulty in recognizing pulses as coming from a particular transmitter within the system, sync mode is re-invoked, and the system attempts to re-synchronize the pulse stream.

Loss of synchronization may occur for a number of reasons, including noise or reflections in the environment, or rapid movement of the receiving instrument (24,70). As shown in FIG. 24:

1) New pulse time of arrival is registered. If the unidentified pulse list is empty, there is nothing with which to pair it. Return as such.
2) Has this pulse been paired yet (with another pulse tracker)? If so, is the interval from previous pulse within the sync window? If so, the previous pulse may have been noise. Resync. A sync window is defined as the time it takes for the transmitter head to complete approximately 0.2% of a rotation.
3) If last pulse was NOT noise, is this one within the cycle time of this tracker? If not, return "already paired" If so, try to find a match in the unknown pulse list. Note that if it has not been paired yet, we also end up looking in the unknown pulse list.
4) If a match is found, see if the match has been already paired. If so, resynchronize. Otherwise, save as a match, and place this one in the unknown pulse list, so subsequent pulses can try to match this one.

(4) PulseTrack::Track

Once we are in tracking mode, each pulse gets passed to the pulse trackers. The tracking function is shown in flowchart form in FIG. 25. If any pulse is received within an expected range of when the next pulse should occur based on the known parameters of the transmitter, that pulse is accepted as the next pulse for that transmitter and is accepted by the associated tracker. Each fan beam and the synchronization pulse from each transmitter has its own tracker in the receiving system.

Figure 25:
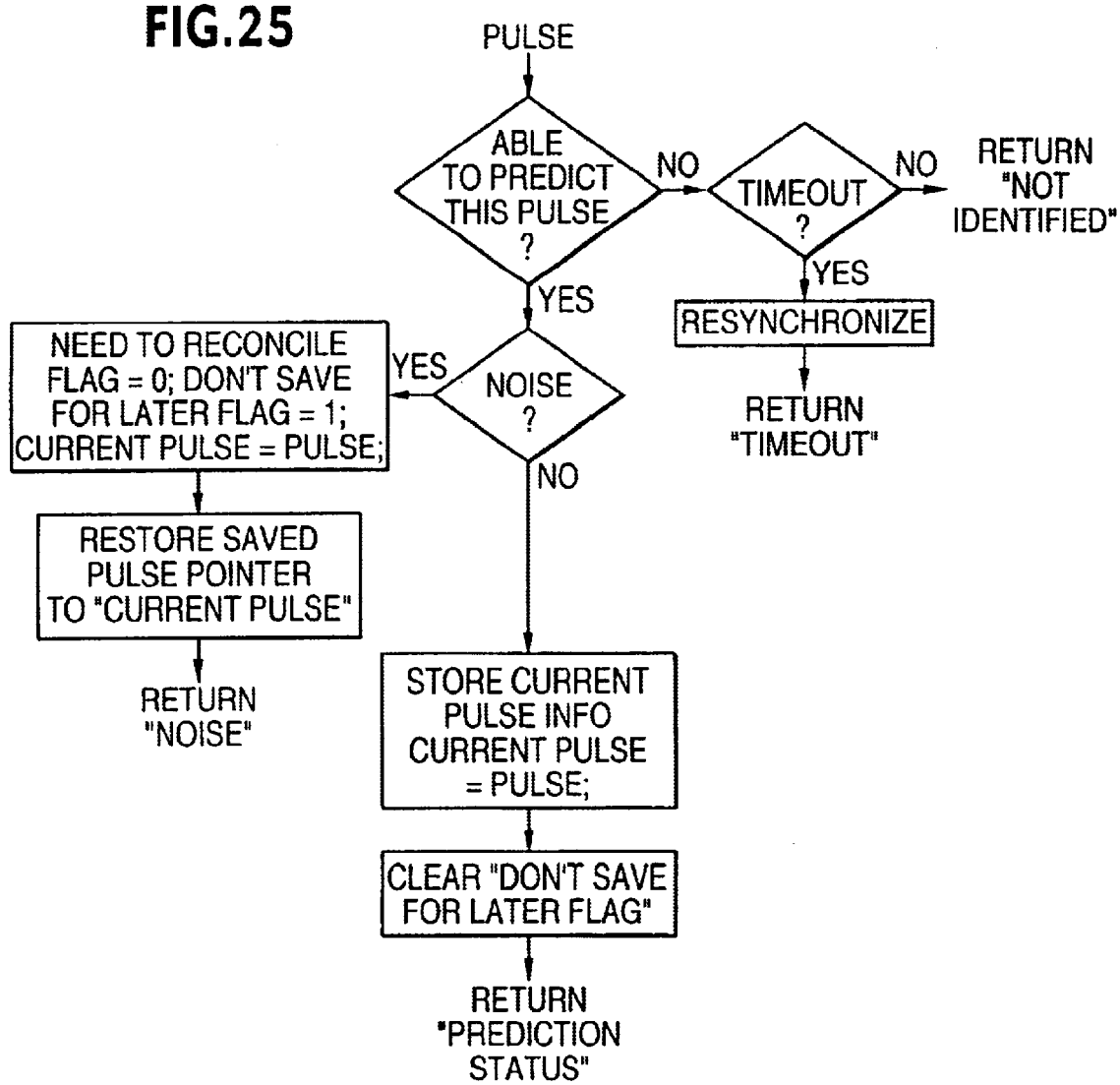
FIG. 25 is a flowchart for Software Object PulseTrack::Track which is executed by the receiving system according to the present invention.

As shown in FIG. 25, tracking is performed as follows:

5) Can we predict a pulse within a reasonable tracking window? If not, has it been too long since the last pulse was registered? If so, resynchronize and return "timeout". If no timeout yet, just return "not identified". A track window is defined as the time it takes for the transmitter head to complete approximately 0.2% of a rotation.
6) If we can predict the pulse, check to see if noise is present (In this case, noise is defined as multiple pulses within the "track window"). If so, reset pointer to previous pulse, and return "noise".
7) If no noise is detected, store current pulse information, and return success.

(5) PulseTrack::Predict

Figure 26:
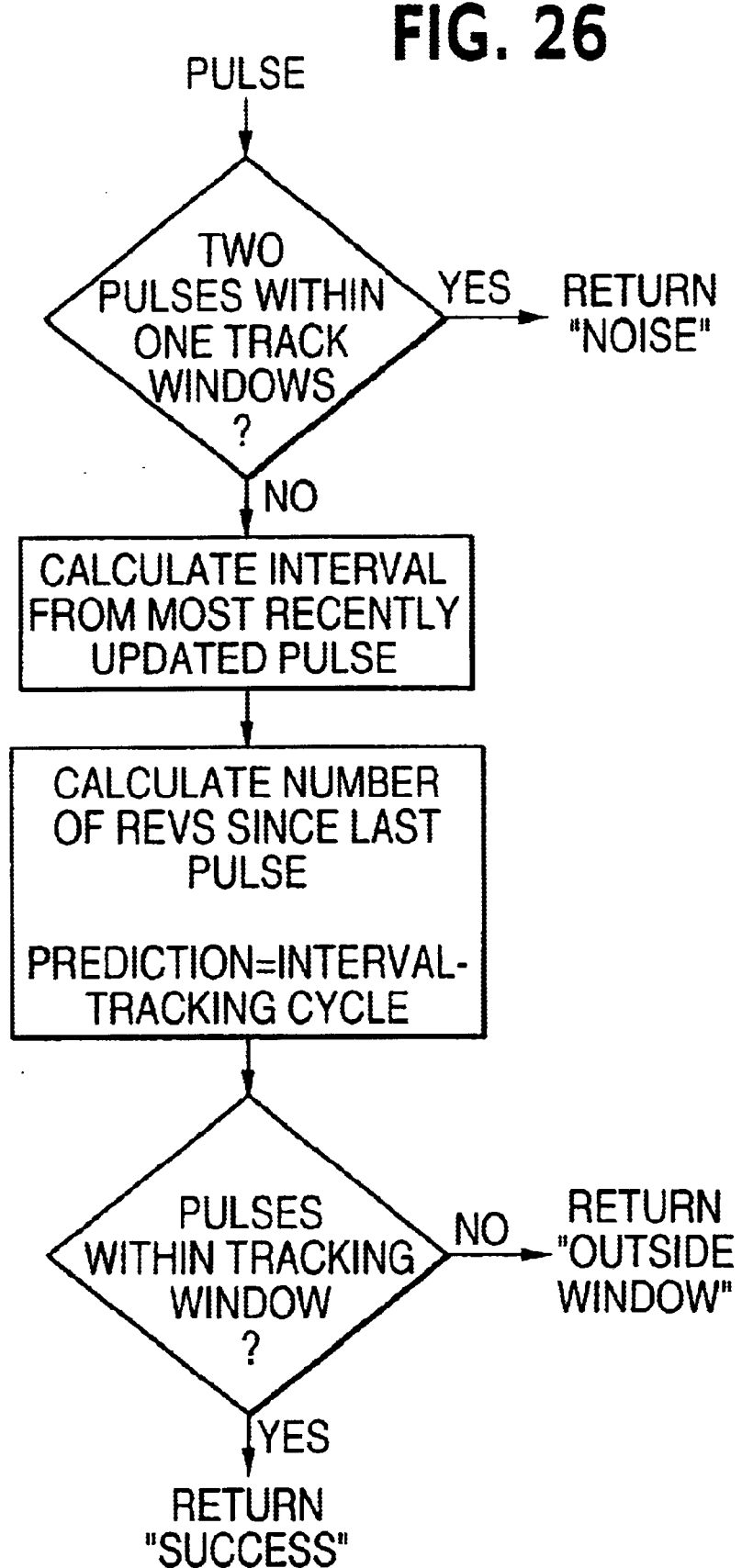
FIG. 26 is a flowchart for Software Object PulseTrack::Predict which is executed by the receiving system according to the present invention.

The predicting routine of the present invention is shown in flowchart form in FIG. 26. This routine interacts with the "Track" routine described above by attempting to predict when the next pulse from any given pulse source should occur. It then tries to correlate this expected time with the next actual pulse time, within a pre-determined tracking window.

As shown in FIG. 26, the Predicting routine is performed as follows:

8) Are there two pulses within one tracking window? If so, noise exists; return.
9) Based on previous pulses, is this pulse within a reasonable tracking window of one or more most recent pulses (Several pulses may be missed before tracking fails; i.e.: as may be experienced during a temporary blockage)?
10) If it is, return "success". Otherwise, return "outside window".

(6) PulseTrack::Reconcile

The Reconciliation function of the present invention occurs in two phases. The first part is pulse tracker reconciliation (shown in flowchart form in FIG. 27), which performs pulse pair housekeeping within a particular pulse tracker. The other is transmitter level reconciliation (shown in flowchart form in FIG. 28), which associates a set of three pulses from a single transmit period with a transmitter.

Figure 27:
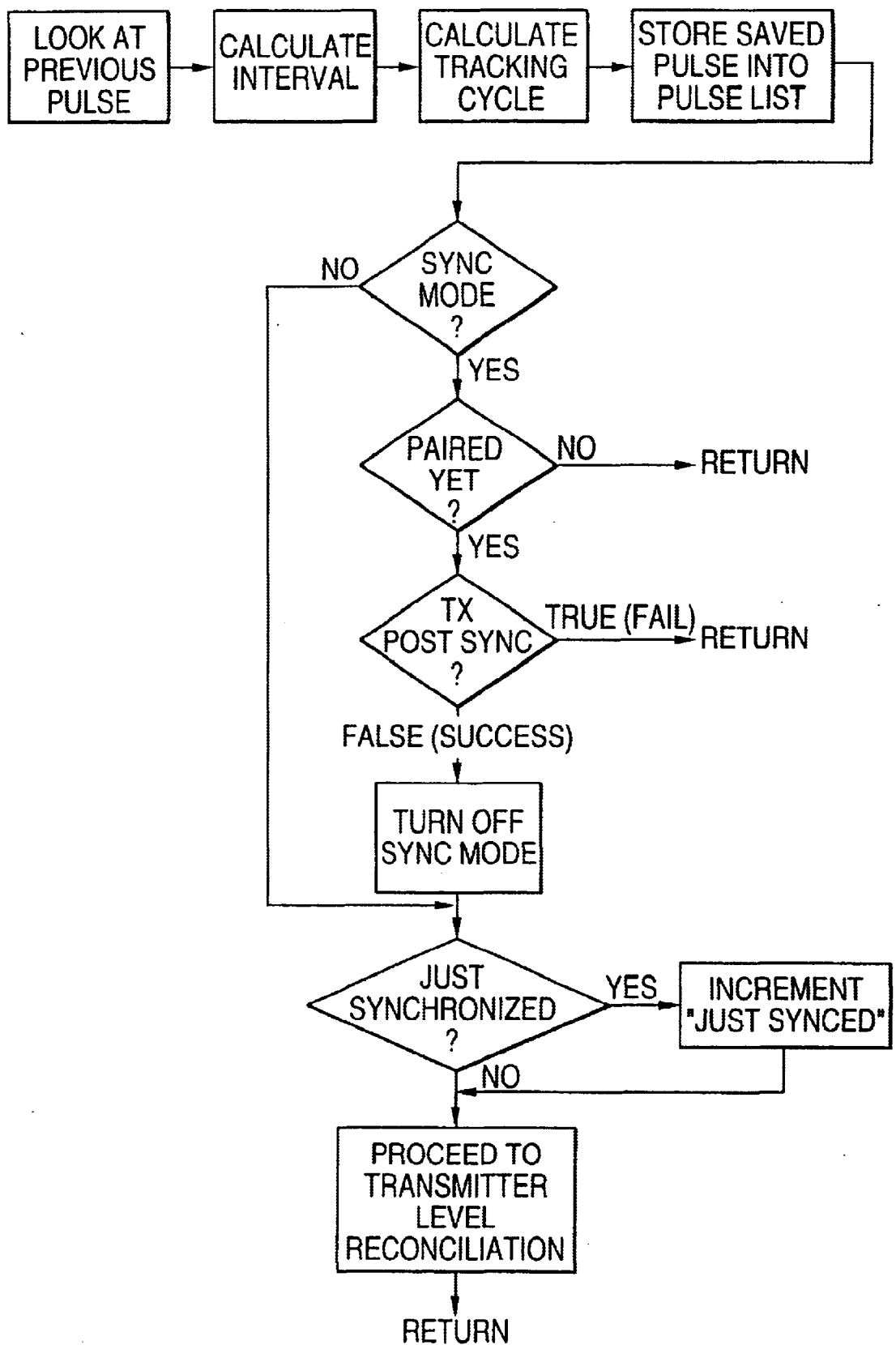
FIG. 27 is a flowchart for Software Object PulseTrack::Reconcile which is executed by the receiving system according to the present invention.

As shown in FIG. 27, pulse tracker reconciliation proceeds as follows:

11) Calculate interval from previous pulse. Calculate the tracking cycle.
12) Store in the saved pulse list.
13) If in sync mode, and not paired yet, return.
14) Otherwise, call "post-sync" to do cleanup. If it is unsuccessful, return as such.
15) If it was successful, switch to "track" mode.
16) If we were in "track" mode already, check to see if it was recently achieved. If so, increment the counter. This affects the way the "update" routine handles the data.
17) Reconcile at the transmitter level.

(7) Transmitter::Reconcile

Figure 28:
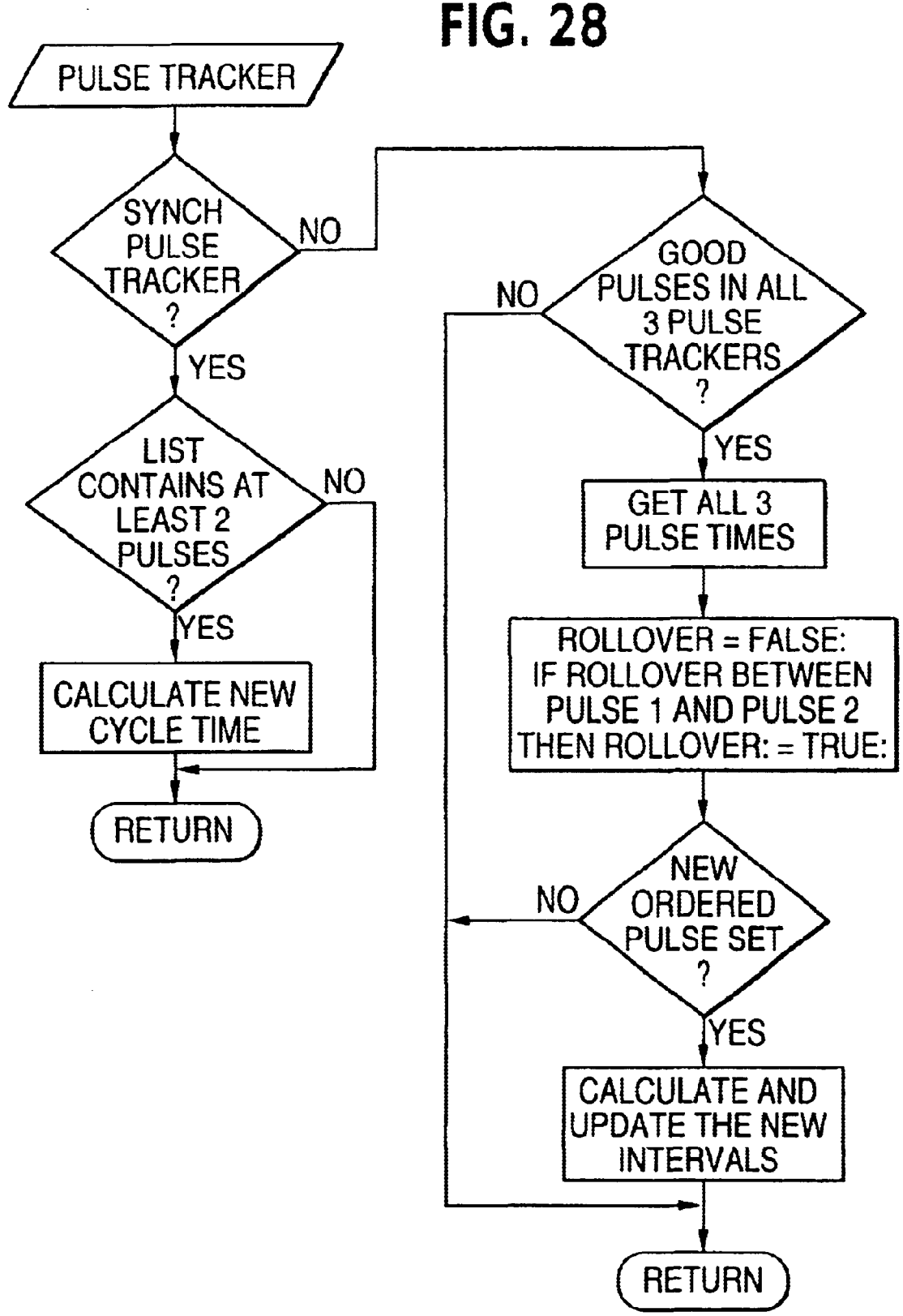
FIG. 28 is a flowchart for Software Object Transmitter::Reconcile which is executed by the receiving system according to the present invention.

As shown in FIG. 28, transmitter reconciliation is performed as follows:

18) If this is the reference pulse, check that there are two laser pulses in the list. If so, calc a new cycle time and return. Otherwise, just return.
19) If it is a laser pulse, make sure there are good pulses from all 3 pulse trackers for this transmitter.
20) Using the pulse time data, calculate the intervals. Save the interval times for use by position calculation routines.

(8) Transmitter::PostSynchronize

Figure 29:
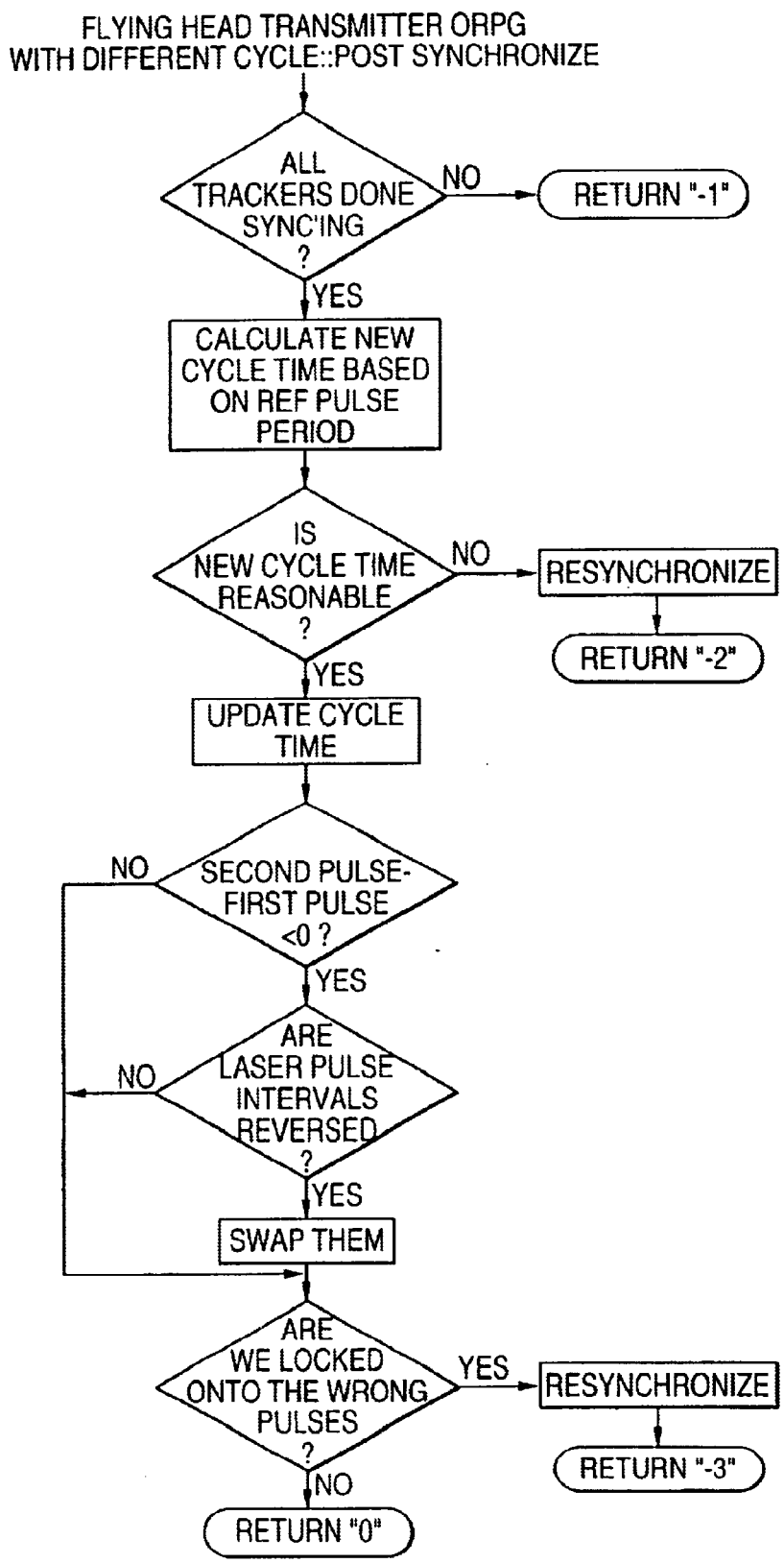
FIG. 29 is a flowchart for Software Object FlyingHeadTransmiterORPGWithDifferentCycle::postSynchronize which is executed by the receiving system according to the present invention.

The Post Synchronization routine of the present invention is used as a final check to make certain that three trackers have synchronized to a single transmitter in a consistent manner and is shown in flowchart form in FIG. 29.

21) First, check that all three trackers have completed synchronization.
22) Using the reference pulse period, check that the cycle time is reasonable. If not, then re-enter the synchronization mode and return an error.
23) Ensure that the pulses have been identified in the correct order. If not, then swap them based upon time of arrival.
24) Check that we're locked onto the correct set of pulses. If not, then re-enter the synchronization mode and return an error.
25) Otherwise, return "success".

(9) PulseTrack::isMultipath

Figure 30:
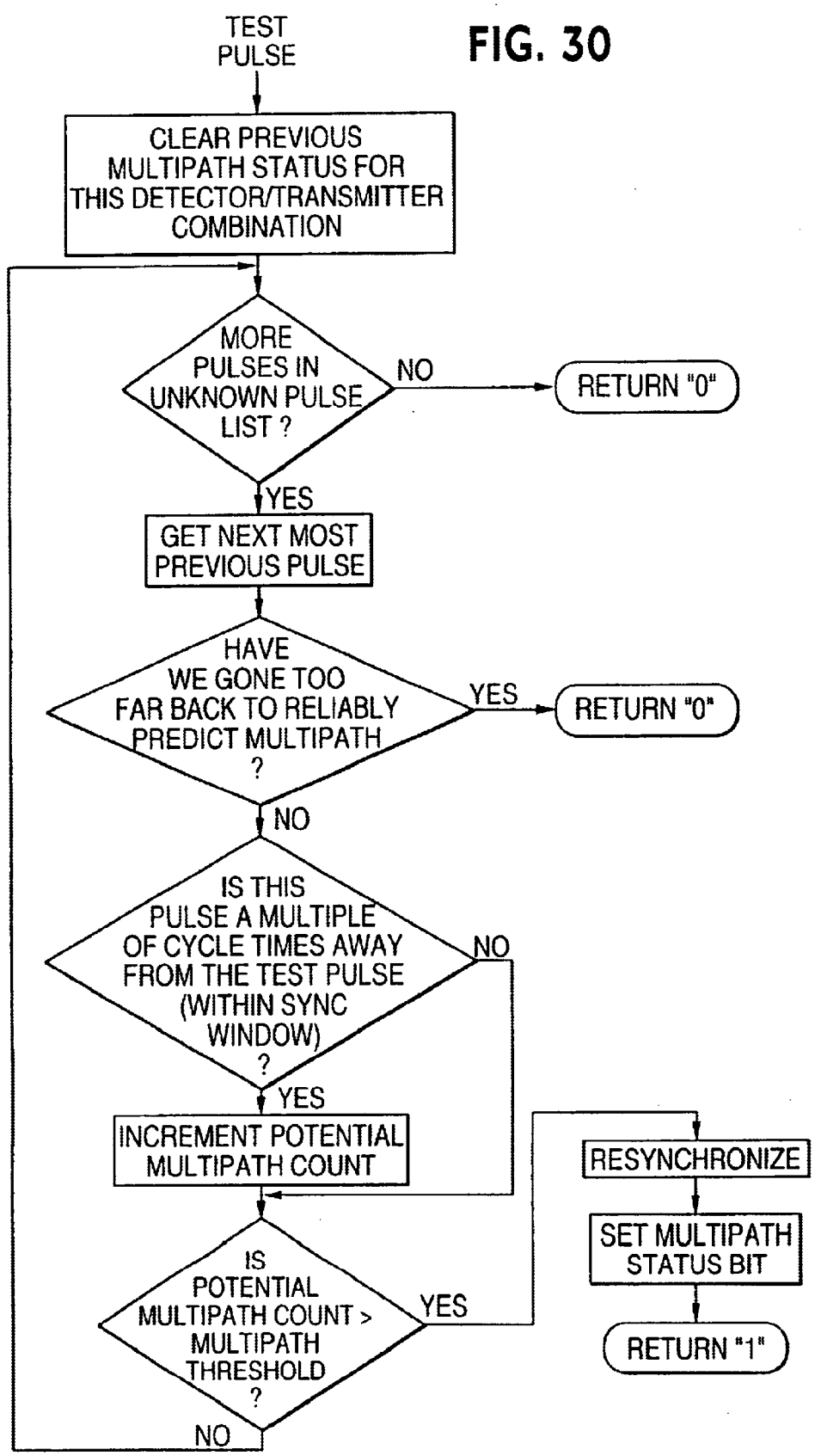
FIG. 30 is a flowchart for Software Object PulseTrack::isMultipath which is executed by the receiving system according to the present invention.

The multipath function of the present invention checks to see if multipath interference exists; that is, whether some pulses reaching the detectors are reflections of the emitters rather than line of sight pulse strikes. This is accomplished by comparing the pulse currently being classified with previous pulse times and is shown in flowchart form in FIG. 30. As shown in FIG. 30, the multipath routine is performed as follows:

26) Clear any previous multipath indications in the status word.
27) If the unknown pulse list is empty, multipath is not detectable.

28) Compare the pulse time of this pulse with the pulse times of prior entries in the unknown pulse list. If this pulse is a multiple of cycle times away from a previously received (but unidentified) pulse (within a sync window), then multipath interference may be present. Increment a counter.

29) If the counter exceeds a preset limit, multipath exists. Set the multipath status bit, and re-enter synchronization mode.

6. Least Squares Resection

The preceding material describes the operation of the position determining system of the present invention. However, before the system is fully operational, it is necessary to establish and define the user's frame of reference so that the position information generated by the system is actually useful to the user. There are at least two different means of setting up the system and defining an initial user's frame of reference: (1) Least Squares Resection and the (2) Quick Calc Method. The Quick Calc method is easier to perform and requires less time and effort than Least Squares Resection. Consequently, the Quick Calc method is preferred for purposes of the present invention and will be described in detail below. However, for completeness, the Least Squares Resection method of setting up the system of the present invention will also now be explained.

Figures 2, 31:
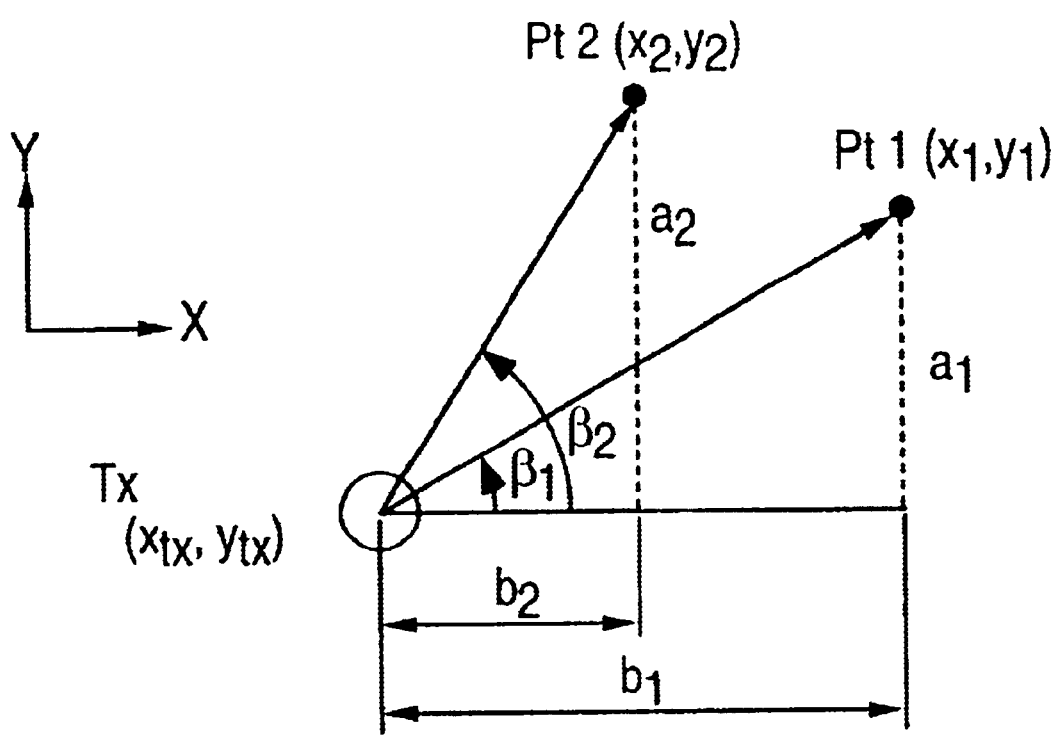

The Least Squares Resection (LSR) algorithm used with the present invention ties the transmitters in the workspace together into a common mathematical reference frame, from which position calculations are made. Whereas the Quick Calc setup algorithm creates a new reference frame for the transmitters, LSR ties the transmitters into a previously established reference frame defined by coordinates already in the workspace. FIGS. 12 and 31-1 show an example of a user reference frame in which the transmitters are arbitrarily placed.

FIG. 31-1 shows the same three transmitters (10-1, 10-2 & 10-3) shown in FIG. 12, which are arranged in an arbitrary coordinate system relative to each other as was described with regard to FIG. 12. Each transmitter in the workspace has an associated position vector $\vec{p}_{tx}$ and rotation matrix $R_{tx}$ that relate the transmitter's local reference frame to the user's reference frame. $\vec{p}_{tx}$ and $R_{tx}$ are used in the position calculation algorithm.

In order to perform an LSR with the position measurement system of the present invention, the user must level a receiving instrument (24) with a single light (or other signal) detector over a minimum of three known coordinates in the workspace as shown in FIG. 31-1. The receiver system (24) makes scan angle measurements (measurements of $\theta_1$ and $\theta_2$) for the detector at each location.

After all of the measurements are taken, the algorithm calculates an approximate guess location and orientation for each transmitter (10) relative to the user reference frame. The algorithm then individually calculates the location and orientation of each transmitter (10) using Newton-Raphson iteration. The reader should note that this approach is different from the preferred Quick Calc Setup algorithm to be described below. In the Quick Calc Setup method, all transmitter locations and orientations are solved for simultaneously.

A. Least Squares Resection Algorithm

We will now describe the mathematical algorithm used in the LSR method of the present invention.

(1) LSR Observations

As stated above, the first step in LSR is for the receiver system to take scan angle measurements with a leveled one-detector wand (24) at a minimum of three locations in the workspace for which the position is already known in the user's reference frame. For each receiver (24) location, the receiver system records the scan angles $\theta_1$ and $\theta_2$ from each transmitter (10) to the detector on the receiver (24). These two scan angles are then converted to their corresponding plane vectors $\hat{v}_1$ and $\hat{v}_2$. We call the measurement at each wand (24) location an LSR observation.

For each observation, the user enters the known coordinate $(x_{tip}, y_{tip}, z_{tip})$ and which the wand's tip (24) has been placed as shown in FIG. 31-1. Since the wand (24) is leveled over this point, the receiver system calculates the coordinate of the tool's detector by making the assumption that the z-axis in the user reference frame is parallel to gravity. Since, the detector (10) is mechanically located at a distance toolLength from the wand tip, we can write the detector location $\vec{c}_{loc}$ as:

$$\vec{c}_{loc} = \begin{bmatrix} x_{tip} \\ y_{tip} \\ z_{tip} + toolLength \end{bmatrix} \quad (3.1)$$

For m different wand (24) locations and n different transmitters (10), we have the following data set.

$$\begin{array}{ccccc} \vec{c}_1 & \vec{v}_{1,1,1} & \vec{v}_{1,1,2} & \cdots & \vec{v}_{1,n,1} & \vec{v}_{1,n,2} \\ \vec{c}_2 & \vec{v}_{2,1,1} & \vec{v}_{2,1,2} & \cdots & \vec{v}_{2,n,1} & \vec{v}_{2,n,2} \\ \vdots & \vdots & & \ddots & & \vdots \\ \vec{c}_m & \vec{v}_{m,1,1} & \vec{v}_{m,1,2} & \cdots & \vec{v}_{m,n,1} & \vec{v}_{m,n,2} \end{array}$$

The subscript convention is $\hat{v}_{loc,tx,beam}$. The first subscript indicates the wand location, i.e. this subscript counts observations. The second indicates the transmitter, and the third indicates beam 1 or beam 2 on the transmitter (10).

Since LSR handles each transmitter (10) separately, the data set for a single transmitter (10) is:

$$\begin{array}{ccc} \vec{c}_1 & \vec{v}_{1,tx,1} & \vec{v}_{1,tx,2} \\ \vec{c}_2 & \vec{v}_{2,tx,1} & \vec{v}_{2,tx,2} \\ \vdots & \vdots \\ \vec{c}_m & \vec{v}_{m,tx,1} & \vec{v}_{m,tx,2} \end{array} \quad (3.2)$$

Furthermore, it is not required that each transmitter (10) use the same four observations in the LSR algorithm; we simply do this for convenience in the operation of the system. Herein lies another difference between LSR and the preferred Quick Calc Setup method. LSR is a resection algorithm because is locates and orients a single transmitter (10) in a preexisting reference frame, just like a total station is aligned to a set of control points. Quick Calc Setup, by contrast, locates and orients all transmitters relative to one another in an arbitrarily defined reference frame.

Since LSR deals with each transmitter individually, we will describe the LSR setup process for a single transmitter. Those of skill in the art will understand that this process is simply repeated for each transmitter (10) in the system.

(2) Guess Generation

The LSR algorithm must solve for the locations and orientations of the other transmitters in the workspace. Therefore, we are solving for the following quantities:

$$\vec{p}_{tx} = \begin{bmatrix} x_{tx} \\ y_{tx} \\ z_{tx} \end{bmatrix}$$

$$R_{tx} = Rx(rx_{tx})Ry(ry_{tx})Rz(rz_{tx})$$
$$= \begin{bmatrix} 1 & 0 & 0 \\ 0 & \cos(rx_{tx}) & -\sin(rx_{tx}) \\ 0 & \sin(rx_{tx}) & \cos(rx_{tx}) \end{bmatrix} \begin{bmatrix} \cos(ry_{tx}) & 0 & \sin(ry_{tx}) \\ 0 & 1 & 0 \\ -\sin(ry_{tx}) & 0 & \cos(ry_{tx}) \end{bmatrix} \begin{bmatrix} \cos(rz_{tx}) & -\sin(rz_{tx}) & 0 \\ \sin(rz_{tx}) & \cos(rz_{tx}) & 0 \\ 0 & 0 & 1 \end{bmatrix}$$

The order of rotation used is called z-y-x fixed angle. This rotation order is chosen because the z rotation component is typically the largest rotation for a transmitter; i.e. the transmitters are usually close to level. Any rotation order can be used, though, as long as $R_{tx}$ is consistent between the LSR algorithm and the position calculation algorithm. We define a solution vector $\vec{x}$ to include the 6 unknowns for the transmitter:

$$\vec{x} = [x_{tx}\ y_{tx}\ z_{tx}\ rx_{tx}\ ry_{tx}\ rz_{tx}]^T$$

Before performing a Newton-Raphson iteration, the LSR algorithm generates a guess for this $\vec{x}$ vector based on the assumption that the transmitter (10) is leveled in the x-y plane. In other words, the $\vec{x}$ vector generated by the guess routine is:

$$\vec{x} = [x_{tx}\ y_{tx}\ 0\ 0\ 0\ rz_{tx}]^T$$

Using this simplification, a diagram for two LSR observations (Pt1 & Pt2) relative to the transmitter (Tx) can be drawn as shown in FIG. 31-2. This Fig. shows two triangles whose common base is parallel to the x-axis. Since the θ angles (scan angles) are measured relative to the front of the transmitter and $rz_{tx}$ is the angle between the x-axis and the front of the transmitter when the transmitter is in the xy-plane, we have the following formulas for the two β angles:

$$\beta_1 = \theta_{1,tx,1} + rz_{tx}$$

$$\beta_2 = \theta_{2,tx,1} + rz_{tx}$$

The subscript notation on θ is the same as was used on the $\hat{v}$ vector, specifically $\theta_{loc,tx,beam}$. When the transmitter is in the x-y plane, $\theta_{loc,tx,1} = \theta_{loc,tx,2}$. Since this is our assumption, we simply pick the first θ angle to calculate β. An estimate for the $rz_{tx}$ angle is determined iteratively, which process we will describe later.

Using the law of sines, we make the following observation about the two triangles.

$$\frac{a_1}{\sin\beta_1} = \frac{b_1}{\sin(90 - \beta_1)}$$

$$\frac{a_2}{\sin\beta_2} = \frac{b_2}{\sin(90 - \beta_2)}$$

Since $\sin(90-\beta) = \cos(\beta)$, $a_{loc} = y_{loc} - y_{tx}$, and $b_{loc} = x_{loc} - x_{tx}$ and we can rewrite the equations as follows.

$$\frac{y_1 - y_{tx}}{\sin\beta_1} = \frac{x_1 - x_{tx}}{\cos\beta_1}$$

$$\frac{y_2 - y_{tx}}{\sin\beta_2} = \frac{x_2 - x_{tx}}{\cos\beta_2}$$

Rearranging we get:

$$x_{tx}\sin\beta_1 - y_{tx}\cos\beta_1 = x_1\sin\beta_1 - y_1\cos\beta_1$$

$$x_{tx}\sin\beta_2 - y_{tx}\cos\beta_2 = x_2\sin\beta_2 - y_2\cos\beta_2$$

Or in matrix form:

$$\begin{bmatrix} \sin\beta_1 & -\cos\beta_1 \\ \sin\beta_2 & -\cos\beta_2 \end{bmatrix} \begin{bmatrix} x_{tx} \\ y_{tx} \end{bmatrix} = \begin{bmatrix} x_1\sin\beta_1 - y_1\cos\beta_1 \\ x_2\sin\beta_2 - y_2\cos\beta_2 \end{bmatrix}$$

This matrix can then be solved for the location estimate of the transmitter $(x_{tx}, y_{tx})$. To determine if the solution is valid, the following two inequalities are checked.

$$\frac{x_1 - x_{tx}}{\cos\beta_1} \geq 0$$

$$\frac{x_2 - x_{tx}}{\cos\beta_2} \geq 0$$

These inequalities must be true in order for the direction of $\beta_1$ and $\beta_2$ to match the direction shown in FIG. 31-2. We do not need to check the y values since they do not provide any additional information.

In actuality, we have three or more LSR observations. To accommodate this extra data, the guess routine takes groups of three adjacent observations and calculates a transmitter location estimate for each of the three observation combinations. Although this does not allow the solution be take full advantage of all the measured data, it does allow the detection of blunders, i.e. the bad data set can be removed. The final transmitter location $(x_{tx}, y_{tx})$ is then the average of the transmitter locations from this chosen observation set kept after blunder detection.

Finally, we describe how the $rz_{tx}$ angle is calculated, since $\beta_1$ and $\beta_2$ are based on $rz_{tx}$. Unfortunately, we do not have enough information to determine $rz_{tx}$ directly. Therefore, for each set of observation combinations, the guess algorithm tries different $rz_{tx}$ values in increments of 10° starting with 0° and ending with 350°. Using the residual check at each step, the best $rz_{tx}$ is chosen. Those $rz_{tx}$ values that are mathematically impossible with fail the inequality checks given above.

(3) Solution Calculation

As previously stated, the Least Squares algorithm uses Newton-Raphson iteration to find the best solution for the given setup. Newton-Raphson uses a fill function that evaluates the function to be solved for a given solution vector $\vec{x}$:

$$f(\vec{x})=0$$

where $\vec{x}$ is defined above. LSR is essentially just a reverse position calculation, so the fill function is simply the plane equation described in the position calculation herein above described:

$$R_{tx}\vec{v}\cdot(\vec{p}-\vec{p}_{tx})=0$$

When used for position calculation, the quantity for which a solution is found is the location of the detector $\vec{p}$. All other quantities are known. In LSR, the quantities for which a solution is required are the location of the transmitter $\vec{p}_{tx}$ and the orientation of the transmitter $R_{tx}$. The vector $\vec{p}$ is simply the location of the LSR observation $\vec{c}_m$, and the vector $\hat{v}$ is the vector of the measured beam plane. Therefore, for m LSR observations, we can write the set of equations to be solved:

$$\vec{F}(\vec{x}) = \begin{bmatrix} R_{tx}\vec{v}_{1,tx,1}\cdot(\vec{c}_1-\vec{p}_{tx}) \\ R_{tx}\vec{v}_{1,tx,2}\cdot(\vec{c}_1-\vec{p}_{tx}) \\ R_{tx}\vec{v}_{2,tx,1}\cdot(\vec{c}_2-\vec{p}_{tx}) \\ R_{tx}\vec{v}_{2,tx,2}\cdot(\vec{c}_2-\vec{p}_{tx}) \\ \vdots \\ R_{tx}\vec{v}_{m,tx,1}\cdot(\vec{c}_m-\vec{p}_{tx}) \\ R_{tx}\vec{v}_{m,tx,2}\cdot(\vec{c}_m-\vec{p}_{tx}) \end{bmatrix} = \begin{bmatrix} 0 \\ 0 \\ 0 \\ 0 \\ \vdots \\ 0 \\ 0 \end{bmatrix}$$

The Newton-Raphson iteration adjusts $R_{tx}$ and $\vec{p}_{tx}$ until $\vec{F}(\vec{x})$ is approximately zero.

The guess algorithm and subsequent Newton-Raphson iteration are performed for all transmitters in the workspace.

7. Quick Calc Setup Method

Having fully described the LSR method of setting up the system of the present invention, we will now describe the preferred Quick Calc Setup method. This procedure determines, amongst other things, the coordinate system desired by the user and the wand's location in that coordinate system.

A. Introduction to the Quick Set-Up Procedure

Figures 1, 32:
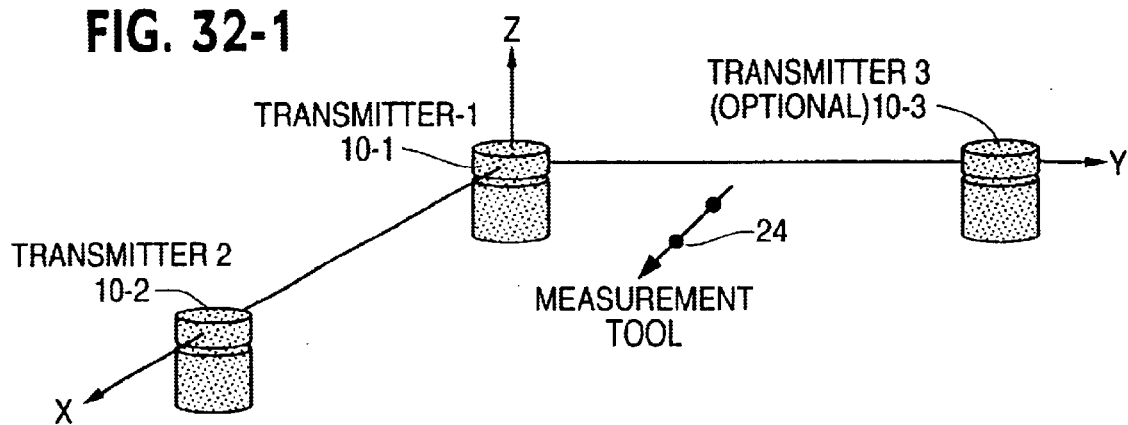
Figures 2, 32:
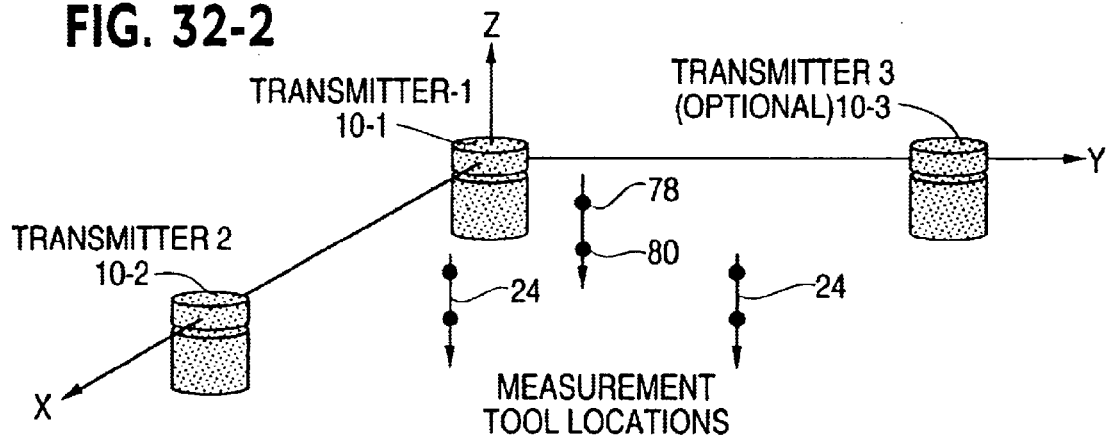
Figures 3, 32:
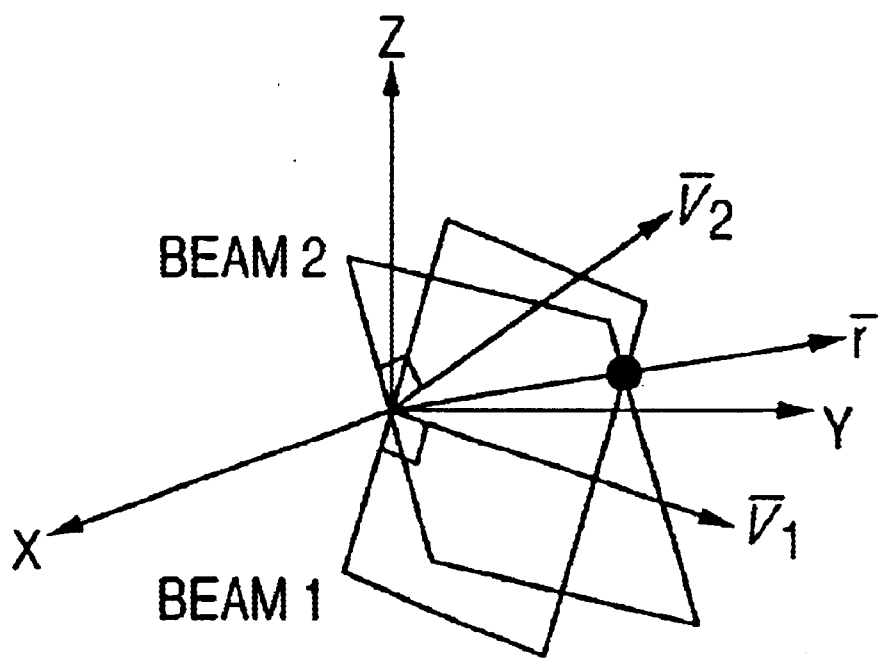
Figures 4, 32:
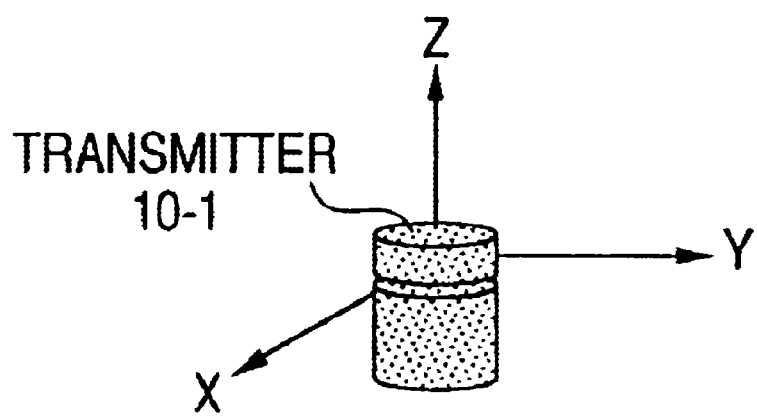
Figures 5, 32:
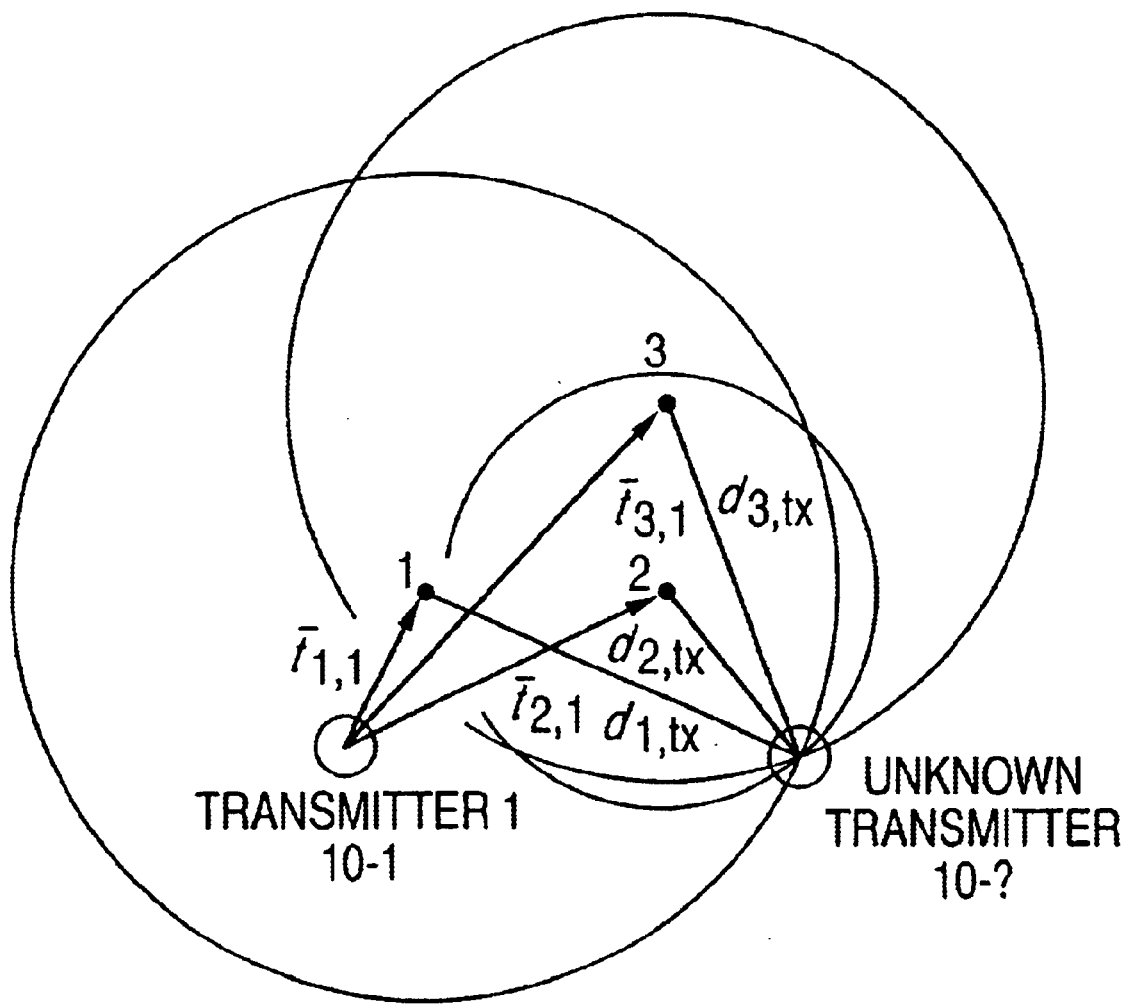
Figures 6, 32:
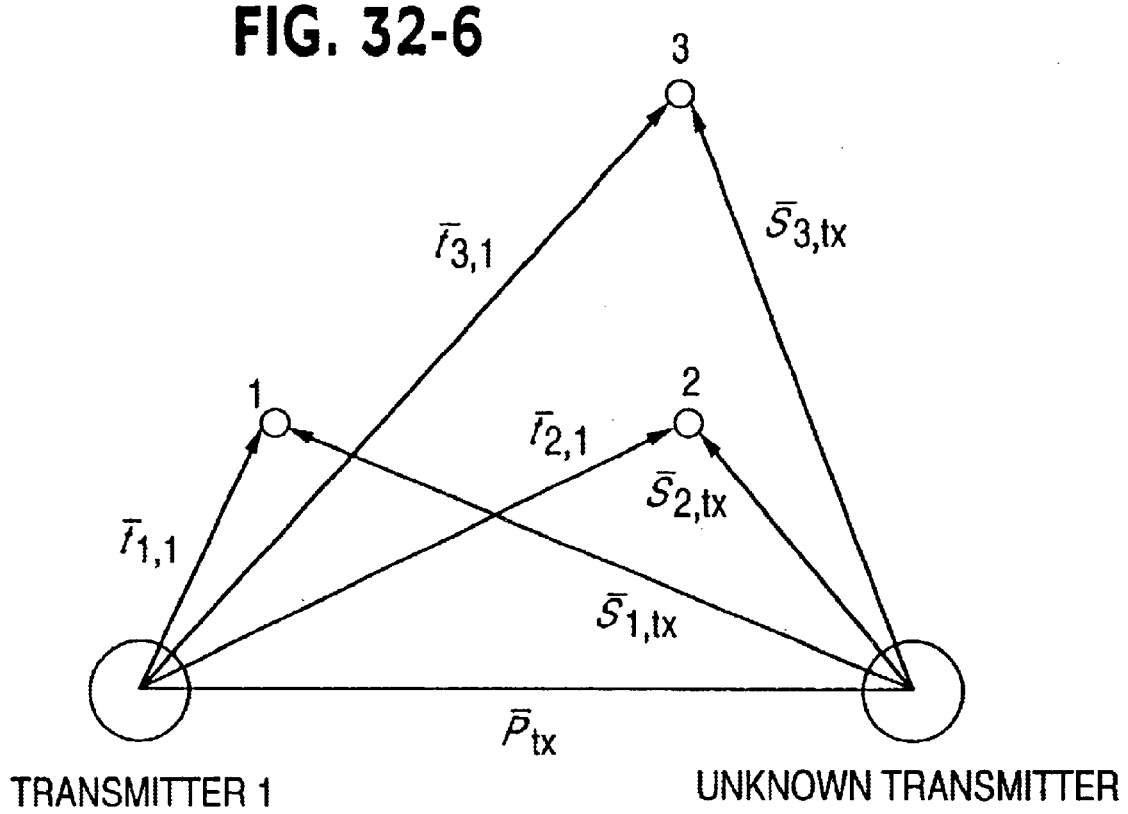
Figures 7, 32:
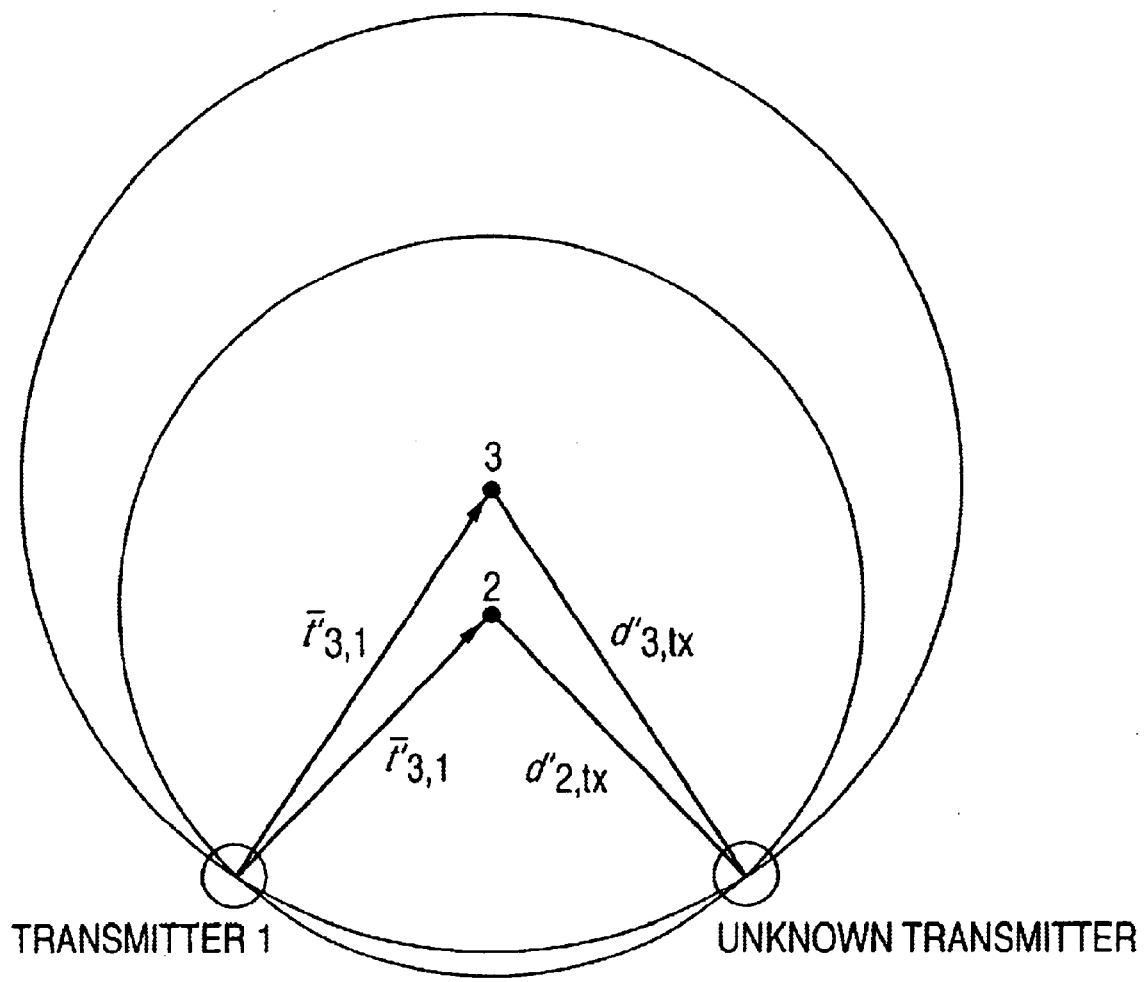
Figures 8, 32:
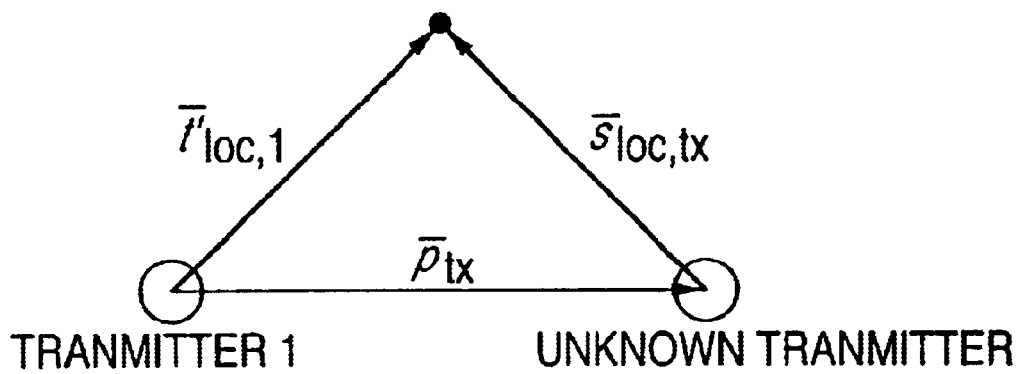
Figures 9, 32:
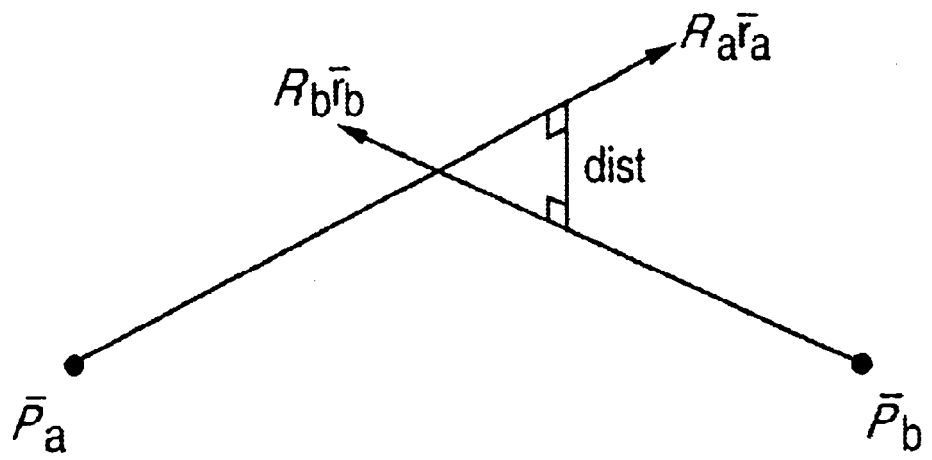
Figures 10, 32:
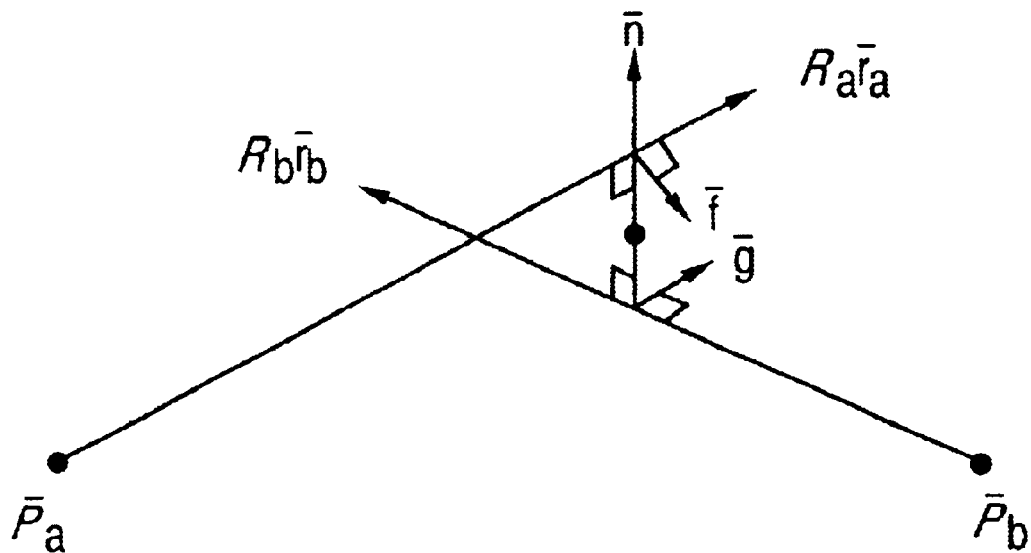
Figures 11, 32:
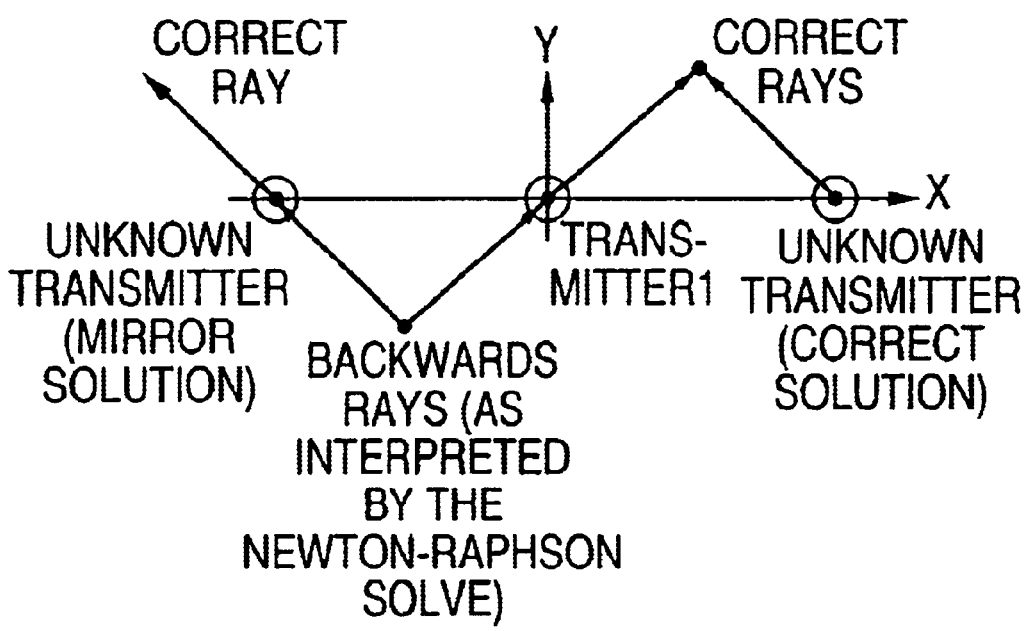
Figures 12, 32:
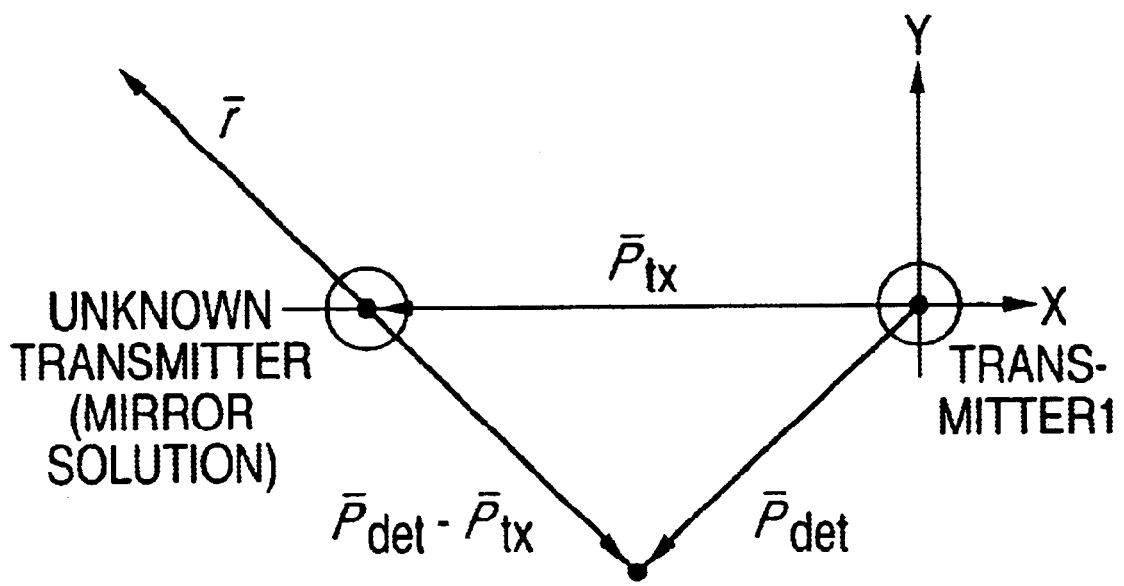

This procedure ties the transmitters in the workspace together into a common mathematical reference frame that is or can be readily mapped to the user's desired reference frame and from which position calculations are made. FIG. 32-1 below shows an example of a user reference frame.

Each transmitter in the workspace has an associated position vector $\vec{p}_{tx}$ and rotation matrix $R_{tx}$ that relate the transmitter's local reference frame to the user reference frame. $\vec{p}_{tx}$ and $R_{tx}$ are used in the position calculation algorithm.

In order to perform a Quick Setup with the position measurement system of the present invention, the user simply places the two-detector (78 & 80) receiving instrument (24) in a minimum of three different locations in the workspace as shown in FIG. 32-2. The receiver system makes scan angle measurements (θ measurements) for both detectors (78 & 80) on the tool at each location.

After all of the measurements are taken, the algorithm calculates vectors from transmitter (10) to detector (78 or 80) for each of the detector measurements. Then the algorithm calculates two rough guesses for the locations and orientations of the transmitters (10) relative to one another. Using these guesses as a starting point, the algorithm performs a Newton-Raphson iteration to precisely locate and orient the transmitters (10) in a common user reference frame.

B. Quick Setup Algorithm (1) Observation Collection

As stated above, the first step in the Quick Setup algorithm is for the receiver system to take scan angle measurements of the two-detector receiving instrument (24) at a minimum of three locations in the workspace. For each receiving instrument location, the receiver system records the scan angles, $\theta_1$ and $\theta_2$, from each transmitter (10) to each detector (78 & 80) on the wand (24). These scan angles are then converted to their corresponding plane vectors $\vec{v}_1$ and $\vec{v}_2$. The plane vectors are then converted to a vector from transmitter (10) to detector (78 or 80) as shown in FIG. 32-3 yielding:

$$\vec{r} = \vec{v}_1 \times \vec{v}_2$$

The $\vec{r}$ vector is relative to the transmitter's local reference frame as shown in the Figures. This vector passes through the detector (78 or 80) but contains no distance information. Since there are two detectors (78 & 80) on the receiving instrument (24), there are two vectors calculated for each wand location. Therefore, for m different wand locations and n different transmitters (10), we have the following data set.

$$\begin{matrix} \vec{r}_{1,1,1} & \vec{r}_{1,1,2} & \cdots & \vec{r}_{1,n,1} & \vec{r}_{1,n,2} \\ \vec{r}_{2,1,1} & \vec{r}_{2,1,2} & \cdots & \vec{r}_{2,n,1} & \vec{r}_{2,n,2} \\ \vdots & \vdots & \ddots & \vdots & \vdots \\ \vec{r}_{m,1,1} & \vec{r}_{m,1,2} & \cdots & \vec{r}_{m,n,1} & \vec{r}_{m,n,2} \end{matrix}$$

The subscript convention is $\vec{r}_{loc,tx,det}$. The first subscript indicates the wand location. The second indicates the transmitter, and the third indicates the detector on the wand (24) (Detector 1 (78) on the wand (24) is the detector closest to the handle.) We call each $\vec{r}$ vector a target observation.

In addition to target observations, the receiver system also records the distance between the detectors (78 & 80) on the receiving instrument (24). This distance is used to provide scale to the iterative solution. The guess routines and Newton-Raphson iteration will use this distance for each location of the tool. We call each instance of this distance a scale bar observation. Therefore, for n different tool locations, we have n different scale bar observations. We may refer to the receiving instrument (24) as a scale bar in this document.

(2) Guess Generation

In the Quick Setup algorithm, the user reference frame is a somewhat arbitrary frame that simply ties all transmitters in the workspace together. Once this frame is established, it is possible to make position calculation measurements relative to the frame's coordinate system. It is also possible to transform the coordinate system into another coordinate system, possibly a surveyed reference frame. The user reference frame is arbitrary because we can choose any origin and any orientation for the principal axes. The only requirement is that the various transmitters in the workspace are properly tied together.

As shown in FIG. 32-4, the user reference frame chosen by Quick Setup puts the first transmitter (10-1) at the origin with no rotation; i.e. the first transmitter's local reference frame is used as the user reference frame.

Since we have fixed the location and orientation of the first transmitter (10-1), the algorithm must solve for the locations and orientations of the other transmitters (e.g., 10-2 & 10-3) in the workspace. Therefore, we are solving for the following quantities:

$$\vec{p}_{tx} = \begin{bmatrix} x_{tx} \\ y_{tx} \\ z_{tx} \end{bmatrix}$$

$$R_{tx} = R_x(rx_{tx})R_y(ry_{tx})R_z(rz_{tx})$$

$$R_{tx} = \begin{bmatrix} 1 & 0 & 0 \\ 0 & \cos(rx_{tx}) & -\sin(rx_{tx}) \\ 0 & \sin(rx_{tx}) & \cos(rx_{tx}) \end{bmatrix} \begin{bmatrix} \cos(ry_{tx}) & 0 & \sin(ry_{tx}) \\ 0 & 1 & 0 \\ -\sin(ry_{tx}) & 0 & \cos(ry_{tx}) \end{bmatrix} \begin{bmatrix} \cos(rz_{tx}) & -\sin(rz_{tx}) & 0 \\ \sin(rz_{tx}) & \cos(rz_{tx}) & 0 \\ 0 & 0 & 1 \end{bmatrix}$$

where the first transmitter is given by:

$$\vec{p}_1 = \begin{bmatrix} 0 \\ 0 \\ 0 \end{bmatrix}$$

$$R_1 = \begin{bmatrix} 1 & 0 & 0 \\ 0 & 1 & 0 \\ 0 & 0 & 1 \end{bmatrix}$$

The order of rotation used in the rotation matrix above is z-y-x fixed angle. This rotation order is chosen because the z rotation component is typically the largest rotation for a transmitter; i.e. the transmitters are usually close to level. Any rotation order can be used, though, as long as $R_{tx}$ is consistent between the Quick Setup algorithm and the position calculation algorithm. We define a solution vector $\vec{x}$ to include the unknowns for all n transmitters:

$$\vec{x} = [x_2\ y_2\ z_2\ rx_2\ ry_2\ rz_2\ \ldots\ x_n\ y_n\ z_n\ rx_n\ ry_n\ rz_n]^T$$

The Quick Setup algorithm generates two different guesses for the $\vec{x}$ vector above. Both guess routines are based on the following assumptions:

1. The transmitters are leveled in the x-y plane and are at the same z-axis location.
2. The scale bars are placed vertically (perpendicular to the x-y plane) at each location.
3. The middle of each scale bar is located in the x-y plane.

These assumptions allow the setup problem to be simplified so that a solution for the position and orientation of the unknown transmitters can be calculated directly rather than through iteration. These guesses are then used as a starting point for the Newton-Raphson iteration. Using the assumptions above, the following information is calculated for each scale bar and each transmitter:

$\vec{t}_{loc,tx}$ A vector in the direction of the center of the scale bar center. The vector's length is approximately the distance to the scale bar center (exactly if the assumptions above are met).

$\beta_{loc,tx}$ The included angle between the two $\vec{r}$ vectors from the given transmitter to the top and bottom detectors on the tool at the given tool location.

The first index on these quantities is the receiving instrument location, and the second is the transmitter number.

The first guess routine uses sets of three scale bar observations to guess the positions and orientations of the unknown transmitters. In this routine, only the $\vec{t}$ vectors calculated above are required. This guess routine is based on the intersection of three spheres in space. We show these spheres in a plan view in FIG. 32-5. We define a sphere for each scale bar observation. The center of each sphere is located using the corresponding $\vec{t}$ vector from the first transmitter (10-1). Remember that the first transmitter (10-1) is our reference transmitter, and the final user reference frame is going to be based on this transmitter (10-?). The radius of each sphere is the distance from the unknown transmitter (10-?) to the scale bar observation, as given by the following:

$$d_{loc,tx} = \|\vec{t}_{loc,tx}\|$$

When the three assumptions above are met, the intersection of the three spheres will exactly locate the unknown transmitter (10-?) relative to the first transmitter (10-1), thereby giving us $(x_{tx}, y_{tx}, z_{tx})$. Since these assumptions are never exactly met, we actually get an approximate location for the unknown transmitter (10-?) (See FIG. 32-5).

The next step in this first guess routine is to calculate the orientation of the unknown transmitter (10-?) relative to the first transmitter (10-1). Since we have calculated a guess location for the unknown transmitter $(x_{tx}, y_{tx}, z_{tx})$, we can also calculate vectors that locate the scale bars from the unknown transmitter as shown in FIG. 32. In this Fig., we define the $\vec{s}$ vectors as:

$$\vec{s}_{loc,tx} = \vec{t}_{loc,1} - \vec{p}_{tx}$$

These vectors are similar to the $\vec{t}_{loc,tx}$ vectors from the unknown transmitter (10-?), except that these vectors are relative to the first transmitter's reference frame. The $\vec{t}_{loc,tx}$ vectors are relative to the unknown transmitter's reference frame. Therefore, we have three vectors from each reference frame that describe the same three points in space. We can then calculate the z-y-x fixed angle rotations, $rx_{tx}, ry_{tx}, rz_{tx}$.

This three-sphere guess routine calculates guesses for adjacent sets of three scale bars and then averages the guess values for each unknown transmitter (10-?). In other words, the routine uses the scale bars at locations 1, 2, and 3 for the first guess, the scale bars at locations 2, 3, and 4 for the second guess, and so on. This averaging helps reduce the effects of errors in the calculations when the three assumptions above are not met.

The second guess routine is similar to the first, except that the second routine finds a two-dimensional guess using two intersecting circles rather than a three-dimensional guess using three intersecting spheres. The second routine calculates guesses for $x_{tx}, y_{tx}$, and $rz_{tx}$ thereby only affecting position and orientation only in the x-y plane only. The $z_{tx}, rx_{tx}$, and $ry_{tx}$ are set to zero for this guess.

The first step in this two-dimensional guess is to pick the two scale bar observations that have the largest included angle $\beta_{loc,tx}$, between the two detectors on the scale bar. The two scale bars are chosen such that is $\beta_{loc,tx}$, large for both the first transmitter (10-1) and the unknown transmitter (10-?). The purpose of this criterion is to select scale bar observations that represent large angular extent between the top and bottom scale bar detectors and thus better resolution on the scale bar measurement. Because $\beta_{loc,tx}$, must be large for both transmitters (10-1 & 10-?), this selection criterion will tend to pick the scale bar locations that are equally spaced between the two transmitters (10-1 & 10-?).

Once the two scale bars are selected, we can create the construct shown in FIG. 32-7 below. In FIG. 32-7, we put primes on the $\vec{t}$ vectors and the d distances to indicate that we have set the z component to zero, since the guess is calculated in the x-y plane only. Zeroing the z component helps reduce errors in both of these quantities when the scale bars are tilted. We calculate the intersection of the two circles to find the guess location for the unknown transmitter (10-?), $(x_{tx}, y_{tx}, 0.0)$.

As with the three-sphere guess routine, we can specify a vector in the first transmitter's reference frame that locates one of the selected scale bars relative to the second transmitter. This is illustrated in FIG. 32-8. Since we also have the $\vec{t}$ vector that describes the scale bar relative to the unknown transmitter, we can determine an $rz_{tx}$ angle using the following formula.

$$\vec{s}_{loc,tx} = \vec{t}_{loc,1} - \vec{p}_{tx}$$

$$rz_{tx} = \tan^{-1}\left(\frac{y_s}{x_s}\right) - \tan^{-1}\left(\frac{y_{t_{loc,1}}^1}{x_{t_{loc,1}}^1}\right)$$

Using this formula, we calculate the $rz_{tx}$ angle for both selected scale bars and average the two angles to calculate the guess value for the rotation about z.

The first guess routine is sufficient for most user setups. However, when the setup deviates significantly from the three assumptions previously listed, the second guess routine provides a good backup.

(3) Solution Calculation

As previously stated, the Quick Setup algorithm uses Newton-Raphson iteration to find the best solution for the given setup. The Newton-Raphson iteration method will be understood by those skilled in the art. Since we have two separate initial guess vectors, Quick Setup runs two separate iterations and then compares the solutions for both using the residual error from the fill functions described below. The solution with the lowest residual error is chosen.

Since we have two types of data collected, target observations and scale bar observations, we have two different functions to be solved. In each case, the solution vector for which we are trying to solve is given by $\vec{x}$. From this solution vector, we construct a position vector $\vec{p}_{tx}$ and a rotation matrix $R_{tx}$ for each unknown transmitter. In other words, for a three-transmitter setup, the solution vector is:

$$\vec{x} = [x_2 \ y_2 \ z_2 \ rx_2 \ ry_2 \ rz_2 \ x_3 \ y_3 \ z_3 \ rx_3 \ ry_3 \ rz_3]^T$$

with position vectors for the three transmitters given by:

$$\vec{p}_1 = \begin{bmatrix} 0 \\ 0 \\ 0 \end{bmatrix} \quad \vec{p}_2 = \begin{bmatrix} x_2 \\ y_2 \\ z_2 \end{bmatrix} \quad \vec{p}_3 = \begin{bmatrix} x_3 \\ y_3 \\ z_3 \end{bmatrix}$$

and rotation matrices for the three transmitters given by:

$$R_1 = Rx(0)Ry(0)Rz(0)$$

$$R_2 = Rx(rx_2)Ry(ry_2)Rz(rz_2)$$

$$R_3 = Rx(rx_3)Ry(ry_3)Rz(rz_3)$$

In order to describe the two types of solve functions, we now introduce a shorthand notation for two $\vec{r}$ vectors that go through the same detector det at the same tool location loc from two different transmitters a and b:

$$\vec{r}_a \equiv \vec{r}_{loc,a,det}$$

$$\vec{r}_b \equiv \vec{r}_{loc,b,det}$$

For target observations, we want to solve for the locations and orientations of the unknown transmitters by making the distance between each set of target rays zero. Therefore, we use the following formula that describes the distance between two target rays.

$$dist = \frac{R_a \vec{r}_a \times R_b \vec{r}_b}{\|R_a \vec{r}_a \times R_b \vec{r}_b\|} \cdot (\vec{p}_a - \vec{p}_b)$$

As can be seen from the FIG. 32-9, the target rays are multiplied by the corresponding transmitter rotation matrix so that the rays will be relative to the user reference frame. We use the distance equation for all target observations and all combinations of two transmitters. When the correct positions and orientations of the unknown transmitters are found, the calculated distance between rays will be approximately zero.

For scale bar observations, we want to ensure that each recorded scale bar length is equal to the calculated scale bar length for the given locations and orientations of the transmitters in the workspace. Since the solution process is iterative, the rays to the detector targets on each scale bar are not going to intersect until the correct solution vector is found. Therefore, to check the scale, we must first calculate the closest point of intersection for two detector target rays.

In the FIG. 32-10, we again illustrate vectors $R_a \vec{r}_a$ and $R_b \vec{r}_b$, which do not intersect. The line segment that connects these two vectors represents the closest point between the vectors. This line segment is perpendicular to both vectors. Rather than calculate the length of this line segment as we did for the target observation function, we instead want to calculate the midpoint on this segment, which represents the closest point of intersection. We can calculate this midpoint by constructing three orthogonal basis vectors.

$$\vec{n} = R_a \vec{r}_a \times R_b \vec{r}_b$$

$$\vec{f} = R_a \vec{r}_a \times \vec{n}$$

$$\vec{g} = R_a \vec{r}_a \times \vec{n}$$

We then define a reference frame B in which the midpoint lies using the three normalized basis vectors as rows of B:

$$B = \begin{bmatrix} \hat{n}^T \\ \hat{f}^T \\ \hat{g}^T \end{bmatrix}$$

We now determine the component of the midpoint along each of the basis vectors:

$$n = \frac{\hat{n} \cdot \vec{p}_a + \hat{n} \cdot \vec{p}_b}{2}{}_b$$

$$f = \hat{f} \cdot \vec{p}_a$$

$$g = \hat{g} \cdot \vec{p}_b$$

Finally, we can calculate the coordinate of the midpoint in the user reference frame:

$$\hat{p}_{mid} = B^{-1} \begin{bmatrix} n \\ f \\ g \end{bmatrix}$$

This midpoint exactly locates the detector when the correct positions and orientations of the unknown transmitters are found. The midpoint is calculated for both detectors on the scale bar, and then the scale bar length is calculated:

$$\text{len}_{calc} = \|\hat{p}_{mid1} - \hat{p}_{mid1}\|$$

Finally, the difference between the calculated scale bar length and the actual length is determined. This difference will be approximately zero when the correct transmitter positions and orientations are found.

$$\text{len}_{error} = \text{len}_{calc} - \text{len}_{actual}$$

These two types of solution equations make up the fill functions for the Newton-Raphson iteration.

(3) Solution Check

The final step in the Quick Setup algorithm i a cleanup step. By definition, the $\vec{r}$ vectors start at the transmitters (10) and go to the detector targets (78 & 80). This direction is important because it establishes the locations of the transmitters (10) relative to the observations. However, the two fill functions used in the Newton-Raphson iteration do not take into account the direction of the rays, only their distance apart. Therefore, there are two global minima in the solution space, one in which the $\vec{r}$ vectors go from transmitter (10) to detector (78 & 80), and one in which they go the other direction. In some cases, especially when the three assumptions previously described are not met, the iteration can go to the wrong minimum.

Figure 11:
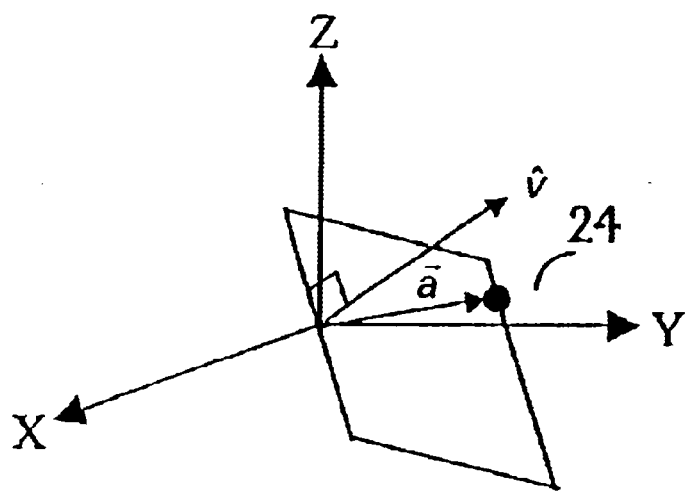
FIG. 11 is a graphic representation of a single fan beam plane illuminating a detector according to the present invention.

A simple example of such a solution is given in FIG. 32-11. Note that the unknown transmitter's orientation is correct. Only the transmitter's location gets mirrored. We can see from FIG. 32-11 that the mirrored solution uses the correct rays. The rays just go in the wrong direction. We check for a mirrored solution by calculating actual detector location given the transmitter solution and then comparing that solution with the actual ray as shown in FIG. 32-12. As evident from this Fig., we can simply check the sign on the dot product between these two vectors. If $\vec{r} \cdot (\vec{p}_{det} - \vec{p}_{tx})$ is negative, then the solution is mirrored, and the coordinates of the unknown transmitter are negated. In this case, we simply flip the signs on the $x_{tx}$, $y_{tx}$, and $z_{tx}$ coordinates for the mirrored transmitter. This check is performed on all unknown transmitters (10).

8. Quick Setup 2 with Separate Scale Determination

The quick setup procedure herein above described, does a global solution for both the orientation of the transmitters and the scale of the system simultaneously. There are many applications where it is advantageous to solve for orientation and scale separately. For example, if the scale is not important or is known ahead of time, then an algorithm which solves only for orientation would be needed. The algorithm described meets that condition. The algorithm is based on the same mathematical structure as the algorithm described above but solves in two steps. First the orientation of the transmitters is determined with arbitrary scale. Secondly, scale is added to the system either through a priori knowledge, or through the analysis of measured scale bars. The algorithm also reports out estimates of the error in each of the parameters for which it solves.

E. Introduction to the Quick Set-Up 2 Procedure

The purpose of Arc Second's Quick Setup 2 algorithm is to quickly proved the user an initial user reference frame as described in the herein above discussion of the Position Calculation Algorithm. This frame ties the transmitters in the workspace together into a common mathematical reference frame, from which position calculations are made. FIG. 32-1 shows an example of a user reference frame.

Each transmitter in the workspace has associated position vector $\vec{p}_{tx}$ and rotation matrix $R_{tx}$ that relate the transmitter's local reference frame to the user reference frame. $\vec{p}_{tx}$ and $R_{tx}$ are used in the position calculation algorithm.

To perform a Quick Setup 2 the user simply places the two-detector measurement tool in a minimum of three different locations in the workspace as shown in FIG. 32-2. The receiver system makes scan angle measurements ($\theta$ measurements) for both detectors on the tool at each location.

After all of the measurements are taken, the algorithm calculates vectors from transmitter to detector for each of the detector measurements. Then the algorithm calculates a guess for the locations and orientations of the transmitters relative to one another. Using these guesses as a starting point, the algorithm performs a Newton-Raphson iteration to precisely locate and orient the transmitters in a common user reference frame.

F. Quick Setup 2 Algorithm

(10) Observation Collection

The first step in the Quick Setup algorithm is for the receiver system to take scan angle measurements of the two-detector tool at a minimum of three locations in the workspace. For each tool location, the receiver system records the scan angles, $\theta_1$ and $\theta_2$, from each transmitter to each detector on the tool (a total of eight observations). These scan angles are then converted to their corresponding plane vectors $\vec{v}_1$ and $\vec{v}_2$ as described in the hereinabove description of position. The plane vectors are then converted to a vector from transmitter to detector as shown in FIG. 32-3 yielding:

$$\vec{r} = \hat{v}_1 \times \vec{v}_2$$

The $\vec{r}$ vector is relative to the transmitter's local reference frame as shown in the figure. This vector passes through the detector but contains no distance information. Since there are two detectors on the measurement tool, there are two vectors calculated for each tool location. Therefore, for m different tool locations and n different transmitters, we have the following data set.

$$\begin{matrix} \vec{r}_{1,1,1} & \vec{r}_{1,1,2} & \ldots & \vec{r}_{1,n,1} & \vec{r}_{1,n,2} \\ \vec{r}_{2,1,1} & \vec{r}_{2,1,2} & \ldots & \vec{r}_{2,n,1} & \vec{r}_{2,n,2} \\ \vdots & \vdots & \ddots & \vdots & \vdots \\ \vec{r}_{m,1,1} & \vec{r}_{m,1,2} & \ldots & \vec{r}_{m,n,1} & \vec{r}_{m,n,2} \end{matrix}$$

The subscript convention is $\vec{r}_{loc,tx,det}$. The first subscript indicates the tool location. The second indicates the transmitter, and the third indicates the detector on the tool. (Detector 1 on the tool is the detector closest to the handle.) We call each $\vec{r}$ vector a target observation.

In addition to target observations, the receiver system also records when pairs of target observations are a known distance apart. These distances are provided to the receiver through user input or as part of factory calibration of the receiver. We call each instance of these pairs where we can measure a distance a scale bar observation. Therefore, for our two-detector tool we can have a scale bar observation on each measurement. Therefore, n different tool locations, yield n different scale bar observations. We will often refer to the measurement tool as a scale bar in this document.

(11) Frame of Reference

The user reference frame is a somewhat arbitrary frame that simply ties all transmitters in the workspace together. Once this frame is established, it is possible to make position calculation measurements relative to the frame's coordinate system. It is also possible to transform the coordinate system into another coordinate system, possibly a surveyed reference frame. The user reference frame is arbitrary because we can choose any origin and any orientation for the principal axes. The only requirement is that the various transmitters in the workspace are properly tied together.

As shown in FIG. 32-1 the user reference frame chosen by Quick Setup 2 puts the first transmitter at the origin. Unlike Quick Setup 1, the transmitter at the origin is allowed to rotate, however, all of its other parameters will be set to zero. Since this algorithm will only solve for the scale, arbitrary coordinates must be assigned to the second transmitter. Specifically, we will force the second transmitter to be on the x axis as shown in FIG. 32-2 and will be place on the x-axis at a fixed arbitrary distance (we will chose 10). The algorithm must then solve for z, and the rotation parameters for the second transmitter. If a third transmitter is added, the algorithm must also solve for the location and orientation of the other transmitter in the workspace. Therefore, the algorithm would have to solve for all six parameters of the third transmitter. In summary, for each transmitter we are either fixing or solving for the following quantities:

$$\vec{x}_{tx} = [x_{tx}\ y_{tx}\ z_{tx}\ rx_{tx}\ ry_{tx}\ rz_{tx}]^T$$

$$\vec{p}_{tx} = \begin{bmatrix} x_{tx} \\ y_{tx} \\ z_{tx} \end{bmatrix}$$

$$R_{tx} = R_x(rx_{tx})R_y(ry_{tx})R_z(rz_{tx})$$

$$R_{tx} = \begin{bmatrix} 1 & 0 & 0 \\ 0 & \cos(rx_{tx}) & -\sin(rx_{tx}) \\ 0 & \sin(rx_{tx}) & \cos(rx_{tx}) \end{bmatrix} \begin{bmatrix} \cos(ry_{tx}) & 0 & \sin(ry_{tx}) \\ 0 & 1 & 0 \\ -\sin(ry_{tx}) & 0 & \cos(ry_{tx}) \end{bmatrix} \begin{bmatrix} \cos(rz_{tx}) & -\sin(rz_{tx}) & 0 \\ \sin(rz_{tx}) & \cos(rz_{tx}) & 0 \\ 0 & 0 & 1 \end{bmatrix}$$

The order of rotation used in the rotation matrix above is z-y-x fixed angle. This rotation order is chosen because the z rotation component is typically the largest rotation for a transmitter; i.e. the transmitters are usually close to level. Any rotation order can be used, though, as long as $R_{tx}$ is consistent between the Quick Setup algorithm and the position calculation algorithm.

The parameters for three transmitters are therefore:

$$\vec{x}_1 = [0\ 0\ 0\ 0\ 0\ rz_1]^T$$

$$\vec{x}_2 = [10\ 0\ z_2\ rx_2\ ry_2\ rz_2]^T$$

$$\vec{x}_3 = [x_3\ y_3\ z_3\ rx_3\ ry_3\ rz_3]^T$$

Remember that the 10 for the position of x in transmitter 2 is arbitrary and fixed. We define a solution vector $\vec{x}$ to include the unknowns for all n transmitters:

$$\vec{x} = [rz_1\ z_2\ rx_2\ ry_2\ rz_2\ x_3\ y_3\ z_3\ rx_3\ ry_3\ rz_3\ \ldots]^T$$

Therefore, for two transmitters we are solving for 5 parameters, three transmitters will be 11 parameters, and each additional transmitter will require 6 new parameters.

(12) Guess Generation

The hereinabove discussion of the guess routine for the Quick Setup 1 algorithm is also appropriate for the Quick Setup 2 algorithm. There are also many times when a guess of 0 will be sufficient.

(13) Orientation Solution

In order to describe the solve functions, we introduce a shorthand notation for two $\vec{r}$ vectors that go through the same detector det at the same tool location loc from two different transmitters a and b:

$$\vec{r}_a \equiv \vec{r}_{loc,a,det}$$

$$\vec{r}_b \equiv \vec{r}_{loc,b,det}$$

For target observations, we want to solve for the orientations of the unknown transmitters by making the distance between each set of target rays zero. Therefore, we use the following formula that describes the miss distance between two target rays.

$$\text{miss\_dist} = \frac{R_a \vec{r}_a \times R_b \vec{r}_b}{\|R_a \vec{r}_a \times R_b \vec{r}_b\|} \cdot (\vec{p}_a - \vec{p}_b) = -\hat{n} \cdot \hat{D}$$

$$\text{where: } \hat{n} = \frac{R_a \vec{r}_a \times R_b \vec{r}_b}{\|R_a \vec{r}_a \times R_b \vec{r}_b\|}, \text{ and}$$

$$\vec{D} = (\vec{p}_b - \vec{p}_a)$$

As can be seen from the FIG. 32-9, the corresponding transmitter rotation matrix multiplies the target rays so that the rays will be relative to the user reference frame. We use the miss distance equation for all target observations and all combinations of two transmitters. When the correct positions and orientations of the unknown transmitters are found, the calculated distance between rays will be driven toward zero. This is accomplished through using Newton's Method relying upon a Jacobian matrix of partial derivatives to make the equations linear.

The general form of a Newton's Method step for this problem is of the form:

$$^i\Delta\bar{x} = -^iQ \cdot ^iJ^T \cdot P \cdot ^iv$$

$$^iQ = (^iJ^T \cdot P \cdot ^iJ)^{-1}$$

where:

i is the iteration index, $^i\Delta\bar{x}$ is the adjustment of the parameters associated with the ith step, $^iJ$ is the Jacobian matrix of partial derivative associated with the ith step, P is the weight matrix when it is available, $^iv$ is the residual at the ith step, and $^iQ$ is a grouping of matrixes which maps the residual to the parameters (also called the information matrix).

These steps are continued until either the residual is no longer decreasing or a limit on the number of iterations is reached. After the last step the residual v and the Q matrix are used to predict performance. First of all the standard error of weight one is calculated using the following:

$$\sigma_o = \sqrt{\frac{v^T \cdot P \cdot v}{n-u}}$$

where:

n is the number of target observations, and u is the number of parameters being solved for.

The residual is assumed to have a mean of zero, therefore, this is like a standard deviation. Identifying that the Q matrix is the mapping from the parameters to the residual, it can also be used to map the standard error of weight one to the mean-square errors of the individual unknowns using the equation:

$$\bar{\sigma}x_k = \sigma_o \sqrt{q_{kk}}$$

where:

$q_{kk}$ are the diagonal elements of Q

Stopping at this point in the algorithm, all of the relative orientations are solved for with transmitter 1 at the origin, transmitter 2 on the x-axis and the other transmitters at relative locations. The x-axis distance to transmitter 2 still has the unit less value assigned to it before the beginning of the iterations (in our case 10 units). This arbitrary orthogonal un-scaled coordinate system can now be used directly, or it can be used to find the scale of the overall system.

(14) Scale Bar Solution

The scale bar calculation is now relatively straightforward. For each target observation we can now calculate its position in the arbitrary un-scaled coordinate system. For i scale bar observation, we now know the positions of each end, and therefore we can calculate the distance between the detectors $Ss_i$. For each of these scale bar observations we also have a know distance $Sk_i$. Therefore for each scale bar we can calculate the scale of the system:

$$S_i = SK_i/Ss_i$$

$S = E \langle S_i \rangle$ is the scale which is the mean of the estimates and, $\sigma_s = \sqrt{E \langle (S_i = S)^2 \rangle}$ which is the standard deviation of the Scale measurements.

Multiplying each of the position components will now put the transmitter in a coordinate system with the proper scale:

$$\vec{x} = [rz_1 \; S \cdot z_2 \; rx_2 \; ry_2 \; rz_2 \; S \cdot x_3 \; S \cdot y_3 \; S \cdot z_3 \; rx_3 \; ry_3 \; rz_3 \ldots ]^T$$

The preceding description has been presented only to illustrate and describe the invention. It is not intended to be exhaustive or to limit the invention to any precise form disclosed. Many modifications and variations are possible in light of the above teaching. In accordance with the principles of the present invention, the functionality disclosed herein can be implemented by hardware, software, and/or a combination of both. Software implementations can be written in any suitable language, including without limitation high-level programming languages such as C++, mid-level and low-level languages, assembly languages, and application-specific or device-specific languages. Such software can run on a general purpose microprocessor such as an Intel 486 or Pentium, an application specific piece of hardware, or other suitable device. In addition to using discrete hardware components in a logic circuit, the required logic may also be performed by an application specific integrated circuit ("ASIC"), a programmed programmable logic device ("PLD"), or other device. The system will also include various hardware components which are well known in the art, such as connectors, cables, and the like. Moreover, at least part of this functionality may be embodied in computer readable media (also referred to as computer program products), such as magnetic, magnetic-optical, and optical media, used in programming an information-processing apparatus to perform in accordance with the invention. This functionality also may be embodied in computer readable media, or computer program products, such as a transmitted waveform to be used in transmitting the information or functionality.

INDUSTRIAL APPLICATION

As is clear from the present disclosure, the present invention can be applied to a variety of different fields, applications, industries, and technologies. The present invention can be used, without limitation, with any system in which information related to position must be determined, including without limitation movement, dimensional measurement, and position and orientation tracking. This includes without limitation many different processes and applications involved in myriad industries. Some of these industries and some of their associated processes or applications are: film making (digitizing models, virtual sets, camera tracking, automatic focusing), construction (trades, power tools, surveying, CAD, equipment control, construction measurement and layout), robotics (robot calibration, work cell configuration, mobile robot navigation, hazardous waste excavation), law enforcement (accident scene mapping, crime scene mapping, incident reconstruction), computers (3D input devices, video games), virtual reality (augmented reality, virtual arcades, 3D Internet experiences), manufacturing (factory automation, facility decommissioning, parts inspection, facility maintenance, manufacturing tooling and inspection, manufacturing measurement), medical (surgical navigation, smart operating rooms, medical instrumentation), and defense (ordnance modeling, simulation training, aircraft fit-checks, ship retrofit and repair, site remediation).

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

We claim:

1. An improved position optical detector apparatus utilizable in a measurement system for generating x-y-z data within a measurement field including a plurality of rotatably supported optical transmitters with each transmitter spaced apart from the others in the measurement field and being operatively related through a reference frame within the measurement field to define an intersection between vectors for each transmitter with each transmitter including laser means to generate two rotating substantially planar beams and a strobe means for periodically generating a strobe pulse for each transmitter at a predetermined point in the rotation of each transmitter, said apparatus comprising
  a user-movable receiving instrument comprising:
    at least one light detector for generating an electric signal each time one of the beams or optical strobe pulses illuminates that light detector as it is positioned within said measurement field;
    memory means storing calibration data uniquely defining predetermined angular parameters of said beams; and
    means for calculating the x-y-z data corresponding to the position of said detector within said measurement field using said calibration data and said electric signals from said light detector indicative of said times at which one of the beams or optical strobe pulses illuminates that detector.

2. The improved apparatus of claim 1, wherein said user-movable receiving instrument further comprises a user interface for receiving an input of said calibration data.

3. The improved apparatus of claim 1, wherein said user-movable receiving instrument further comprises a serial port for receiving a transmission of said calibration data.

4. The improved apparatus of claim 3, wherein said serial port is an optical port.

5. The improved apparatus of claim 3, wherein said serial port is a cable port.

6. The improved apparatus of claim 1, wherein said user-movable receiving instrument further comprises a port for coupling said instrument with one of said optical transmitters so that said calibration data can be transmitted from a memory unit in said optical transmitter to said memory means of said user-moveable receiving instrument.

7. The improved apparatus of claim 6, wherein said serial port is an optical port.

8. The improved apparatus of claim 1, wherein said stored calibration data uniquely defines an angular separation between said fan beams, a tilt angle for each of said fan beams measured from vertical and a rotational velocity for each of said transmitters.

9. The improved apparatus of claim 1, wherein said strobe pulse defines a zero reference for the rotation of that transmitter.

10. The improved apparatus of claim 8, wherein said rotational velocity calibration data is unique for each transmitter in the system and the velocity calibration data for each transmitter enables said position measurement apparatus to differentiate between transmitters operational within said measurement field.

11. The improved apparatus of claim 1, additionally including high speed timer means for making differential timing measurements between the electrical signals generated by each of said at least one light detector.

12. The improved apparatus of claim 11, additionally including means responsive to said differential timing measurements for calculating for each revolution of one of said transmitters angular data between said optical strobe pulse and the laser beams respectively.

13. The improved apparatus of claim 1, further comprising:
  a plurality of tracker means for accumulating sequential incoming electric signals from each of said light detectors; and
  synchronization means for associating each of said incoming electrical signals with one of said tracker means.

14. The improved apparatus of claim 13, further comprising pulse track reconciling means for associating a set of three related electric signals as being from a single transmitter of said system within a single transmit period.

15. The improved apparatus of claim 13, further comprising multi-path pulse tracking means for determining whether some of said electric signals from said light detector are caused by light from said transmitters which is reflected before striking said light detector rather than a direct line-of-sight beam from one of said transmitters striking said light detector.

16. The improved apparatus of claim 1, wherein said means for calculating said x-y-z position data comprises a matrix calculation means wherein the matrix notation for said calculation can be represented as follows:

$$A_{2n \times 3} \vec{P}_{3 \times 1} = \vec{b}_{2n \times 1}$$

wherein the subscripts indicate dimensions of the matrix and the x-y-z detector position in the user reference can be calculated by solving the above equation for P.

17. The improved apparatus of claim 16, wherein the matrix may alternatively be solved utilizing a least squares reduction mathematical technique.

18. The improved apparatus of claim 16, wherein the matrix may be solved utilizing a single value decomposition mathematical technique.

19. An improved method of implementing an optical detector apparatus utilizable in a measurement system for generating x-y-z data within a measurement field including a plurality of rotatably supported optical transmitters with each transmitter spaced apart from the others in the measurement field and being operatively related through a reference frame within the measurement field to define an intersection between vectors for each transmitter with each transmitter including laser means to generate two rotating substantially fan shaped beams and a strobe means for generating a strobe pulse for each transmitter at a predetermined point in the rotation of each transmitter, said method comprising:

storing calibration data in a memory means on said receiving instrument, said calibration data comprising predetermined angular parameters of said beams;

positioning a user-movable receiving instrument at a location for which position data will be generated;

generating an electric signal with at least one light detector on said receiving instrument at said location, said generating an electric signal being performed each time one of the fan beams or optical strobe illuminates that light detector; and calculating the x-y-z data corresponding to the position of said detector within said measurement field using said calibration data stored in said memory means of said receiving instrument and said electric signals from said light detector indicative of said times at which one of the fan beams or optical strobe illuminates that detector.

20. The improved method of claim 19, further comprising inputting said calibration data to said user-movable receiving instrument with a user interface.

21. The improved method of claim 19, further comprising transmitting said calibration data into said user-movable receiving instrument through a serial port of said instrument.

22. The improved method of claim 21, wherein said serial port is an optical port.

23. The improved method of claim 21, wherein said serial port is a cable port.

24. The improved method of claim 19, further comprising:

interfacing said instrument with one of said optical transmitters; and transmitting said calibration data from a memory unit in said optical transmitter to said memory means of said user-movable receiving instrument.

25. The improved method of claim 24, wherein said interfacing comprises optically interfacing said receiving instrument and said optical transmitter.

26. The improved method of claim 19, wherein said stored calibration data uniquely defines an angular separation between said fan beams, a tilt angle for each of said fan beams measured from vertical and a rotational velocity for each of said transmitters.

27. The improved method of claim 19, wherein said strobe pulse defines a zero reference for the rotation of that transmitter.

28. The improved method of claim 26, wherein said rotational velocity calibration data is unique for each transmitter in the system; and said method further comprising differentiating light pulses as originating with a particular transmitter in said measurement field based on said velocity calibration data.

29. The improved method of claim 19, further comprising making differential timing measurements between the electrical signals generated by each of said at least one light detector.

30. The improved method of claim 29, further comprising calculating for each revolution of one of said transmitters angular data between said optical strobe pulse and the laser fan beams respectively based on said differential timing measurements.

31. The improved method of claim 19, further comprising tracking optical signals from said transmitters received by said receiving instrument by accumulating sequential incoming electric signals from each light detector and associating each of said incoming electrical signals with one of a plurality of tracker means.

32. The improved method of claim 31, further comprising associating a set of three related electric signals as being from a single transmitter of said system within a single transmit period.

33. The improved method of claim 19, further comprising determining whether some of said electric signals from said light detector are caused by light from said transmitters which is reflected before striking said light detector rather than a direct line-of-sight beam from one of said transmitters striking said light detector.

34. The improved method of claim 19, wherein said step of calculating said x-y-z position data comprises performing a matrix calculation wherein the matrix notation for said calculation can be represented as follows:

$$A_{2n \times 3} \vec{P}_{3 \times 1} = \vec{b}_{2n \times 1}$$

wherein the subscripts indicate dimensions of the matrix and the x-y-z detector position in the user reference can be calculated by solving the above equation for P.

35. The improved method of claim 34, wherein the matrix may alternatively be solved utilizing a least squares reduction mathematical technique.

36. The improved method of claim 34, wherein the matrix may be solved utilizing a single value decomposition mathematical technique.

37. A method of quickly defining a reference frame in a position measurement system for generating x-y-z data within a measurement field including a plurality of rotatably supported optical transmitters with each transmitter spaced apart from the others in the measurement field and being operatively related through a reference frame within the measurement field to define an intersection between vectors for each transmitter with each transmitter including laser means to generate two rotating substantially fan shaped beams and a strobe means for generating a strobe pulse for each transmitter at a predetermined point in the rotation of each transmitter, said method comprising:

positioning a user-movable receiving instrument at three or more random, undefined locations within said measurement field;

recording data from light detectors on said receiving instrument at each of said locations, said light detectors generating said data in response to illumination by said fan beams and said strobe pulses from said transmitters;

calculating data about a position of said receiving instrument relative to said transmitters based on said recorded data;

calculating data about positions of said transmitters relative to each other based on said data about the position of the receiving instrument at said three or more locations relative to said transmitters; and establishing a coordinate system for said measurement system based on said data.

38. The method of claim 37, wherein said establishing a coordinate system further comprises arbitrarily designating one of said transmitters as being located at an origin of said coordinate system.

39. The method of claim 38, wherein said establishing a coordinate system further comprises calculating position information for other transmitters in said measurement field relative to said transmitter designated as being at said origin of said coordinate system.

40. The method of claim 39, wherein said establishing a coordinate system further comprises generating two guesses for the value of a solution defining the positions and orientations of all transmitters in said measurement field and using Newton-Raphson iterations to test said guesses.

41. The method of claim 40, wherein two guesses are made based on the following three assumptions:

(a) all transmitters are leveled in an x-y plane of said coordinate system and are at the same height on a z axis of said coordinate system;

(b) Said receiving instrument is vertically oriented at each of said locations where data is collected; and (c) a center of said receiving instrument is in said x-y plane.

42. The method of claim 40, further comprising comparing solutions produced by testing both of said guesses to minimize error.

43. The method of claim 37, further comprising mapping said coordinate system into a final coordinate system specified by a user.

44. The method of claim 38, wherein said establishing a coordinate system is accomplished with arbitrary scale.

* * * * *